US009783145B1

(12) United States Patent
Konet et al.

(10) Patent No.: US 9,783,145 B1
(45) Date of Patent: Oct. 10, 2017

(54) REAR-END COLLISION AVOIDANCE

(71) Applicant: NISSAN NORTH AMERICA, INC., Franklin, TN (US)

(72) Inventors: Heather Konet, Canton, MI (US); Roy Goudy, Farmington Hills, MI (US); Neal Probert, Farmington Hills, MI (US); Jeremy Chambers, Casco, MI (US); Andrew Christensen, South Lyon, MI (US)

(73) Assignee: Nissan North America, Inc., Franklin, TN (US)

( * ) Notice: Subject to any disclaimer, the term of this patent is extended or adjusted under 35 U.S.C. 154(b) by 19 days.

(21) Appl. No.: 15/078,781

(22) Filed: Mar. 23, 2016

(51) Int. Cl.
*B60R 21/0134* (2006.01)
*H04B 1/3822* (2015.01)
(Continued)

(52) U.S. Cl.
CPC ............ *B60R 21/0134* (2013.01); *B60Q 1/52* (2013.01); *B60Q 9/00* (2013.01); *H04B 1/3822* (2013.01); *H04W 4/027* (2013.01); *H04W 4/046* (2013.01)

(58) Field of Classification Search
CPC .... B60R 21/0134; H04B 1/3822; B60Q 9/00; B60Q 1/52; H04W 4/027; H04W 4/046
See application file for complete search history.

(56) References Cited

U.S. PATENT DOCUMENTS 5,939,976 A   8/1999   Sasaki et al.
5,940,010 A   8/1999   Sasaki et al.
(Continued)

FOREIGN PATENT DOCUMENTS

JP   2001118199 A   4/2001
JP   2003051099 A   2/2003

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of The Ohio State University, Mar. 2012, UMI/Proquest Pub. No. 3497707, 136 pages (total).

(Continued)

*Primary Examiner* — Mary Cheung
(74) *Attorney, Agent, or Firm* — Young Basile Hanlon & MacFarlane, P.C.

(57) ABSTRACT

A method and apparatus for use in traversing a vehicle transportation network may include a host vehicle receiving a remote vehicle message including remote vehicle information, identifying host vehicle information, determining a relative position code indicating whether an expected path for the remote vehicle and an expected path for the host vehicle are convergent based, determining a remote vehicle dynamic state code based on the remote vehicle information, determining a host vehicle dynamic state code based on the host vehicle information, identifying an expected rear-end collision condition based on the relative position code, the remote vehicle dynamic state code, and the host vehicle dynamic state code, in response to identifying the expected rear-end collision condition, identifying a vehicle control action based on the host vehicle dynamic state code, and traversing a portion of the vehicle transportation network in accordance with the vehicle control action.

20 Claims, 34 Drawing Sheets

(51) Int. Cl.
  *H04W 4/04* (2009.01)
  *H04W 4/02* (2009.01)
  *B60Q 1/52* (2006.01)
  *B60Q 9/00* (2006.01)

(56) References Cited

U.S. PATENT DOCUMENTS

| | | |
|---|---|---|
| 6,008,741 A | 12/1999 | Shinagawa et al. |
| 6,615,137 B2 | 9/2003 | Lutter et al. |
| 6,700,504 B1 | 3/2004 | Aslandogan et al. |
| 6,720,898 B1 | 4/2004 | Ostrem |
| 6,791,471 B2 | 9/2004 | Wehner et al. |
| 6,810,328 B2 | 10/2004 | Yokota et al. |
| 8,000,897 B2 | 8/2011 | Breed et al. |
| 8,175,796 B1 | 5/2012 | Blackburn et al. |
| 8,229,663 B2 | 7/2012 | Zeng et al. |
| 8,340,894 B2 | 12/2012 | Yester |
| 8,466,807 B2 | 6/2013 | Mudalige |
| 8,548,729 B2 | 10/2013 | Mizuguchi |
| 8,577,550 B2 | 11/2013 | Lu et al. |
| 8,587,418 B2 | 11/2013 | Mochizuki et al. |
| 8,639,426 B2 | 1/2014 | Dedes et al. |
| 8,717,192 B2 | 5/2014 | Durekovic et al. |
| 8,798,841 B1 | 8/2014 | Nickolaou et al. |
| 2007/0109111 A1 | 5/2007 | Breed et al. |
| 2007/0262881 A1 | 11/2007 | Taylor |
| 2008/0167821 A1* | 7/2008 | Breed .................. G08G 1/161 701/301 |
| 2009/0033540 A1 | 2/2009 | Breed et al. |
| 2009/0140887 A1 | 6/2009 | Breed et al. |
| 2009/0198412 A1 | 8/2009 | Shiraki |
| 2010/0169009 A1 | 7/2010 | Breed et al. |
| 2012/0016581 A1 | 1/2012 | Mochizuki et al. |
| 2012/0218093 A1 | 8/2012 | Yoshizawa et al. |
| 2013/0099911 A1 | 4/2013 | Mudalige et al. |
| 2013/0116915 A1 | 5/2013 | Ferreira et al. |
| 2013/0179047 A1 | 7/2013 | Miller et al. |
| 2013/0278440 A1 | 10/2013 | Rubin et al. |
| 2014/0025285 A1 | 1/2014 | Trombley |
| 2014/0249718 A1 | 9/2014 | Liu et al. |
| 2017/0031364 A1 | 2/2017 | Takahashi et al. |
| 2017/0113683 A1 | 4/2017 | Mudalige et al. |

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

* cited by examiner

REAR-END COLLISION AVOIDANCE

TECHNICAL FIELD

This disclosure relates to generating converging path information for use in traversing a vehicle transportation network.

BACKGROUND

A vehicle may traverse a portion of a vehicle transportation network. In the course of traversing a portion of a vehicle transportation network, a host vehicle may receive information representing one or more remote vehicles in the vehicle transportation network. Accordingly, a system, method, and apparatus for determining whether an expected path for a remote vehicle is convergent with an expected path for the host vehicle may be advantageous.

SUMMARY

Disclosed herein are aspects, features, elements, implementations, and embodiments of converging path codeword based rear-end collision avoidance.

An aspect of the disclosed embodiments is a method for use in traversing a vehicle transportation network, which may include traversing, by a host vehicle, a vehicle transportation network. Traversing the vehicle transportation network may include receiving, at the host vehicle, from a remote vehicle, via a wireless electronic communication link, a remote vehicle message, the remote vehicle message including remote vehicle information. Traversing the vehicle transportation network may include identifying host vehicle information for the host vehicle, the host vehicle information including one or more of host vehicle geospatial state information for the host vehicle, or host vehicle kinematic state information for the host vehicle. Traversing the vehicle transportation network may include determining a relative position code indicating whether an expected path for the remote vehicle and an expected path for the host vehicle are convergent based on the host vehicle information, the remote vehicle information, and a reference direction, determining a remote vehicle dynamic state code based on the remote vehicle information, determining a host vehicle dynamic state code based on the host vehicle information, identifying an expected rear-end collision condition based on the relative position code, the remote vehicle dynamic state code, and the host vehicle dynamic state code, identifying a deceleration rate for safely traversing the vehicle transportation network in response to identifying the expected rear-end collision condition, and identifying a vehicle control action based on the deceleration rate, identifying an expected rear-end collision condition based on the relative position code, the remote vehicle dynamic state code, and the host vehicle dynamic state code, and in response to identifying the expected rear-end collision condition, identifying a vehicle control action based on the host vehicle dynamic state code. Traversing the vehicle transportation network may include traversing a portion of the vehicle transportation network in accordance with the vehicle control action.

Another aspect of the disclosed embodiments is a method for use in traversing a vehicle transportation network, which may include traversing, by a host vehicle, a vehicle transportation network. Traversing the vehicle transportation network may include receiving, at a host vehicle, from a remote vehicle, via a wireless electronic communication link, a remote vehicle message, the remote vehicle message including remote vehicle information, determining a relative position code indicating geospatial location of the remote vehicle relative to the host vehicle based on the host vehicle information, the remote vehicle information, and a reference direction, determining a remote vehicle dynamic state code based on the remote vehicle information, and traversing a portion of the vehicle transportation network, wherein traversing the portion of the vehicle transportation network includes performing rear-end collision avoidance based on the relative position code and the remote vehicle dynamic state code.

Another aspect of the disclosed embodiments is a method for use in traversing a vehicle transportation network, which may include traversing, by a host vehicle, a vehicle transportation network. Traversing the vehicle transportation network may include receiving, at a host vehicle, from a remote vehicle, via a wireless electronic communication link, a remote vehicle message, the remote vehicle message including remote vehicle information, determining a relative position code indicating geospatial location of the remote vehicle relative to the host vehicle based on the host vehicle information, the remote vehicle information, and a reference direction, and determining a remote vehicle dynamic state code based on the remote vehicle information. Traversing the vehicle transportation network may include identifying an expected rear-end collision condition based on the relative position code and the remote vehicle dynamic state code, identifying a current geospatial distance between the host vehicle and the remote vehicle, and identifying a deceleration rate, wherein identifying the deceleration rate includes identifying the deceleration rate based on the current geospatial distance between the host vehicle and the remote vehicle, a current speed of the remote vehicle, and a current speed of the host vehicle, such that on a condition that the remote vehicle traverses the vehicle transportation network by decelerating in accordance with the deceleration rate, a difference between a speed of the host vehicle at a post-deceleration location and an expected speed for the remote vehicle temporally corresponding to the post-deceleration location is within a relative speed threshold for rear-end collision avoidance, and a difference between a geospatial location of the host vehicle corresponding to the post-deceleration location and an expected geospatial location for the remote vehicle corresponding to the post-deceleration location exceeds a minimum distance threshold for rear-end collision avoidance. Traversing the vehicle transportation network may include identifying a vehicle control action based on the deceleration rate, and traversing a portion of the vehicle transportation network, wherein traversing the portion of the vehicle transportation network includes operating the host vehicle in accordance with the vehicle control action by oscillating break lamps of the host vehicle at a frequency based on the deceleration rate.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
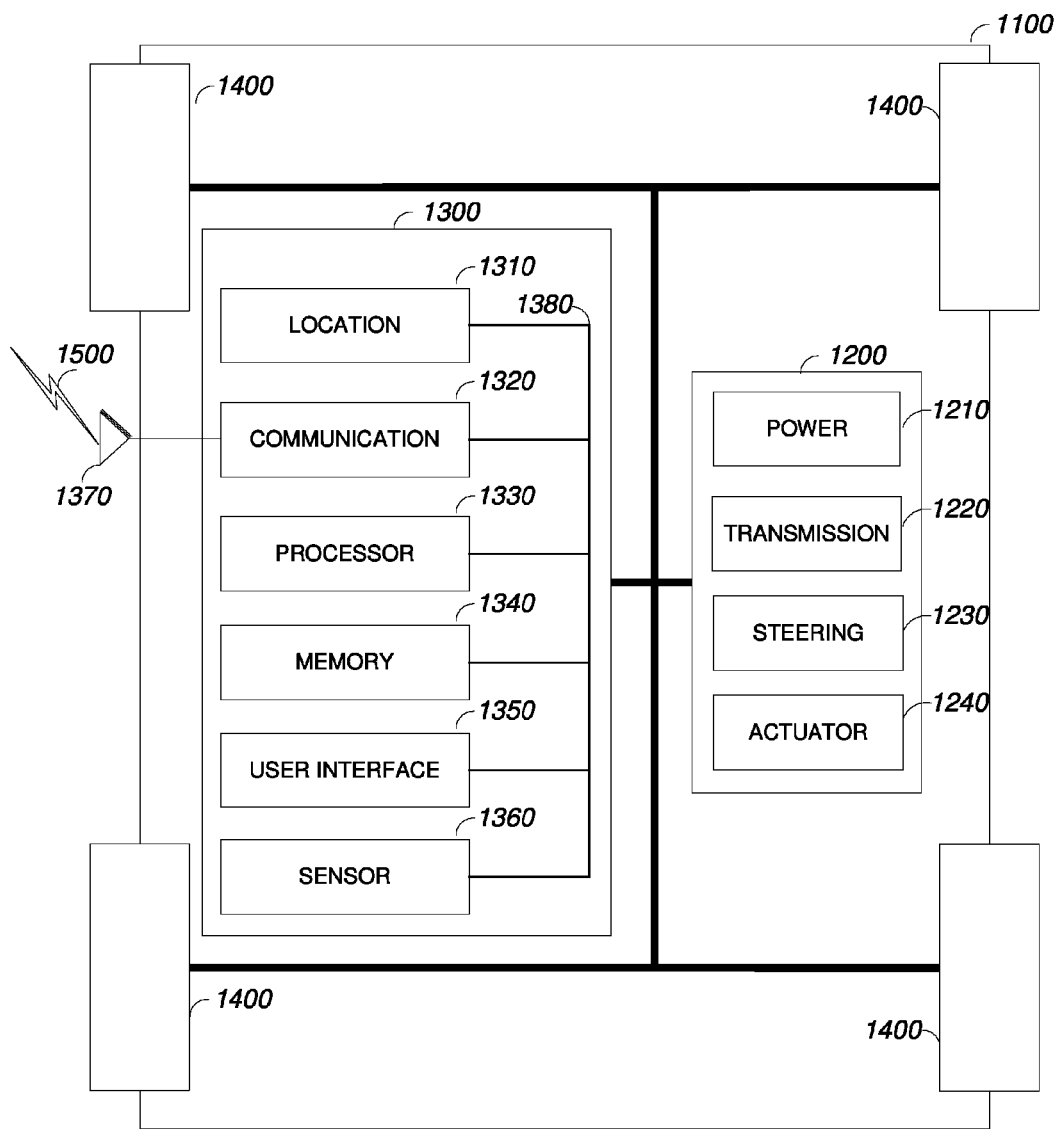
FIG. 1 is a diagram of an example of a vehicle in which the aspects, features, and elements disclosed herein may be implemented.

A host vehicle may traverse a portion of a vehicle transportation network, wherein a path of the host vehicle may intersect with respective paths of remote vehicles. To avoid collision between the host vehicle and the remote vehicles, and to improve the efficiency of the traversal, the host vehicle may determine whether an expected path for a remote vehicle, such as a remote vehicle within a defined spatial distance from the host vehicle, is convergent with an expected path for the host vehicle.

In some embodiments, the host vehicle may determine whether an expected path for a remote vehicle is convergent with an expected path for the host vehicle based, at least in part, on information for the remote vehicle, such as location information, heading information, or kinetic state information. In some embodiments, determining whether an expected path for a remote vehicle is convergent with an expected path for a host vehicle may include generating a relative position code indicating whether the expected path for a remote vehicle is convergent with the expected path for the host vehicle.

In some embodiments, the host vehicle may identify a remote vehicle dynamic state code indicating a dynamic state of the remote vehicle, such as whether the remote vehicle is in motion, a steering direction for the remote vehicle, a transmission state of the remote vehicle, a turn signal state for the remote vehicle, or the like. In some embodiments, the host vehicle may identify a host vehicle dynamic state code indicating a dynamic state of the host vehicle, such as whether the host vehicle is in motion, a steering direction for the host vehicle, a transmission state of the host vehicle, a turn signal state for the host vehicle, or the like.

In some embodiments, based on the relative position code, the remote vehicle dynamic state code, and the host vehicle dynamic state code, the host vehicle may identify an expected rear-end collision condition, which may indicate an expected collision between the host vehicle and the remote vehicle associated with traversing a portion of the vehicle transportation network by changing lanes.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle in which the aspects, features, and elements disclosed herein may be implemented. In some embodiments, a vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine—Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person. In some embodiments, the user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
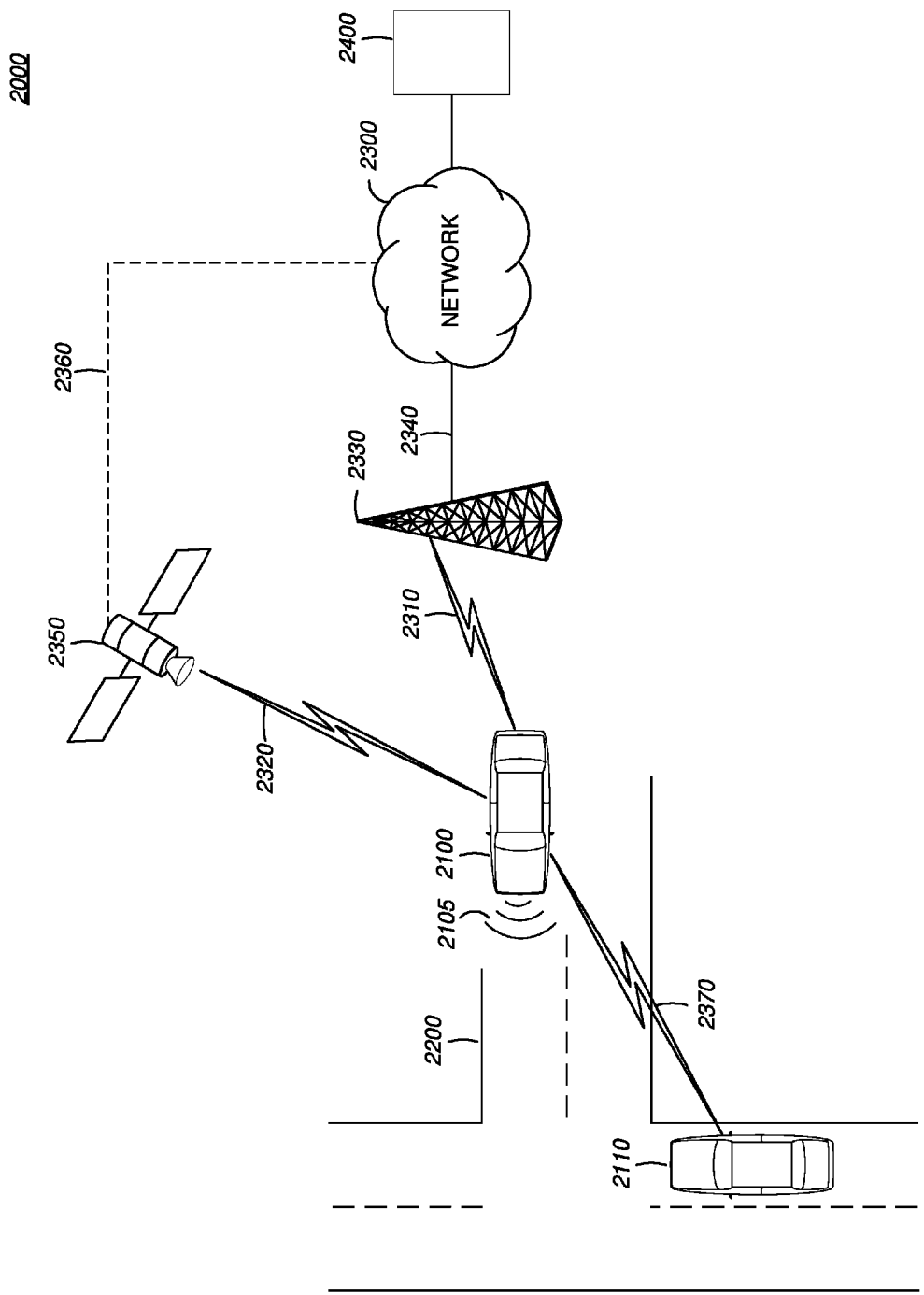
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically, based on, for example, a defined interval, such as 100 milliseconds.

In some embodiments, the host vehicle may receive remote vehicle information for remote vehicles within an adjustable range. For example, a host vehicle traversing a portion of a vehicle transportation network in an urban area may adjust the range to receive remote vehicle information for remote vehicles within an urban range, such as 300 meters, and a host vehicle traversing a portion of a vehicle transportation network in a rural area may adjust the range to receive remote vehicle information for remote vehicles within a rural range, such as 500 meters, or more. In some embodiments, the host vehicle may adjust the range based on a vehicle operation, such as passing another vehicle using an oncoming traffic lane. For example, a host vehicle may traverse a portion of the vehicle transportation network using a range of 300 meters, the host vehicle may begin pass another vehicle using an oncoming traffic lane, the host vehicle may increase the range to 500 meters, the host vehicle may complete passing the other vehicle, and the host vehicle may resume traversing the vehicle transportation network using the 300-meter range.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

In some embodiments, the vehicle 2100 may communicate with the communications network 2300 via an access point 2330. An access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 may communicate with the communications network 2300 via a satellite 2350, or other non-terrestrial communication device. A satellite 2350, which may include a computing device, may be configured to communicate with a vehicle 2100, with a communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

FIGS. 3-30 show examples of diagrams representing vehicles operating in one or more portions of one or more vehicle transportation networks. For simplicity and clarity, a host vehicle is shown with stippling and remote vehicles, if shown, are shown in white. For simplicity and clarity, the diagrams shown in FIGS. 3-20 and 22-30 are oriented with north at the top and east at the right side. In some embodiments, a defined geospatial range is shown as approximately 300 meters; however, other ranges may be used.

Figure 3:
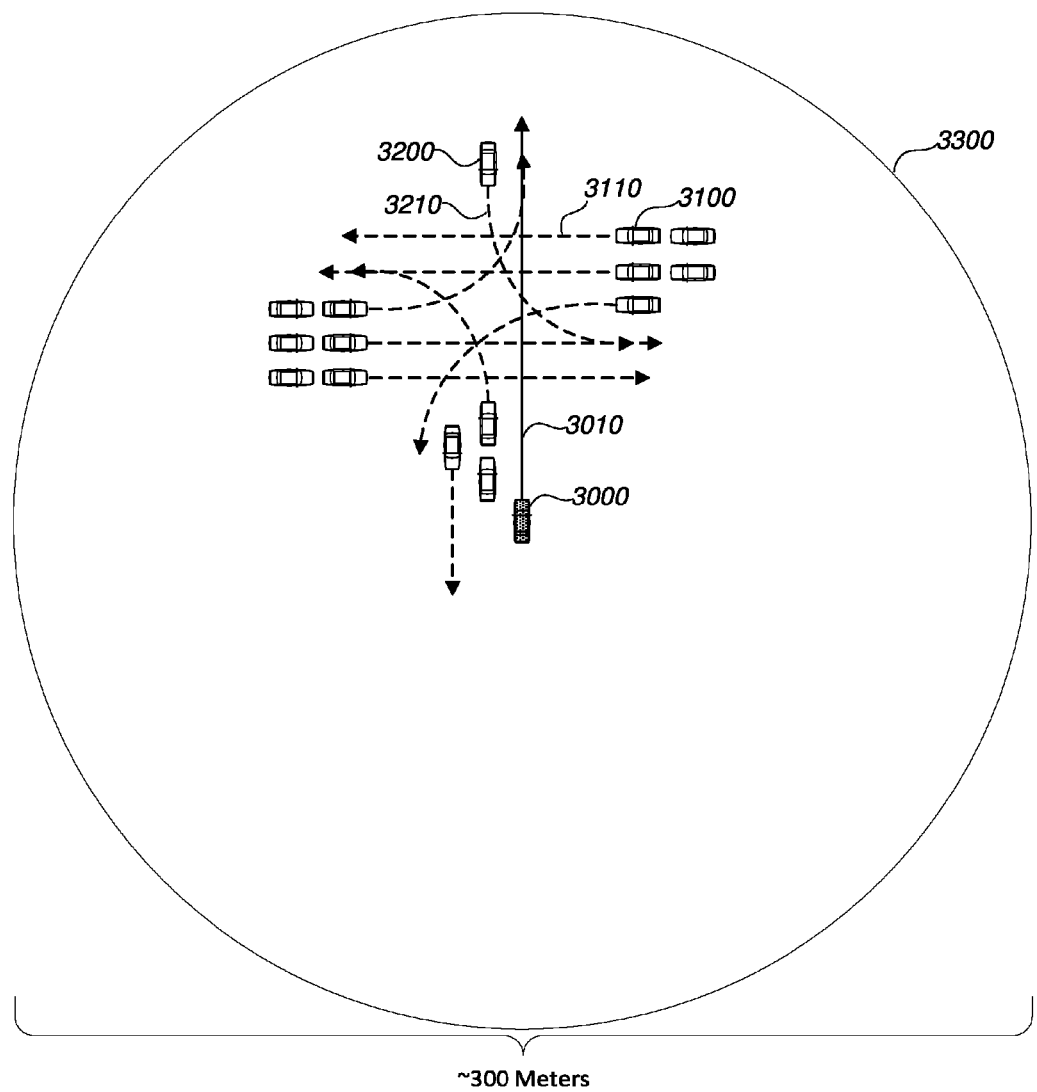
FIG. 3 is a diagram of geospatially locating remote vehicles based on automated inter-vehicle messages for use in generating converging path information in accordance with this disclosure.

FIG. 3 is a diagram of geospatially locating remote vehicles based on automated inter-vehicle messages for use in generating converging path information in accordance with this disclosure. Geospatially locating remote vehicles based on automated inter-vehicle messages may be implemented in a vehicle, such as the vehicle 1000 shown in FIG. 1 or the vehicles 2100/2110 shown in FIG. 2. In some embodiments, one or more of the vehicles shown in FIG. 3, including the remote vehicles, the host vehicle, or both, may be stationary or may be in motion.

In some embodiments, a host vehicle 3000 may traverse a portion of a vehicle transportation network (not expressly shown), may receive automated inter-vehicle communications from one or more remote vehicles 3100/3200 within a defined geospatial range 3300, and may transmit automated inter-vehicle communications to one or more remote vehicles 3100/3200 within the defined geospatial range 3300. For simplicity and clarity, an automated inter-vehicle communication received by a host vehicle from a remote vehicle may be referred to herein as a remote vehicle message. For example, the host vehicle 3000 may receive the remote vehicle messages via a wireless electronic communication link, such as the wireless electronic communication link 2370 shown in FIG. 2.

In some embodiments, the automated inter-vehicle messages may indicate information such as geospatial location information and heading information. In some embodiments, the host vehicle 3000 may transmit one or more automated inter-vehicle messages including host vehicle information, such as host vehicle heading information. For example, as shown in FIG. 3, the host vehicle heading information may indicate that the host vehicle 3000 is heading straight ahead. In some embodiments, a remote vehicle 3100 may transmit one or more automated inter-vehicle messages including remote vehicle information, such as remote vehicle heading information. For example, the remote vehicle heading information may indicate that the remote vehicle 3100 is heading straight west. In another example, a remote vehicle 3200 may transmit one or more automated inter-vehicle messages including remote vehicle information that includes remote vehicle heading information, which may indicate that the remote vehicle 3100 is heading south.

In some embodiments, the host vehicle 3000 may identify a host vehicle expected path for the host vehicle 3010 based on host vehicle information, such as host vehicle geospatial state information and host vehicle kinematic state information. In some embodiments, the host vehicle 3000 may identify a remote vehicle expected path for a remote vehicle based on the automated inter-vehicle messages, which may include remote vehicle information, such as remote vehicle geospatial state information and remote vehicle kinematic state information. For example, the remote vehicle messages transmitted by the remote vehicle 3100 in the upper right of FIG. 3 may indicate that the remote vehicle 3100 is heading west and the host vehicle 3000 may identify the remote vehicle expected path 3110 for the remote vehicle 3100. In another example, the remote vehicle messages transmitted by the remote vehicle 3200 in the upper left of FIG. 3 may indicate that the remote vehicle 3200 is heading south, and may include navigation information, such as turn signal information indicating a left turn, and the host vehicle 3000 may identify the remote vehicle expected path 3210 for the remote vehicle 3200.

For simplicity and clarity, the heading and expected path of the host vehicle 3000 are shown as a solid directional line and the expected paths of respective remote vehicles are shown as directional broken lines. Expected paths are omitted from FIG. 3 for some vehicles for simplicity and clarity.

Figure 4:
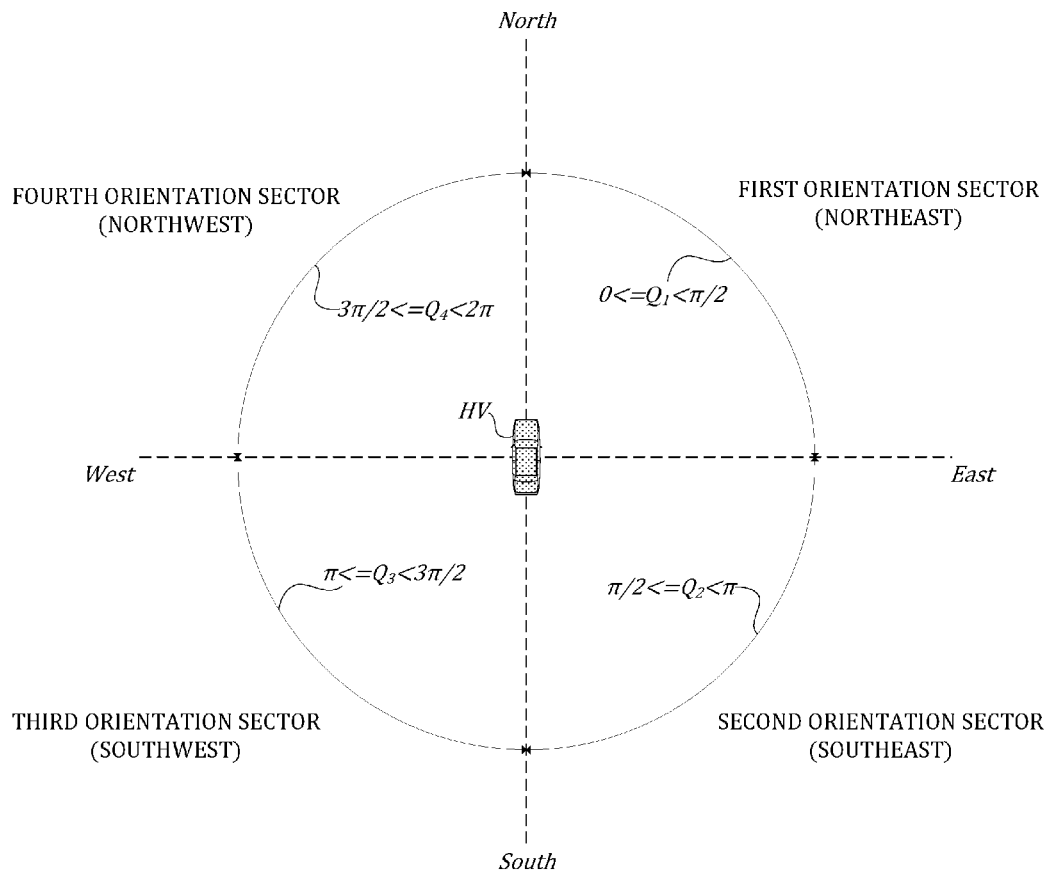
FIG. 4 is a diagram of orientation sectors for generating converging path information in accordance with this disclosure.

FIG. 4 is a diagram showing orientation sectors for generating converging path information in accordance with this disclosure. In some embodiments, generating converging path information may include determining an orientation sector ($Q_n$), which may indicate a quantized geospatial location, position, or direction, of a remote vehicle, relative to the host vehicle, in the geospatial domain. In some embodiments, locations relative to the host vehicle location may be quantized into a defined number, quantity, count, or cardinality, of orientation sectors (Q). For example, the defined set of orientation sectors (Q) may include four orientation sectors, or quadrants, which may include ninety degrees, or $\pi/2$ radians, each. However, any number, size, and direction of orientation sectors may be used. Although the host vehicle is shown in FIG. 4 as heading north, the orientation sector may be identified relative to the host vehicle geospatial location independently of the heading, path, or route of the host vehicle.

In some embodiments, the defined set of orientation sectors may be identified in the geospatial domain relative to the host vehicle and a reference direction, such as north. For example, relative to the host vehicle, the reference direction, north, may correspond with zero degrees or radians (0°, 360°, $2\pi$), east may correspond with ninety degrees (90°) or $\pi/2$ radians, south may correspond with 180 degrees (180°) or it radians, and west may correspond with 270 degrees (270°) or $3\pi/2$ radians.

As shown in FIG. 4, in some embodiments, the orientation sectors (Q) may include a first orientation sector $Q_1$ to the northeast of the host vehicle, which may include locations from north (0, 0°, 360°, $2\pi$) to east (90° or $\pi/2$), which may be expressed as $0<=Q_1<\pi/2$. The orientation sectors (Q) may include a second orientation sector $Q_2$ to the southeast of the host vehicle, which may include locations from east (90° or $\pi/2$) to south (180° or $\pi$), which may be expressed as $\pi/2<=Q_2<\pi$. The orientation sectors (Q) may include a third orientation sector $Q_3$ to the southwest of the host vehicle, which may include locations from south (180° or $\pi$) to west (270° or $3\pi/2$), which may be expressed as $\pi<=Q_3<3\pi/2$. The orientation sectors (Q) may include a fourth orientation sector $Q_4$ to the northwest of the host vehicle, which may include locations from west (270° or $3\pi/2$) to north (0°, 360°, $2\pi$, or 0), which may be expressed as $3\pi/2<=Q_4<2\pi$.

In some embodiments, generating converging path information may include identifying inter-vehicle state information, such as information describing the geospatial position and expected path of respective remote vehicles relative to the host vehicle location and expected path. Examples of generating converging path information using the first orientation sector $Q_1$ are shown in FIGS. 5-8. Examples of generating converging path information using the second orientation sector $Q_2$ are shown in FIGS. 9-12. Examples of generating converging path information using the third orientation sector $Q_3$ are shown in FIGS. 13-16. Examples of generating converging path information using the fourth orientation sector $Q_4$ are shown in FIGS. 17-20.

In some embodiments, a remote vehicle (RV) may be identified in the first orientation sector $Q_1$, to the northeast of the host vehicle (HV), as shown in FIGS. 5-8. For example, the latitude of the remote vehicle may be greater than the latitude for the host vehicle, the longitude for remote vehicle may be greater than the longitude for the host vehicle, and the remote vehicle may be identified as being in the first orientation sector $Q_1$, which may be expressed as the following:

$$Q_1 = \frac{1}{4}\left[\frac{\phi_{RV} - \phi_{HV} - \sigma}{|\phi_{RV} - \phi_{HV}| + \sigma} + 1\right] \times \left[\frac{\theta_{RV} - \theta_{HV} + \sigma}{|\theta_{RV} - \theta_{HV}| + \sigma} + 1\right].$$ [Equation 1]

For example, the latitude of the remote vehicle may be greater than the latitude for the host vehicle, the longitude for remote vehicle may be greater than the longitude for the host vehicle, Equation 1 may evaluate to one, and the remote vehicle may be identified as being in the first orientation sector $Q_1$. In some embodiments, the remote vehicle may be in an orientation sector other than the first orientation sector $Q_1$ and Equation 1 may evaluate to zero.

Figure 5:
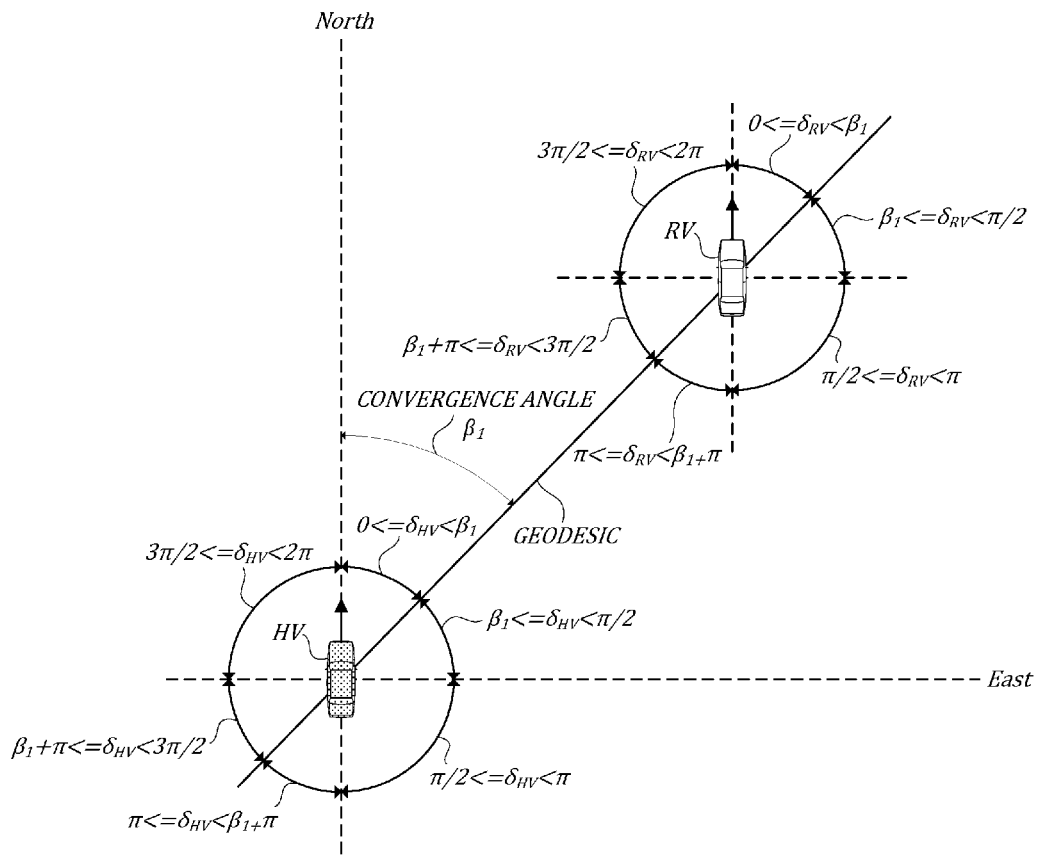
FIG. 5 is a diagram of identifying inter-vehicle state information including a geodesic for a first orientation sector for use in generating converging path information in accordance with this disclosure.

FIG. 5 is a diagram of identifying inter-vehicle state information including a geodesic for a first orientation sector for use in generating converging path information in accordance with this disclosure. Identifying inter-vehicle state information may be implemented in a vehicle, such as the vehicle 1000 shown in FIG. 1 or the vehicles 2100/2110 shown in FIG. 2.

In some embodiments, as shown in FIG. 5, generating converging path information may include determining a convergence angle $\beta_1$ for a geodesic between the host vehicle (HV) and a respective remote vehicle (RV). A geodesic may indicate a geospatially direct line between a host vehicle and a respective remote vehicle, and may be determined relative to the host vehicle in the geospatial domain. The geodesic may be the shortest straight navigable or unnavigable line between the host vehicle and the remote vehicle respective of the curvature of the earth. In FIGS. 5-20 the geodesic is shown as a solid line intersecting with the host vehicle and the remote vehicle. Although the geodesic is shown as extending beyond the vehicles for clarity, the length of the geodesic may correspond with a geospatially direct line distance between the host vehicle and the remote vehicle. In some embodiments, generating converging path information may include determining a convergence angle $\beta_1$ for the geodesic. The convergence angle $\beta_1$ may indicate an angle between the geodesic and a reference direction relative to the host vehicle in the geospatial domain, such as north. For simplicity, in FIG. 5 the vehicles are shown heading north; however, the geodesic and convergence angle $\beta_1$ may be identified independently of vehicle heading. Although described herein with reference to a reference direction of north, other reference directions may be used. For example, in some embodiments, projected vehicle transportation network information may be generated using the direction of the geodesic as the reference direction and the convergence angle $\beta_1$ may be zero degrees. For simplicity and clarity, the angles described herein, such as convergence angle $\beta_1$ are identified clockwise.

In some embodiments, the geodesic may be determined based on host vehicle information, such as a geospatial location of the host vehicle, remote vehicle information, such as a geospatial location of the remote vehicle, or a combination thereof. For example, the host vehicle information may indicate a longitude ($\theta_{HV}$) for the host vehicle, a latitude ($\phi_{HV}$) for the host vehicle, or both, the remote vehicle information may indicate a longitude ($\theta_{RV}$) for the remote vehicle, a latitude ($\phi_{RV}$) for the remote vehicle, or both, $\sigma$ may indicate a very small value, such as a value of a magnitude of $10^{-9}$, used to avoid dividing by zero, and determining the convergence angle $\beta_1$ may be expressed as the following:

$$\beta_1 = \pi \left[ \frac{\theta_{HV} - \theta_{RV} - \sigma}{|\theta_{HV} - \theta_{RV}| + \sigma} + 1 \right] - \quad \text{[Equation 2]}$$
$$\cos^{-1}\left( \frac{(\phi_{RV} - \phi_{HV})}{\sqrt{(\theta_{RV} - \theta_{HV})^2 \cos^2\phi_{HV} + (\phi_{RV} - \phi_{HV})^2}} \right)$$
$$\left[ \frac{\theta_{HV} - \theta_{RV} - \sigma}{|\theta_{HV} - \theta_{RV}| + \sigma} \right].$$

In some embodiments, a length of the geodesic, which may correspond to a geospatially direct line distance, or instantaneous distance, D between the host vehicle and the remote vehicle, may be determined based on the host vehicle information, the remote vehicle information, or a combination thereof. For example, f may indicate an earth flattening value, such as f=298.257223563, $r_e$ may indicate a measure of the earth's equatorial radius, such as $r_e$=6,378,137 meters, and determining the distance D may be expressed as the following:

$$D = (1-f)r_e \sqrt{\frac{(\theta_{RV} - \theta_{HV})^2 \cos^2\phi_{HV} + (\phi_{RV} - \phi_{HV})^2}{\sin^2\phi_{HV} + (1-f)^2 \cos^2\phi_{HV}}} \quad \text{[Equation 3]}$$

In some embodiments, generating converging path information may include determining an orientation sector, as shown in FIG. 4, which may indicate a geospatial location of a remote vehicle relative to the host vehicle, which may correspond with the convergence angle $\beta_1$, which may indicate the location of the geodesic relative to the reference direction and the host vehicle.

In some embodiments, generating converging path information may include determining a host vehicle region for the host vehicle, as shown in FIG. 5. The host vehicle region may indicate a quantization of a host vehicle heading angle $\delta_{HV}$, which may indicate the host vehicle heading or expected path relative to the host vehicle and the geodesic in the geospatial domain. For example, relative to the orientation sector, directions from the host vehicle may be quantized into a defined cardinality of regions, such as six regions as shown.

For example, for the first orientation sector $Q_1$, the remote vehicle, and the geodesic, is located to the northeast of the host vehicle in the geospatial domain. A first host vehicle region may include host vehicle heading angles $\delta_{HV}$ from the reference direction, which may correspond with north, to the convergence angle $\beta_1$ of the geodesic, which may be expressed as $0 <= \delta_{HV} < \beta_1$. A second host vehicle region may include host vehicle heading angles $\delta_{HV}$ from the convergence angle $\beta_1$ of the geodesic to ninety degrees, which may correspond with east, and which may be expressed as $\beta_1 <= \delta_{HV} < \pi/2$. A third host vehicle region may include host vehicle heading angles $\delta_{HV}$ from ninety degrees to 180 degrees, which may correspond with south, and which may be expressed as $\pi/2 <= \delta_{HV} < \pi$. A fourth host vehicle region may include host vehicle heading angles $\delta_{HV}$ from 180 degrees to the opposite of the convergence angle $\beta_1 + \pi$ of the geodesic, which may be expressed as $\pi <= \delta_{HV} < \beta_1 + \pi$. A fifth host vehicle region may include host vehicle heading angles $\delta_{HV}$ from the opposite, with respect to the vertical, of the convergence angle $\beta_1 + \pi$ of the geodesic, to 270 degrees, which may correspond with west, and which may be expressed as $\beta_1 + \pi <= \delta_{HV} < 3\pi/2$. A sixth host vehicle region may include host vehicle heading angles $\delta_{HV}$ from 270 degrees to 360 degrees, which may correspond with the reference direction, north, and the sixth host vehicle region may be expressed as $3\pi/2 <= \delta_{HV} < 2\pi$.

In some embodiments, generating converging path information may include determining a remote vehicle region for the remote vehicle. The remote vehicle region may indicate a quantization of a remote vehicle heading angle $\delta_{RV}$, which may indicate the remote vehicle heading or expected path, relative to the remote vehicle and the geodesic in the geospatial domain, and which may be determined relative to the orientation sector. For example, relative to the orientation sector, directions from the remote vehicle may be quantized into a defined cardinality of regions, such as six regions as shown, which may correspond with the host vehicle regions.

For example, for the first orientation sector $Q_1$, a first remote vehicle region may include remote vehicle heading angles $\delta_{RV}$ from the reference direction, which may correspond with north, to the convergence angle $\beta_1$ of the geodesic, which may be expressed as $0 <= \delta_{RV} < \beta_1$. A second remote vehicle region may include remote vehicle heading angles $\delta_{RV}$ from the convergence angle $\beta_1$ of the geodesic to ninety degrees, which may correspond with east, and which may be expressed as $\beta_1 <= \delta_{RV} < \pi/2$. A third remote vehicle region may include remote vehicle heading angles $\delta_{RV}$ from ninety degrees to 180 degrees, which may correspond with south, and which may be expressed as $\pi/2 <= \delta_{RV} < \pi$. A fourth remote vehicle region may include remote vehicle heading angles $\delta_{RV}$ from 180 degrees to the opposite of the convergence angle $\beta_1 + \pi$ of the geodesic, which may be expressed as $\pi <= \delta_{RV} < \beta_1 + \pi$. A fifth remote vehicle region may include remote vehicle heading angles $\delta_{RV}$ from the opposite of the convergence angle $\beta_1 + \pi$ of the geodesic, to 270 degrees, which may correspond with west, and which may be expressed as $\beta_1 + \pi <= \delta_{RV} < 3\pi/2$. A sixth remote vehicle region may include remote vehicle heading angles $\delta_{RV}$ from 270 degrees to 360 degrees, which may correspond with the reference direction, north, and which may be expressed as $3\pi/2 <= \delta_{RV} < 2\pi$.

Figure 6:
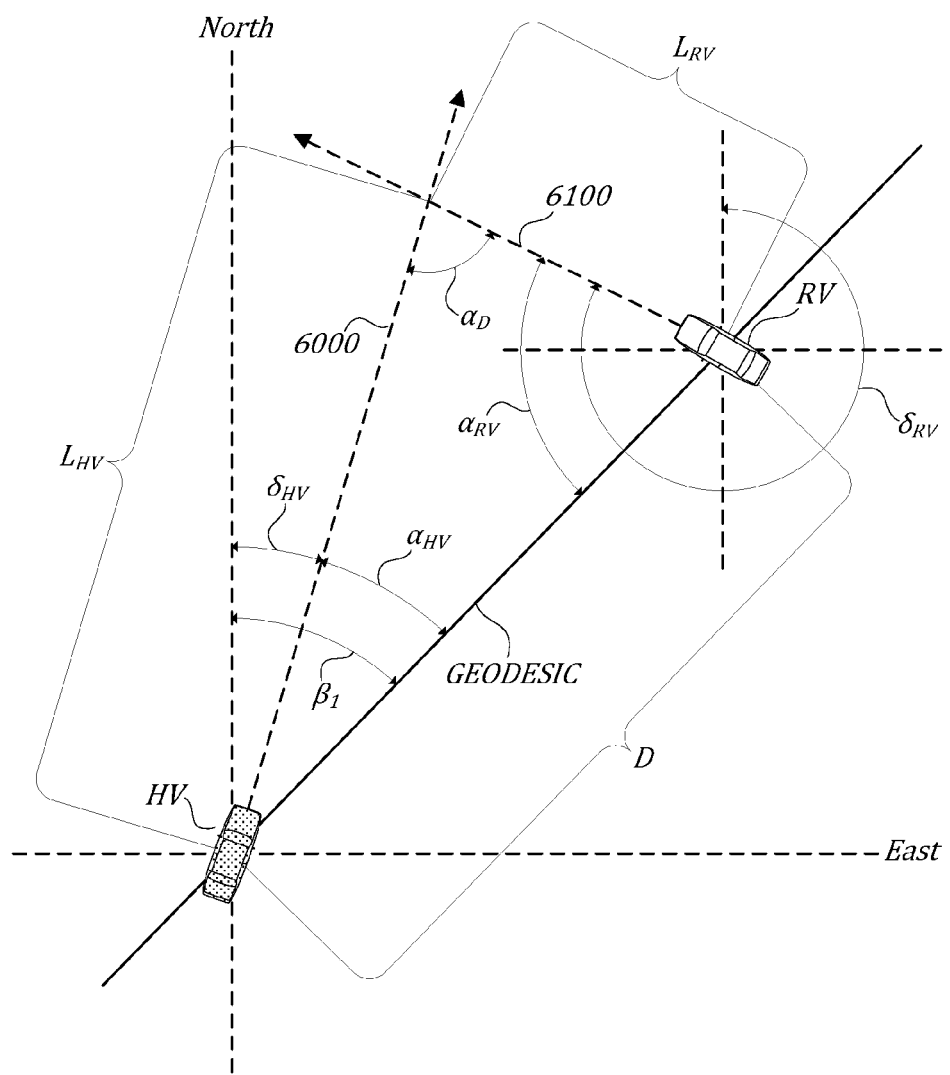
FIG. 6 is a diagram of identifying inter-vehicle state information including convergence information for the first orientation sector for use in generating converging path information in accordance with this disclosure.

FIG. 6 is a diagram of identifying inter-vehicle state information including convergence information for the first orientation sector for use in generating converging path information in accordance with this disclosure. Identifying inter-vehicle state information may be implemented in a vehicle, such as the vehicle 1000 shown in FIG. 1 or the vehicles 2100/2110 shown in FIG. 2.

In some embodiments, for the first orientation sector $Q_1$, generating converging path information may include identifying a host vehicle expected path 6000 for the host vehicle (HV), identifying respective remote vehicle expected paths 6100 for one or more of the remote vehicles (RV), or identifying respective expected paths 6000/6100 for the host vehicle and for one or more of the remote vehicles. In some embodiments, the expected paths may be projected, such as in a straight line, from the respective heading information.

In some embodiments, generating converging path information may include determining whether the remote vehicle expected path 6100 and the host vehicle expected path 6000 are convergent, which may indicate that the host vehicle expected path 6000 and the respective remote vehicle expected path 6100 intersect.

In some embodiments, for the first orientation sector $Q_1$, determining whether the remote vehicle expected path 6100 and the host vehicle expected path 6000 are convergent may include examining defined convergence data, such as Table 1 below. In Table 1 a value of zero (0) indicates that the remote vehicle expected path 6100 and the host vehicle expected path are not convergent and do not cross, a value of one (1) indicates that the remote vehicle expected path 6100 and the host vehicle expected path 6000 are convergent and do cross. A value of $\eta_{HV}$ indicates that the remote vehicle expected path 6100 and the host vehicle expected path 6000 are convergent and do cross if the host vehicle heading angle $\delta_{HV}$ is greater than the remote vehicle heading angle $\delta_{RV}$ and are not convergent and do not cross if the remote vehicle heading angle $\delta_{RV}$ is at least the host vehicle heading angle $\delta_{HV}$. A value of $\eta_{RV}$ indicates that the remote vehicle expected path 6100 and the host vehicle expected path 6000 are convergent and do cross if the host vehicle heading angle $\delta_{HV}$ is less than the remote vehicle heading angle $\delta_{RV}$ and are not convergent and do not cross if the host vehicle heading angle $\delta_{HV}$ is at least the remote vehicle heading angle $\delta_{RV}$. The notation $HV_n$ indicates that the host vehicle region is region n. For example, $HV_1$ indicates that the host vehicle region is the first region and $HV_6$ indicates that the host vehicle region is the sixth region. The notation $RV_n$ indicates that the remote vehicle region is region n. For example, $RV_1$ indicates that the remote vehicle region is the first region and $RV_6$ indicates that the remote vehicle region is the sixth region.

TABLE 1

|        | $RV_1$      | $RV_2$      | $RV_3$      | $RV_4$      | $RV_5$      | $RV_6$      |
|--------|-------------|-------------|-------------|-------------|-------------|-------------|
| $HV_1$ | $\eta_{HV}$ | 0           | 0           | 0           | 1           | 1           |
| $HV_2$ | 0           | $\eta_{RV}$ | 1           | 1           | 0           | 0           |
| $HV_3$ | 0           | 0           | $\eta_{RV}$ | 1           | 0           | 0           |
| $HV_4$ | 0           | 0           | 0           | $\eta_{RV}$ | 0           | 0           |
| $HV_5$ | 0           | 0           | 0           | 0           | $\eta_{HV}$ | 0           |
| $HV_6$ | 0           | 0           | 0           | 0           | 1           | $\eta_{HV}$ |

In some embodiments, for the first orientation sector $Q_1$, determining $\eta_{HV}$ may be expressed as the following:

$$\eta_{HV} = \frac{1}{2}\left[\frac{\delta_{HV} - \delta_{RV} - \sigma}{|\delta_{RV} - \delta_{HV}| + \sigma} + 1\right]. \quad \text{[Equation 4]}$$

In some embodiments, for the first orientation sector $Q_1$, determining $\eta_{RV}$ may be expressed as the following:

$$\eta_{RV} = \frac{1}{2}\left[\frac{\delta_{RV} - \delta_{HV} - \sigma}{|\delta_{RV} - \delta_{HV}| + \sigma} + 1\right]. \quad \text{[Equation 5]}$$

In some embodiments, for the first orientation sector $Q_1$, a combination ($F_{m,n}$) of the host vehicle heading angle $\delta_{HV}$ and the remote vehicle heading angle $\delta_{RV}$ may be expressed as shown in Tables 2-4.

TABLE 2

| $F_{m,n}$ | $RV_1$           | $RV_2$           | $RV_3$           | $RV_4$           | $RV_5$           | $RV_6$           |
|-----------|------------------|------------------|------------------|------------------|------------------|------------------|
| $HV_1$    | $H_1 \times R_1$ | $H_1 \times R_2$ | $H_1 \times R_3$ | $H_1 \times R_4$ | $H_1 \times R_5$ | $H_1 \times R_6$ |
| $HV_2$    | $H_2 \times R_1$ | $H_2 \times R_2$ | $H_2 \times R_3$ | $H_2 \times R_4$ | $H_2 \times R_5$ | $H_2 \times R_6$ |
| $HV_3$    | $H_3 \times R_1$ | $H_3 \times R_2$ | $H_3 \times R_3$ | $H_3 \times R_4$ | $H_3 \times R_5$ | $H_3 \times R_6$ |
| $HV_4$    | $H_4 \times R_1$ | $H_4 \times R_2$ | $H_4 \times R_3$ | $H_4 \times R_4$ | $H_4 \times R_5$ | $H_4 \times R_6$ |
| $HV_5$    | $H_5 \times R_1$ | $H_5 \times R_2$ | $H_5 \times R_3$ | $H_5 \times R_4$ | $H_5 \times R_5$ | $H_5 \times R_6$ |
| $HV_6$    | $H_6 \times R_1$ | $H_6 \times R_2$ | $H_6 \times R_3$ | $H_6 \times R_4$ | $H_6 \times R_5$ | $H_6 \times R_6$ |

TABLE 3

| $H_1$ | $\frac{1}{4}\left[\frac{\delta_{HV} - 0 - \sigma}{|\delta_{HV} - 0| + \sigma} + 1\right] \times \left[\frac{\beta_1 - \delta_{HV} - \sigma}{|\beta_1 - \delta_{HV}| + \sigma} + 1\right]$ |
|-------|---|
| $H_2$ | $\frac{1}{4}\left[\frac{\delta_{HV} - \beta_1 - \sigma}{|\delta_{HV} - \beta_1| + \sigma} + 1\right] \times \left[\frac{\frac{\pi}{2} - \delta_{HV} - \sigma}{\left|\frac{\pi}{2} - \delta_{HV}\right| + \sigma} + 1\right]$ |
| $H_3$ | $\frac{1}{4}\left[\frac{\delta_{HV} - \frac{\pi}{2} - \sigma}{\left|\delta_{HV} - \frac{\pi}{2}\right| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\beta_1 + \pi - \delta_{HV} - \sigma}{|\beta_1 + \pi - \delta_{HV}| + \sigma} + 1\right]$ |
| $H_5$ | $\frac{1}{4}\left[\frac{\delta_{HV} - (\beta_1 + \pi) - \sigma}{|\delta_{HV} - (\beta_1 + \pi)| + \sigma} + 1\right] \times \left[\frac{\frac{3\pi}{2} - \delta_{HV} - \sigma}{\left|\frac{3\pi}{2} - \delta_{HV}\right| + \sigma} + 1\right]$ |
| $H_6$ | $\frac{1}{4}\left[\frac{\delta_{HV} - \frac{3\pi}{2} - \sigma}{\left|\delta_{HV} - \frac{3\pi}{2}\right| + \sigma} + 1\right] \times \left[\frac{2\pi - \delta_{HV} - \sigma}{|2\pi - \delta_{HV}| + \sigma} + 1\right]$ |

TABLE 4

| $R_1$ | $\frac{1}{4}\left[\frac{\delta_{RV} - 0 - \sigma}{|\delta_{RV} - 0| + \sigma} + 1\right] \times \left[\frac{\beta_1 - \delta_{RV} - \sigma}{|\beta_1 - \delta_{RV}| + \sigma} + 1\right]$ |
|-------|---|
| $R_2$ | $\frac{1}{4}\left[\frac{\delta_{RV} - \beta_1 - \sigma}{|\delta_{RV} - \beta_1| + \sigma} + 1\right] \times \left[\frac{\frac{\pi}{2} - \delta_{RV} - \sigma}{\left|\frac{\pi}{2} - \delta_{RV}\right| + \sigma} + 1\right]$ |
| $R_3$ | $\frac{1}{4}\left[\frac{\delta_{RV} - \frac{\pi}{2} - \sigma}{\left|\delta_{RV} - \frac{\pi}{2}\right| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\beta_1 + \pi - \delta_{RV} - \sigma}{|\beta_1 + \pi - \delta_{RV}| + \sigma} + 1\right]$ |

TABLE 4-continued

| | |
|---|---|
| $R_5$ | $\frac{1}{4}\left[\frac{\delta_{RV}-(\beta_1+\pi)-\sigma}{|\delta_{RV}-(\beta_1+\pi)|+\sigma}+1\right]\times\left[\frac{\frac{3\pi}{2}-\delta_{RV}-\sigma}{\left|\frac{3\pi}{2}-\delta_{RV}\right|+\sigma}+1\right]$ |
| $R_6$ | $\frac{1}{4}\left[\frac{\delta_{RV}-\frac{3\pi}{2}-\sigma}{\left|\delta_{RV}-\frac{3\pi}{2}\right|+\sigma}+1\right]\times\left[\frac{2\pi-\delta_{RV}-\sigma}{|2\pi-\delta_{RV}|+\sigma}+1\right]$ |

In some embodiments, for the first orientation sector $Q_1$, generating converging path information may include determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 5.

TABLE 5

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_2$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_3$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_4$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_5$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ |
| $HV_6$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ |

In some embodiments, for the first orientation sector $Q_1$, generating converging path information may include determining a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 6.

TABLE 6

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $\delta_{RV}-\beta_1+\pi$ | 0 | 0 | 0 | $\delta_{RV}-\beta_1-\pi$ | $\delta_{RV}-\beta_1-\pi$ |
| $HV_2$ | 0 | $-(\delta_{RV}-\beta_1-\pi)$ | $-(\delta_{RV}-\beta_1-\pi)$ | $-(\delta_{RV}-\beta_1-\pi)$ | 0 | 0 |
| $HV_3$ | 0 | 0 | $-(\delta_{RV}-\beta_1-\pi)$ | $-(\delta_{RV}-\beta_1-\pi)$ | 0 | 0 |
| $HV_4$ | 0 | 0 | 0 | $-(\delta_{RV}-\beta_1-\pi)$ | 0 | 0 |
| $HV_5$ | 0 | 0 | 0 | 0 | $\delta_{RV}-\beta_1-\pi$ | 0 |
| $HV_6$ | 0 | 0 | 0 | 0 | $\delta_{RV}-\beta_1-\pi$ | $\delta_{RV}-\beta_1-\pi$ |

In some embodiments, for the first orientation sector $Q_1$, generating converging path information may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 7.

TABLE 7

| $\alpha_D=$ | $RV_1$ | $RV_2$ | $RV_3$ | $RV_4$ | $RV_5$ | $RV_6$ |
|---|---|---|---|---|---|---|
| $HV_1$ | $\delta_{HV}-\delta_{RV}$ | 0 | 0 | 0 | $2\pi-\delta_{HV}-\delta_{RV}$ | $2\pi-\delta_{HV}-\delta_{RV}$ |
| $HV_2$ | 0 | $-(\delta_{HV}-\delta_{RV})$ | $-(\delta_{HV}-\delta_{RV})$ | $-(\delta_{HV}-\delta_{RV})$ | 0 | 0 |
| $HV_3$ | 0 | 0 | $-(\delta_{HV}-\delta_{RV})$ | $-(\delta_{HV}-\delta_{RV})$ | 0 | 0 |
| $HV_4$ | 0 | 0 | 0 | $-(\delta_{HV}-\delta_{RV})$ | 0 | 0 |
| $HV_5$ | 0 | 0 | 0 | 0 | $\delta_{RV}-\beta_1-\pi$ | 0 |
| $HV_6$ | 0 | 0 | 0 | 0 | $\delta_{HV}-\delta_{RV}$ | $\delta_{HV}-\delta_{RV}$ |

In FIG. 6, $L_{HV}$ indicates a distance from the host vehicle to the projected point of convergence with the remote vehicle expected path 6100, and $L_{RV}$ indicates a distance from the remote vehicle to the projected point of convergence with the host vehicle expected path 6000.

In some embodiments, generating converging path information may include determining relative position information, relative elevation information, relative heading information, or a combination thereof. In some embodiments, relative position information may be determined based on an orientation sector, such as an orientation sector identified as shown in FIG. 4, as shown in FIGS. 7-8,11-12,15-16, and 19-20. In some embodiments, relative elevation information may be generated as shown in FIG. 21. In some embodiments, relative heading information may be generated as shown in FIGS. 22-30.

In some embodiments, determining relative position information may include determining relative position information for a remote vehicle relative to the host vehicle, which may include a relative longitudinal position for the remote vehicle (XW), a relative lateral position for the remote vehicle (VU), or both. The relative longitudinal position may indicate a quantization of a remote vehicle longitudinal position relative to the host vehicle position in the geospatial domain, and may be determined relative to the orientation sector. The relative lateral position may indicate a quantization of a remote vehicle lateral position relative to the host vehicle position in the geospatial domain, and may be determined relative to the orientation sector.

Figure 7:
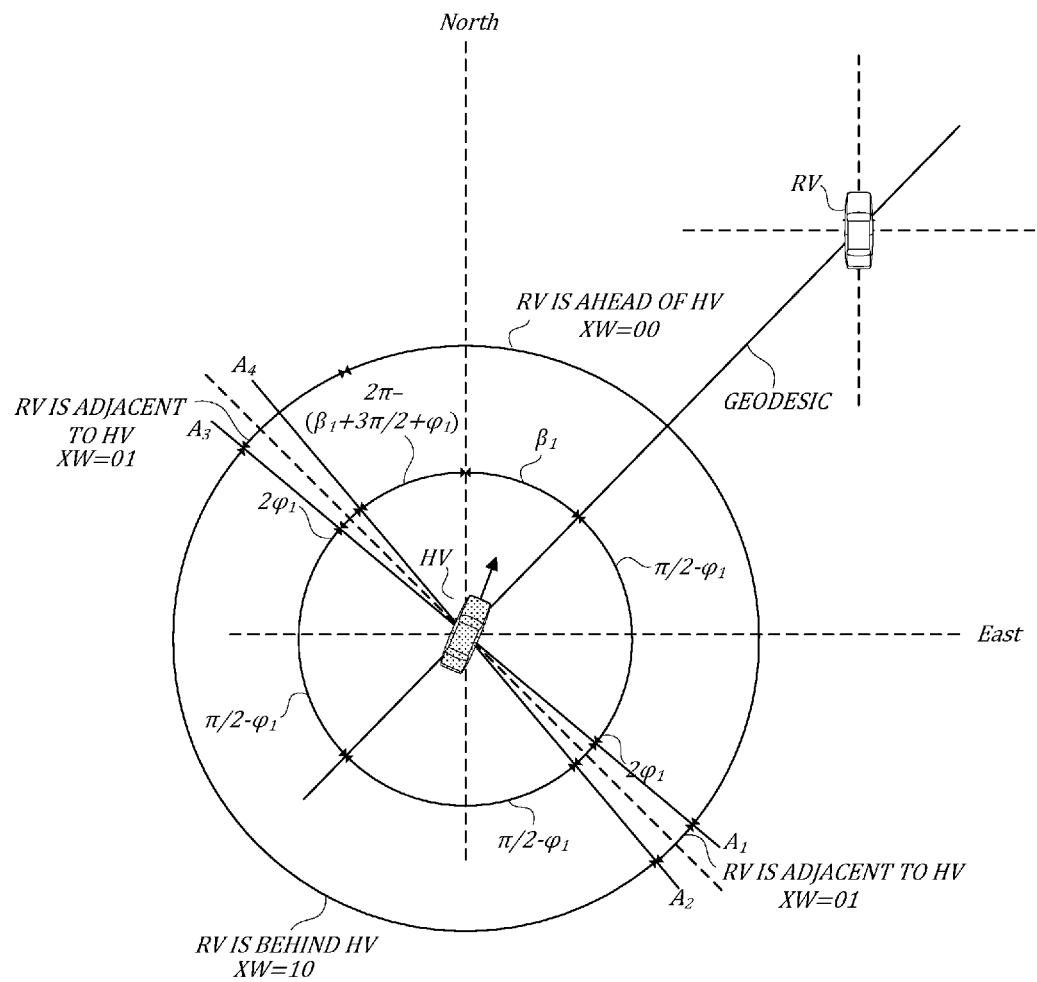
FIG. 7 is a diagram of identifying inter-vehicle state information including relative longitudinal position for the remote vehicle for a first orientation sector for use in generating converging path information in accordance with this disclosure.
Figure 8:
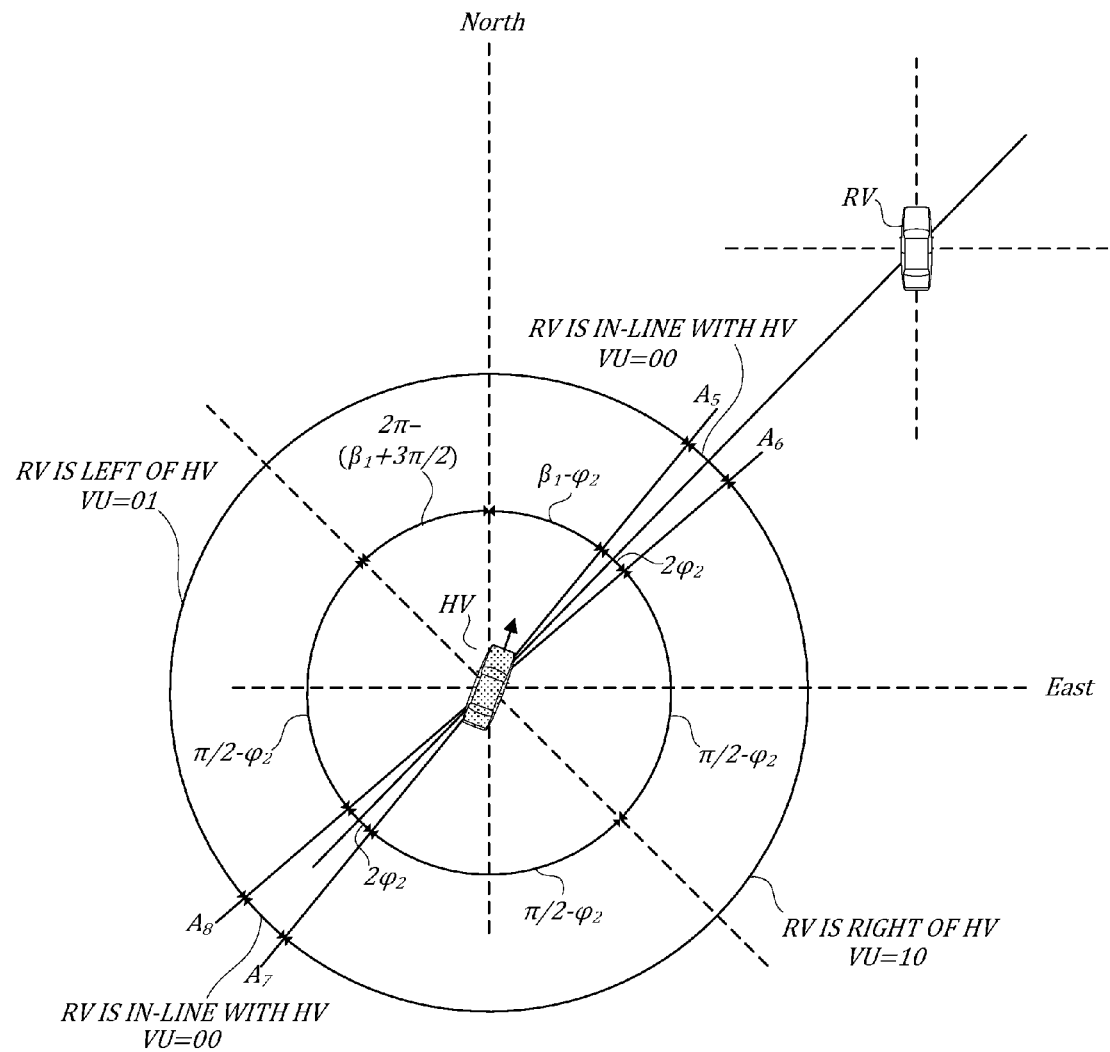
FIG. 8 is a diagram of identifying inter-vehicle state information including relative lateral position information for the remote vehicle for a first orientation sector for use in generating converging path information in accordance with this disclosure.

In some embodiments, for the first orientation sector $Q_1$, determining the relative position information for the remote vehicle may include determining a relative longitudinal position for the remote vehicle (XW), as shown in FIG. 7, a relative lateral position for the remote vehicle (VU), as shown in FIG. 8, or both. For simplicity and clarity, in FIGS. 7 and 8, the host vehicle is shown as heading northeast and the remote vehicle heading is omitted.

FIG. 7 is a diagram of identifying inter-vehicle state information including relative longitudinal position for the remote vehicle (XW) for a first orientation sector $Q_1$ for use in generating converging path information in accordance with this disclosure. In some embodiments a relative longitudinal position of the remote vehicle (XW) may be identified based on host vehicle information, such as a geospatial location of the host vehicle, remote vehicle information, such as a geospatial location of the remote vehicle, or a combination thereof.

In some embodiments, as shown in FIG. 7, the relative longitudinal position for the remote vehicle may be identified as being ahead of the host vehicle (XW=00), a remote vehicle heading angle $\delta_{RV}$ may indicate a heading angle for the remote vehicle, which may correspond with expected path for the remote vehicle, a host vehicle heading angle $\delta_{HV}$ may indicate a heading angle for the host vehicle, which may correspond with expected path for the host vehicle, an angular offset threshold $\phi_P$ may define an angular range in which the remote vehicle may be determined to be adjacent to the host vehicle, and $0<=\delta_{HV}<A_1$ or $A_2<=\delta_{HV}<2\pi$ may indicate that the relative longitudinal position for the remote vehicle is ahead of the host vehicle, where $A_1=\beta_1+\pi/2-\phi_P$, $A_2=\beta_1+\pi/2+\phi_P$, $A_3=\beta_1+3\pi/2-\phi_P$, and $A_4=\beta_1+3\pi/2+\phi_P$.

For example, determining that the relative longitudinal position for the remote vehicle is ahead of the host vehicle may be expressed as the following:

$$P_{Q_1} = \frac{1}{4}\left[\frac{\delta_{HV} - 0 + \sigma}{|\delta_{HV} - 0| + \sigma} + 1\right] \times \left[\frac{A_1 - \delta_{HV} - \sigma}{|A_1 - \delta_{HV}| + \sigma} + 1\right] + \frac{1}{4}\left[\frac{\delta_{HV} - A_4 + \sigma}{|\delta_{HV} - A_4| + \sigma} + 1\right] \times \left[\frac{2\pi - \delta_{HV} - \sigma}{2\pi - \delta_{HV}| + \sigma} + 1\right]. \quad \text{[Equation 6]}$$

In some embodiments, as shown in FIG. 7, the relative longitudinal position for the remote vehicle may be identified as being adjacent to the host vehicle (XW=01), and $A_1<=\delta_{HV}<A_2$ or $A_3<=\delta_{HV}<A_4$ may indicate that the relative longitudinal position for the remote vehicle is adjacent to the host vehicle, where $A_1=\beta_1+\pi/2-\phi_P$, $A_2=\beta_1+\pi/2+\phi_P$, $A_3=\beta_1+3\pi/2-\phi_P$, and $A_4=\beta_1+3\pi/2+\phi_P$.

For example, determining that the relative longitudinal position for the remote vehicle is adjacent to the host vehicle may be expressed as the following:

$$A_{Q_1} = \frac{1}{4}\left[\frac{\delta_{HV} - A_1 + \sigma}{|\delta_{HV} - A_1| + \sigma} + 1\right] \times \left[\frac{A_2 - \delta_{HV} - \sigma}{|A_2 - \delta_{HV}| + \sigma} + 1\right] + \frac{1}{4}\left[\frac{\delta_{HV} - A_3 + \sigma}{|\delta_{HV} - A_3| + \sigma} + 1\right] \times \left[\frac{A_4 - \delta_{HV} - \sigma}{|A_4 - \delta_{HV}| + \sigma} + 1\right]. \quad \text{[Equation 7]}$$

In some embodiments, as shown in FIG. 7, the relative longitudinal position for the remote vehicle may be identified as being behind the host vehicle (XW=10), and $A_2<=\delta_{HV}<A_3$ may indicate that the relative longitudinal position for the remote vehicle is behind the host vehicle, where $A_2=\beta_1+\pi/2+\phi_P$, and $A_3=\beta_1+3\pi/2-\phi_P$.

For example, determining that the relative longitudinal position for the remote vehicle is behind the host vehicle may be expressed as the following:

$$B_{Q_1} = \frac{1}{4}\left[\frac{\delta_{HV} - A_2 + \sigma}{|\delta_{HV} - A_2| + \sigma} + 1\right] \times \left[\frac{A_3 - \delta_{HV} - \sigma}{|A_3 - \delta_{HV}| + \sigma} + 1\right]. \quad \text{[Equation 8]}$$

In some embodiments, for the first orientation sector $Q_1$, a relative lateral position for the remote vehicle (VU) may be identified based on host vehicle information, such as a geospatial location of the host vehicle, remote vehicle information, such as a geospatial location of the remote vehicle, or a combination thereof.

FIG. 8 is a diagram of identifying inter-vehicle state information including relative lateral position information for the remote vehicle (VU) for a first orientation sector $Q_1$ for use in generating converging path information in accordance with this disclosure. In some embodiments, the relative lateral position for the remote vehicle may be identified as being in-line with, or in the same lane as, the host vehicle (VU=00), a remote vehicle heading angle $\delta_{RV}$ may indicate a heading angle for the remote vehicle, which may correspond with expected path for the remote vehicle, a host vehicle heading angle $\delta_{HV}$ may indicate a heading angle for the host vehicle, which may correspond with an expected path for the host vehicle, an angular offset threshold $\phi_I$ may define an angular range in which the relative lateral position for the remote vehicle may be determined to be in-line with the host vehicle, and $A_5<=\delta_{HV}<A_6$ or $A_7<=\delta_{HV}<A_8$ may indicate that the remote vehicle is in-line with the host vehicle, where $A_5=\beta_1-\phi_I$, $A_6=\beta_1+\phi_I$, $A_7=\beta_1+\pi-\phi_I$, and $A_8=\beta_1+\pi+\phi_I$.

For example, determining that the relative lateral position for the remote vehicle is in-line with the host vehicle may be expressed as the following:

$$I_{Q_1} = \frac{1}{4}\left[\frac{\delta_{HV} - A_5 + \sigma}{|\delta_{HV} - A_5| + \sigma} + 1\right] \times \left[\frac{A_6 - \delta_{HV} - \sigma}{|A_6 - \delta_{HV}| + \sigma} + 1\right] + \frac{1}{4}\left[\frac{\delta_{HV} - A_7 + \sigma}{|\delta_{HV} - A_7| + \sigma} + 1\right] \times \left[\frac{A_8 - \delta_{HV} - \sigma}{|A_8 - \delta_{HV}| + \sigma} + 1\right]. \quad \text{[Equation 9]}$$

In some embodiments, as shown in FIG. 8, the relative lateral position for the remote vehicle may be identified as being to the left of the host vehicle (VU=01), and $A_6<=\delta_{HV}<A_7$ may indicate that the relative lateral position for the remote vehicle is to the left of the host vehicle, where $A_5=\beta_1-\phi_I$, $A_6=\beta_1+\phi_I$, $A_7=\beta_1+\pi-\phi_I$, and $A_8=\beta_1+\pi+\phi_I$.

For example, determining that the relative lateral position for the remote vehicle is to the left of the host vehicle may be expressed as the following:

$$L_{Q_1} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right]. \quad \text{[Equation 10]}$$

In some embodiments, as shown in FIG. 8, the relative lateral position for the remote vehicle may be identified as being to the right of the host vehicle (VU=10), and $0<=\delta_{HV}<A_5$ or $A_8<=\delta_{HV}<2\pi$ may indicate that the relative lateral position for the remote vehicle is to the right of the host vehicle, where $A_5=\beta_1-\phi_I$, $A_6=\beta_1+\phi_I$, $A_7=\beta_1+\pi-\phi_I$, and $A_8=\beta_1+\pi+\phi_I$.

For example, determining that the relative lateral position for the remote vehicle is to the right of the host vehicle may be expressed as the following:

$$R_{Q_1} = \frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] + \quad \text{[Equation 11]}$$

$$\frac{1}{4}\left[\frac{\delta_{HV}-A_8+\sigma}{|\delta_{HV}-A_8|+\sigma}+1\right]\times\left[\frac{2\pi-\delta_{HV}-\sigma}{2\pi-\delta_{HV}|+\sigma}+1\right].$$

In an example, for the first orientation sector $Q_1$, determining relative position information may be expressed as shown in the following table:

TABLE 8

| Q1 | | Lateral Position | | |
| --- | --- | --- | --- | --- |
| | | RV in lane ($I_{Q1}$) | RV Left ($L_{Q1}$) | RV Right ($R_{Q1}$) |
| Longi- tudinal Position | RV Ahead ($P_{Q1}$) | $Q_1 \times P_{Q1} \times I_{Q1}$ | $Q_1 \times P_{Q1} \times L_{Q1}$ | $Q_1 \times P_{Q1} \times R_{Q1}$ |
| | RV Adjacent ($A_{Q1}$) | $Q_1 \times A_{Q1} \times I_{Q1}$ | $Q_1 \times A_{Q1} \times L_{Q1}$ | $Q_1 \times A_{Q1} \times R_{Q1}$ |
| | RV Behind ($B_{Q1}$) | $Q_1 \times B_{Q1} \times I_{Q1}$ | $Q_1 \times B_{Q1} \times L_{Q1}$ | $Q_1 \times B_{Q1} \times R_{Q1}$ |

In some embodiments, a remote vehicle (RV) may be identified in the second orientation sector $Q_2$, to the southeast of the host vehicle (HV), as shown in FIGS. 9-12. For example, the latitude of the remote vehicle may be less than the latitude for the host vehicle, the longitude for remote vehicle may be greater than the longitude for the host vehicle, and the remote vehicle may be identified as being in the second orientation sector $Q_2$, which may be expressed as the following:

$$Q_2 = \frac{1}{4}\left[\frac{\phi_{HV}-\phi_{RV}+\sigma}{|\phi_{HV}-\phi_{RV}|+\sigma}+1\right]\times\left[\frac{\theta_{RV}-\theta_{HV}-\sigma}{|\theta_{RV}-\theta_{HV}|+\sigma}+1\right]. \quad \text{[Equation 12]}$$

For example, the latitude of the remote vehicle may be less than the latitude for the host vehicle, the longitude for remote vehicle may be greater than the longitude for the host vehicle, Equation 12 may evaluate to one, and the remote vehicle may be identified as being in the second orientation sector $Q_2$. In some embodiments, the remote vehicle may be in an orientation sector other than the second orientation sector $Q_2$ and Equation 12 may evaluate to zero.

Figure 9:
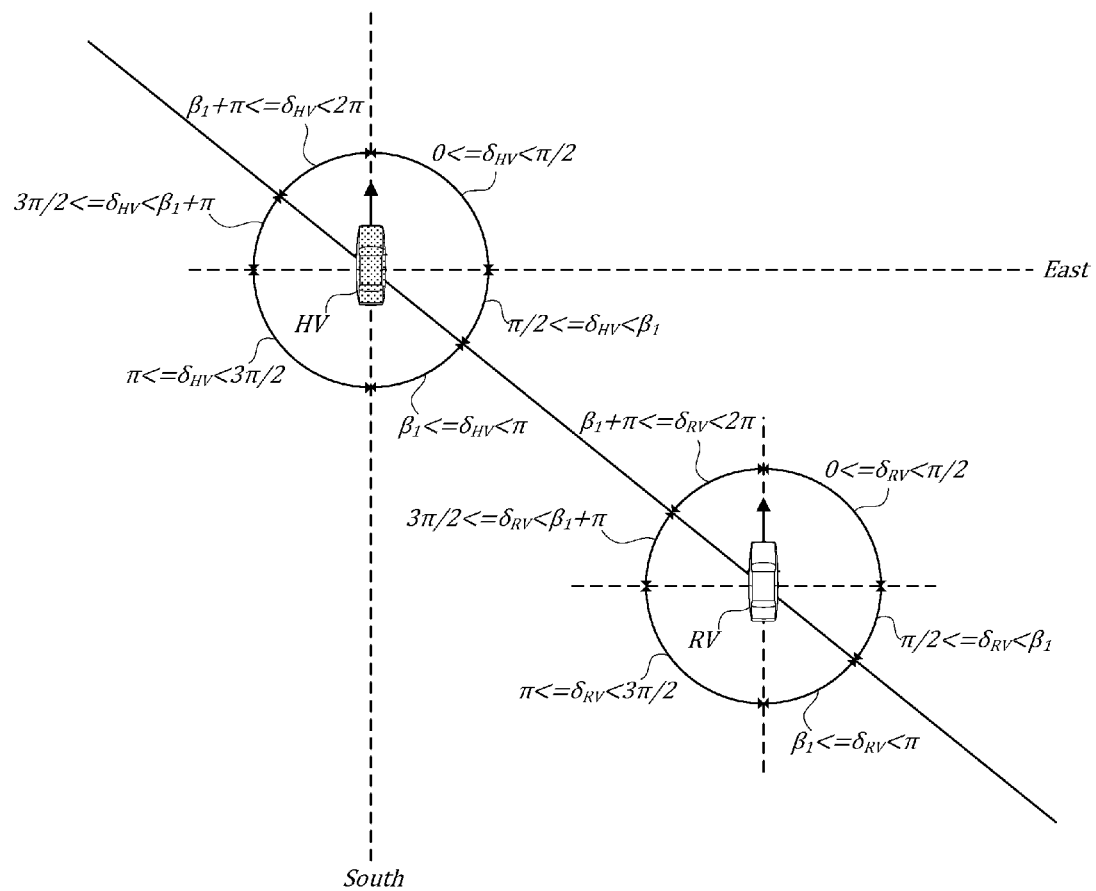
FIG. 9 is a diagram of identifying inter-vehicle state information including a geodesic for a second orientation sector for use in generating converging path information in accordance with this disclosure.

FIG. 9 is a diagram of identifying inter-vehicle state information including a geodesic for a second orientation sector $Q_2$ for use in generating converging path information in accordance with this disclosure. Identifying inter-vehicle state information including the geodesic for the second orientation sector for use in generating converging path information may be similar to the identification shown in FIG. 5, except as described herein. In the second orientation sector $Q_2$ the remote vehicle, and the geodesic, is located to the southeast of the host vehicle in the geospatial domain.

In some embodiments, as shown in FIG. 9, for the second orientation sector $Q_2$, generating converging path information may include determining a host vehicle region for the host vehicle. A first host vehicle region may include host vehicle heading angles $\delta_{HV}$ from the reference direction, which may correspond with north, to ninety degrees, which may correspond with east, and which may be expressed as $0 <= \delta_{HV} < \pi/2$. A second host vehicle region may include host vehicle heading angles $\delta_{HV}$ from ninety degrees to the convergence angle $\beta_1$ of the geodesic, and which may be expressed as $\pi/2 <= \delta_{HV} < \beta_1$. A third host vehicle region may include host vehicle heading angles $\delta_{HV}$ from the convergence angle $\beta_1$ of the geodesic to 180 degrees, which may correspond with south, and which may be expressed as $\beta_1 <= \delta_{HV} < \pi$. A fourth host vehicle region may include host vehicle heading angles $\delta_{HV}$ from 180 degrees to 270 degrees, which may correspond with west, and which may be expressed as $\pi <= \delta_{HV} < 3\pi/2$. A fifth host vehicle region may include host vehicle heading angles $\delta_{HV}$ from 270 degrees to a sum of the convergence angle $\beta_1$ of the geodesic and 180 degrees $\pi$, which may be expressed as $3\pi/2 <= \delta_{HV} < \beta_1 + \pi$. A sixth host vehicle region may include host vehicle heading angles $\delta_{HV}$ from the sum of the convergence angle $\beta_1$ of the geodesic and 180 degrees $\pi$ to 360 degrees, which may correspond with the reference direction, north, and which may be expressed as $\beta_1 + \pi <= \delta_{HV} < 2\pi$.

In some embodiments, as shown in FIG. 9, for the second orientation sector, generating converging path information may include determining a remote vehicle region for the remote vehicle. A first remote vehicle region may include remote vehicle heading angles $\delta_{HV}$ from the reference direction, which may correspond with north, to ninety degrees, which may correspond with east, and which may be expressed as $0 <= \delta_{RV} < \pi/2$. A second remote vehicle region may include remote vehicle heading angles $\delta_{RV}$ from ninety degrees to the convergence angle $\beta_1$ of the geodesic, and which may be expressed as $\pi/2 <= \delta_{RV} < \beta_1$. A third remote vehicle region may include remote vehicle heading angles $\delta_{RV}$ from the convergence angle $\beta_1$ of the geodesic to 180 degrees, which may correspond with south, and which may be expressed as $\beta_1 <= \delta_{RV} < \pi$. A fourth remote vehicle region may include remote vehicle heading angles $\delta_{RV}$ from 180 degrees to 270 degrees, which may correspond with west, and which may be expressed as $\pi <= \delta_{RV} < 3\pi/2$. A fifth remote vehicle region may include remote vehicle heading angles $\delta_{RV}$ from 270 degrees to a sum of the convergence angle $\beta_1$ of the geodesic and 180 degrees $\pi$, which may be expressed as $3\pi/2 <= \delta_{RV} < \beta_1 + \pi$. A sixth remote vehicle region may include remote vehicle heading angles $\delta_{RV}$ from the sum of the convergence angle $\beta_1$ of the geodesic and 180 degrees $\pi$ to 360 degrees, which may correspond with the reference direction, north, and which may be expressed as $\beta_1 + \pi <= \delta_{RV} < 2\pi$.

Figure 10:
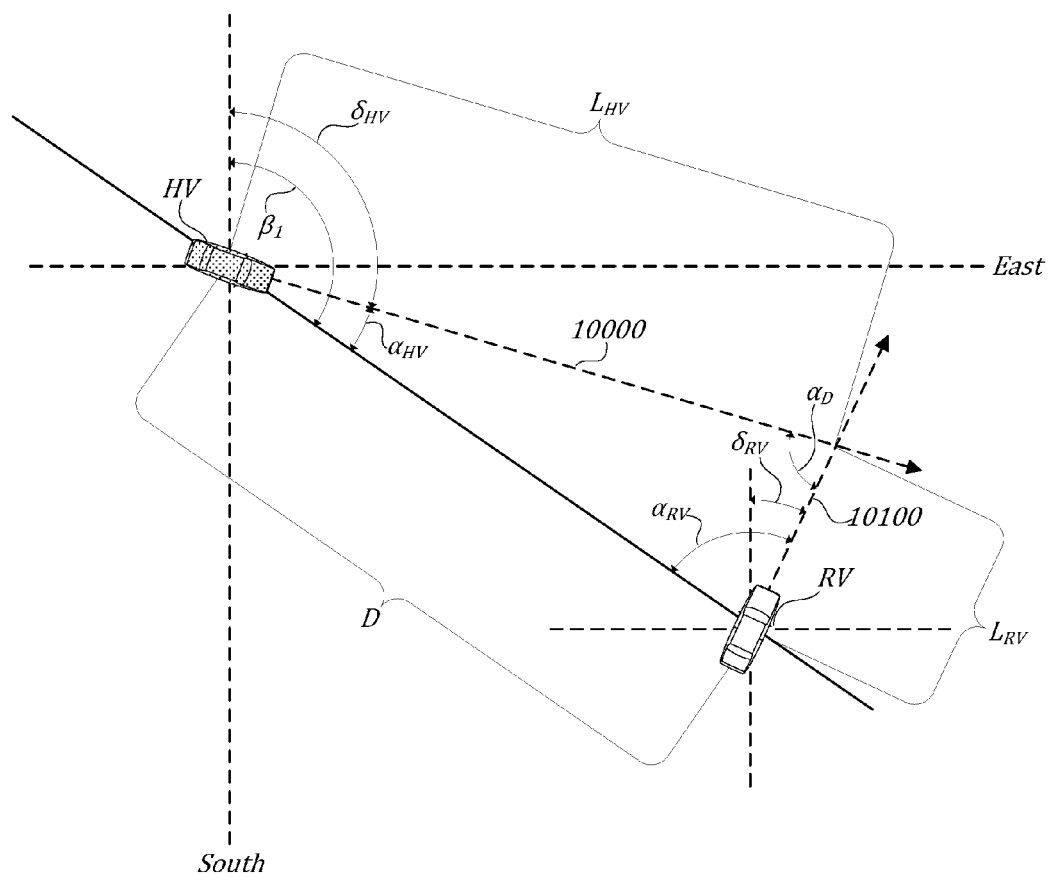
FIG. 10 is a diagram of identifying inter-vehicle state information including convergence information for the second orientation sector for use in generating converging path information in accordance with this disclosure.

FIG. 10 is a diagram of identifying inter-vehicle state information including convergence information for the second orientation sector for use in generating converging path information in accordance with this disclosure. Identifying inter-vehicle state information including a geodesic for the second orientation sector for use in generating converging path information may be similar to the identification shown in FIG. 6, except as described herein.

In some embodiments, for the second orientation sector $Q_2$, generating converging path information may include identifying a host vehicle expected path 10000 for the host vehicle (HV), identifying respective remote vehicle expected paths 10100 for one or more of the remote vehicles (RV), or identifying respective expected paths 10000/10100 for the host vehicle and for one or more of the remote vehicles. In some embodiments, the expected paths may be projected, such as in a straight line, from the respective heading information.

In some embodiments, generating converging path information may include determining whether the remote vehicle expected path 10100 and the host vehicle expected path 10000 are convergent, which may indicate that the host vehicle expected path 10000 and the respective remote vehicle expected path 10100 intersect.

In some embodiments, for the second orientation sector $Q_2$, determining whether the remote vehicle expected path 10100 and the host vehicle expected path 10000 are convergent may include examining defined convergence data, such as the defined convergence data shown in Table 9.

TABLE 9

|  | $RV_1$ | $RV_2$ | $RV_3$ | $RV_4$ | $RV_5$ | $RV_6$ |
|---|---|---|---|---|---|---|
| $HV_1$ | $\eta_{HV}$ | 0 | 0 | 0 | 0 | 1 |
| $HV_2$ | 1 | $\eta_{HV}$ | 0 | 0 | 0 | 1 |
| $HV_3$ | 0 | 1 | $\eta_{HV}$ | 1 | 1 | 0 |
| $HV_4$ | 0 | 1 | 1 | $\eta_{HV}$ | 1 | 0 |
| $HV_5$ | 0 | 0 | 0 | 0 | $\eta_{HV}$ | 0 |
| $HV_6$ | 0 | 0 | 0 | 0 | 0 | $\eta_{HV}$ |

In some embodiments, for the second orientation sector, determining $\eta_{HV}$ may be expressed as shown in Equation 37. In some embodiments, determining $\eta_{RV}$ may be expressed as shown in Equation 38.

In some embodiments, for the second orientation sector $Q_2$, a combination ($F_{m,n}$) of the host vehicle heading angle $\delta_{HV}$ and the remote vehicle heading angle $\delta_{RV}$ may be expressed as shown in Tables 10-12.

TABLE 10

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 11

| $H_1$ | $\frac{1}{4}\left[\frac{\delta_{HV} - 0 - \sigma}{\|\delta_{HV} - 0\| + \sigma} + 1\right] \times \left[\frac{\frac{\pi}{2} - \delta_{HV} - \sigma}{\left\|\frac{\pi}{2} - \delta_{HV}\right\| + \sigma} + 1\right]$ |
|---|---|
| $H_2$ | $\frac{1}{4}\left[\frac{\delta_{HV} - \frac{\pi}{2} - \sigma}{\left\|\delta_{HV} - \frac{\pi}{2}\right\| + \sigma} + 1\right] \times \left[\frac{\beta_1 - \delta_{HV} - \sigma}{\|\beta_1 - \delta_{HV}\| + \sigma} + 1\right]$ |
| $H_3$ | $\frac{1}{4}\left[\frac{\delta_{HV} - \beta_1 - \sigma}{\|\delta_{HV} - \beta_1\| + \sigma} + 1\right] \times \left[\frac{\pi - \delta_{HV} - \sigma}{\|\pi - \delta_{HV}\| + \sigma} + 1\right]$ |

TABLE 11-continued

| $H_4$ | $\frac{1}{4}\left[\frac{\delta_{HV} - \pi - \sigma}{\|\delta_{HV} - \pi\| + \sigma} + 1\right] \times \left[\frac{\frac{3\pi}{2} - \delta_{HV} - \sigma}{\left\|\frac{3\pi}{2} - \delta_{HV}\right\| + \sigma} + 1\right]$ |
|---|---|
| $H_5$ | $\frac{1}{4}\left[\frac{\delta_{HV} - \frac{3\pi}{2} - \sigma}{\left\|\delta_{HV} - \frac{3\pi}{2}\right\| + \sigma} + 1\right] \times \left[\frac{\beta_1 + \pi - \delta_{HV} - \sigma}{\|\beta_1 + \pi - \delta_{HV}\| + \sigma} + 1\right]$ |
| $H_6$ | $\frac{1}{4}\left[\frac{\delta_{HV} - (\beta_1 + \pi) - \sigma}{\|\delta_{HV} - (\beta_1 + \pi)\| + \sigma} + 1\right] \times \left[\frac{2\pi - \delta_{HV} - \sigma}{\|2\pi - \delta_{HV}\| + \sigma} + 1\right]$ |

TABLE 12

| $R_1$ | $\frac{1}{4}\left[\frac{\delta_{RV} - 0 - \sigma}{\|\delta_{RV} - 0\| + \sigma} + 1\right] \times \left[\frac{\frac{\pi}{2} - \delta_{RV} - \sigma}{\left\|\frac{\pi}{2} - \delta_{RV}\right\| + \sigma} + 1\right]$ |
|---|---|
| $R_2$ | $\frac{1}{4}\left[\frac{\delta_{RV} - \frac{\pi}{2} - \sigma}{\left\|\delta_{RV} - \frac{\pi}{2}\right\| + \sigma} + 1\right] \times \left[\frac{\beta_1 - \delta_{RV} - \sigma}{\|\beta_1 - \delta_{RV}\| + \sigma} + 1\right]$ |
| $R_3$ | $\frac{1}{4}\left[\frac{\delta_{RV} - \beta_1 - \sigma}{\|\delta_{RV} - \beta_1\| + \sigma} + 1\right] \times \left[\frac{\pi - \delta_{RV} - \sigma}{\|\pi - \delta_{RV}\| + \sigma} + 1\right]$ |
| $R_4$ | $\frac{1}{4}\left[\frac{\delta_{RV} - \pi - \sigma}{\|\delta_{RV} - \pi\| + \sigma} + 1\right] \times \left[\frac{\frac{3\pi}{2} - \delta_{RV} - \sigma}{\left\|\frac{3\pi}{2} - \delta_{RV}\right\| + \sigma} + 1\right]$ |
| $R_5$ | $\frac{1}{4}\left[\frac{\delta_{RV} - \frac{3\pi}{2} - \sigma}{\left\|\delta_{RV} - \frac{3\pi}{2}\right\| + \sigma} + 1\right] \times \left[\frac{(\beta_1 + \pi) - \delta_{RV} - \sigma}{\|(\beta_1 + \pi) - \delta_{RV}\| + \sigma} + 1\right]$ |
| $R_6$ | $\frac{1}{4}\left[\frac{\delta_{RV} - \pi - \sigma}{\|\delta_{RV} - \pi\| + \sigma} + 1\right] \times \left[\frac{2\pi - \delta_{RV} - \sigma}{\|2\pi - \delta_{RV}\| + \sigma} + 1\right]$ |

In some embodiments, for the second orientation sector $Q_2$, generating converging path information may include determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 13.

TABLE 13

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_2$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_3$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_4$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_5$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_6$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ |

In some embodiments, for the second orientation sector $Q_2$, generating converging path information may include determining a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 14.

TABLE 14

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $\delta_{RV}-\beta_1+\pi$ | 0 | 0 | 0 | 0 | $\delta_{RV}-\beta_1-\pi$ |
| $HV_2$ | $\delta_{RV}-\beta_1+\pi$ | $\delta_{RV}-\beta_1+\pi$ | 0 | 0 | 0 | $\delta_{RV}-\beta_1-\pi$ |
| $HV_3$ | 0 | 0 | $-(\delta_{RV}-\beta_1-\pi)$ | $-(\delta_{RV}-\beta_1-\pi)$ | $-(\delta_{RV}-\beta_1-\pi)$ | 0 |
| $HV_4$ | 0 | 0 | 0 | $-(\delta_{RV}-\beta_1-\pi)$ | $-(\delta_{RV}-\beta_1-\pi)$ | 0 |
| $HV_5$ | 0 | 0 | 0 | 0 | $-(\delta_{RV}-\beta_1-\pi)$ | 0 |
| $HV_6$ | 0 | 0 | 0 | 0 | 0 | $\delta_{RV}-\beta_1-\pi$ |

In some embodiments, for the second orientation sector, generating converging path information may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 15.

TABLE 15

| $\alpha_D=$ | $RV_1$ | $RV_2$ | $RV_3$ | $RV_4$ | $RV_5$ | $RV_6$ |
|---|---|---|---|---|---|---|
| $HV_1$ | $\delta_{HV}-\delta_{RV}$ | 0 | 0 | 0 | 0 | $\delta_{HV}-\delta_{RV}+2\pi$ |
| $HV_2$ | $\delta_{HV}-\delta_{RV}$ | $\delta_{HV}-\delta_{RV}$ | 0 | 0 | 0 | $\delta_{HV}-\delta_{RV1}+2\pi$ |
| $HV_3$ | 0 | 0 | $-(\delta_{HV}-\delta_{RV})$ | $-(\delta_{HV}-\delta_{RV})$ | $-(\delta_{HV}-\delta_{RV})$ | 0 |
| $HV_4$ | 0 | 0 | 0 | $-(\delta_{HV}-\delta_{RV})$ | $-(\delta_{HV}-\delta_{RV})$ | 0 |
| $HV_5$ | 0 | 0 | 0 | 0 | $-(\delta_{HV}-\delta_{RV})$ | 0 |
| $HV_6$ | 0 | 0 | 0 | 0 | 0 | $\delta_{HV}-\delta_{RV}$ |

In FIG. 10, $L_{HV}$ indicates a distance from the host vehicle to the projected point of convergence with the remote vehicle expected path 10100, and $L_{RV}$ indicates a distance from the remote vehicle to the projected point of convergence with the host vehicle expected path 10000.

Figure 11:
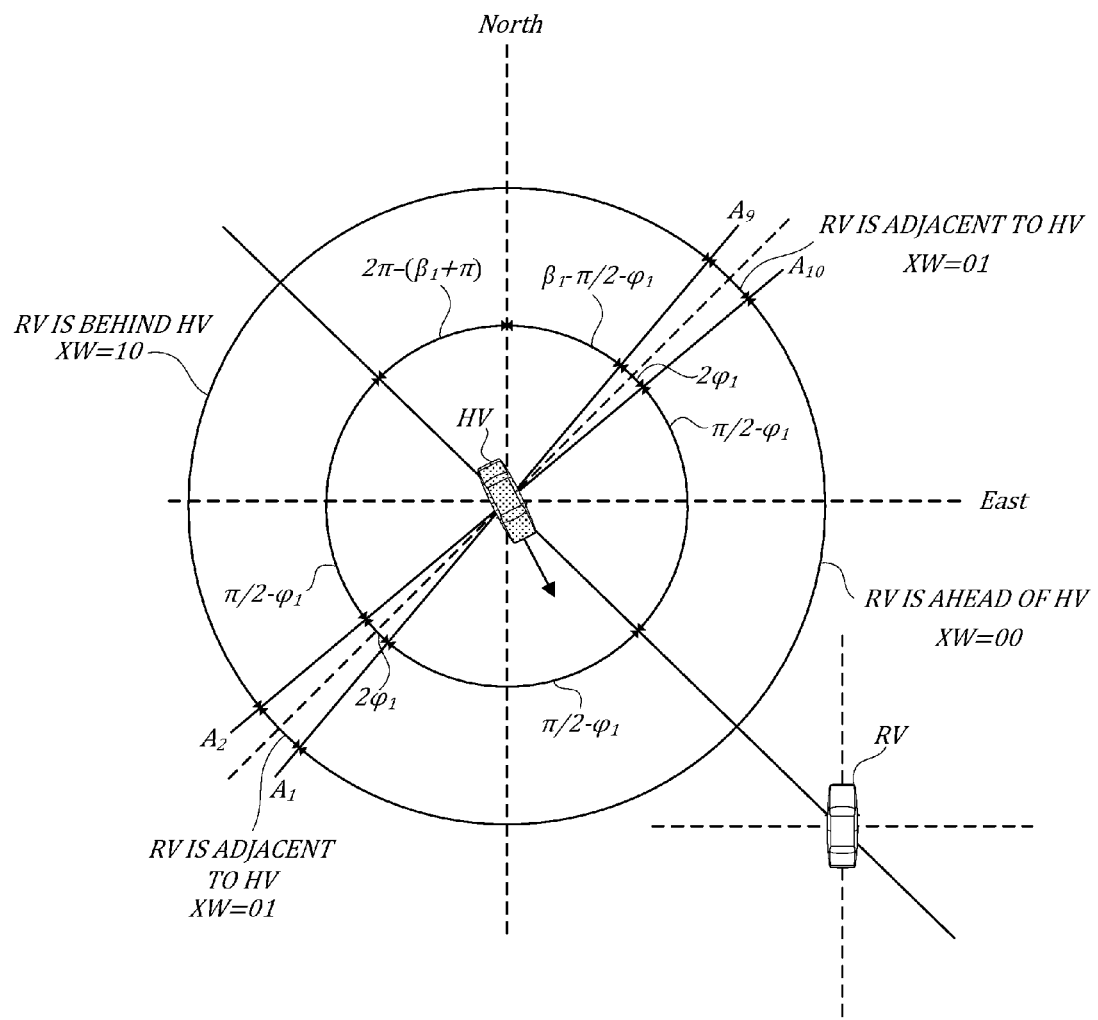
FIG. 11 is a diagram of identifying inter-vehicle state information including longitudinal position for the remote vehicle for a second orientation sector for use in generating converging path information in accordance with this disclosure.
Figure 12:
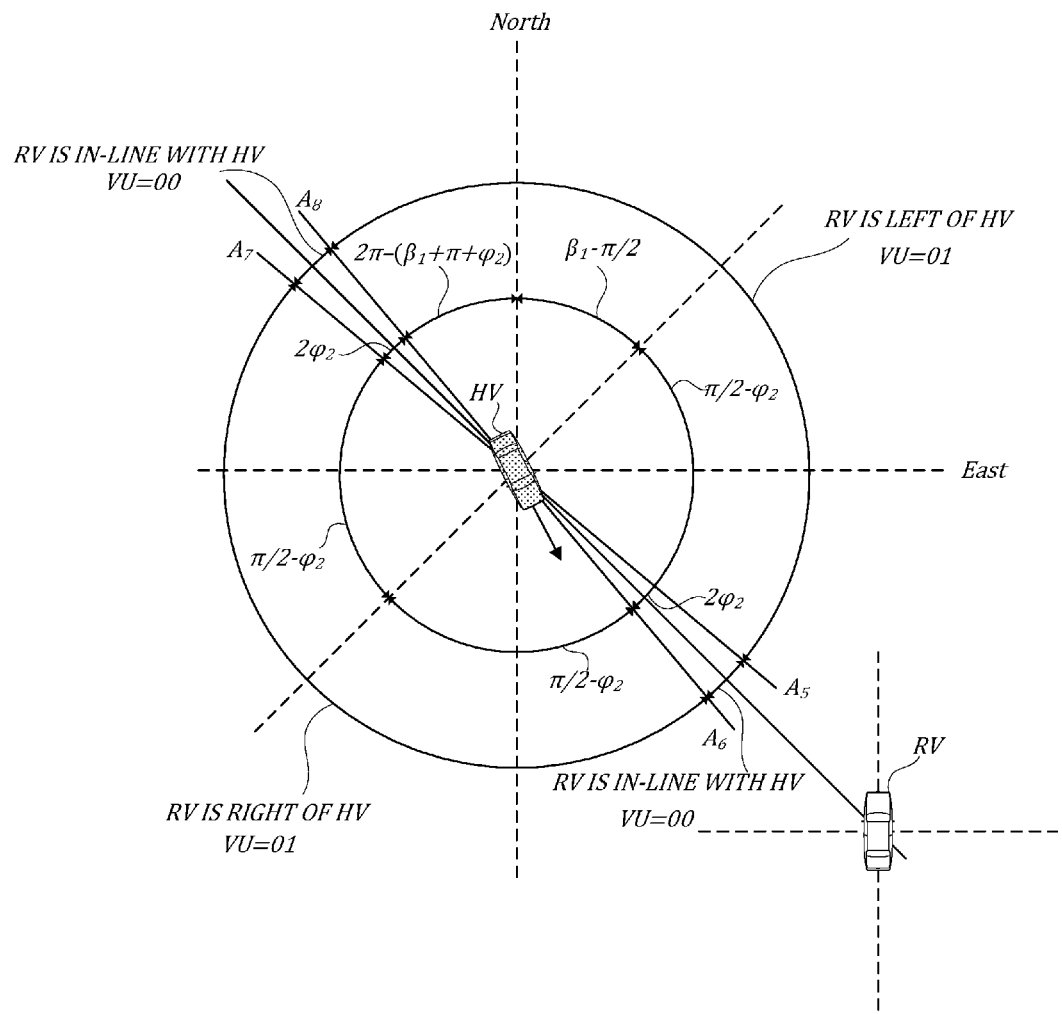
FIG. 12 is a diagram of identifying inter-vehicle state information including relative lateral position information for the remote vehicle for a second orientation sector for use in generating converging path information in accordance with this disclosure.

In some embodiments, for the second orientation sector $Q_2$, determining the relative position information for the remote vehicle may include determining a relative longitudinal position for the remote vehicle (XW), as shown in FIG. 11, a relative lateral position for the remote vehicle (VU), as shown in FIG. 12, or both. For simplicity and clarity, in FIGS. 11 and 12, the host vehicle is shown as heading southeast and the remote vehicle heading is omitted.

FIG. 11 is a diagram of identifying inter-vehicle state information including longitudinal position for the remote vehicle (XW) for a second orientation sector $Q_2$ for use in generating converging path information in accordance with this disclosure. Identifying inter-vehicle state information including the longitudinal position for the remote vehicle (XW) for the second orientation sector for use in generating converging path information may be similar to the identification shown in FIG. 7, except as described herein. In some embodiments a relative longitudinal position of the remote vehicle (XW) may be identified based on host vehicle information, such as a geospatial location of the host vehicle, remote vehicle information, such as a geospatial location of the remote vehicle, or a combination thereof.

In some embodiments, as shown in FIG. 11, the relative longitudinal position for the remote vehicle may be identified as being ahead of the host vehicle (XW=00), a remote vehicle heading angle $\delta_{RV}$ may indicate a heading angle for the remote vehicle, which may correspond with expected path for the remote vehicle, a host vehicle heading angle $\delta_{HV}$ may indicate a heading angle for the host vehicle, which may correspond with expected path for the host vehicle, an angular offset threshold $\phi_P$ may define an angular range in which the remote vehicle may be determined to be adjacent to the host vehicle, and $A_{10}<=\delta_{HV}<A_1$ may indicate that the relative longitudinal position for the remote vehicle is ahead of the host vehicle, where $A_1=\beta_1+\pi/2-\phi_P$, $A_2=\beta_1+\pi/2+\phi_P$, $A_9=\beta_1-\pi/2-\phi_P$, and $A_{10}=\beta_1-\pi/2+\phi_P$.

For example, determining that the relative longitudinal position for the remote vehicle is ahead of the host vehicle may be expressed as the following:

$$P_{Q_2} = \frac{1}{4}\left[\frac{\delta_{HV}-A_{10}+\sigma}{|\delta_{HV}-A_{10}|+\sigma}+1\right]\times\left[\frac{A_1-\delta_{HV}-\sigma}{|A_1-\delta_{HV}|+\sigma}+1\right]. \qquad \text{[Equation 13]}$$

In some embodiments, as shown in FIG. 11, the relative longitudinal position for the remote vehicle may be identified as being adjacent to the host vehicle (XW=01), and $A_1<=\delta_{HV}<A_2$ or $A_9<=\delta_{HV}<A_{10}$ may indicate that the relative longitudinal position for the remote vehicle is adjacent to the host vehicle, where $A_1=\beta_1+\pi/2-\phi_P$, $A_2=\beta_1+\pi/2+\phi_P$, $A_9=\beta_1-\pi/2-\phi_P$, and $A_{10}=\beta_1-\pi/2+\phi_P$.

For example, determining that the relative longitudinal position for the remote vehicle is adjacent to the host vehicle may be expressed as the following:

$$A_{Q_2} = \frac{1}{4}\left[\frac{\delta_{HV}-A_1+\sigma}{|\delta_{HV}-A_1|+\sigma}+1\right]\times\left[\frac{A_2-\delta_{HV}-\sigma}{|A_2-\delta_{HV}|+\sigma}+1\right]+ \qquad \text{[Equation 14]}$$
$$\frac{1}{4}\left[\frac{\delta_{HV}-A_9+\sigma}{|\delta_{HV}-A_9|+\sigma}+1\right]\times\left[\frac{A_{10}-\delta_{HV}-\sigma}{|A_{10}-\delta_{HV}|+\sigma}+1\right].$$

In some embodiments, as shown in FIG. 11, the relative longitudinal position for the remote vehicle may be identified as being behind the host vehicle (XW=10), and $A_2<=\delta_{HV}<2\pi$ or $0<=\delta_{HV}<A_9$ may indicate that the relative longitudinal position for the remote vehicle is behind the host vehicle, where $A_1=\beta_1+\pi/2-\phi_P$, $A_2=\beta_1+\pi/2+\phi_P$, $A_9=\beta_1-\pi/2-\phi_P$, and $A_{10}=\beta_1-\pi/2+\phi_P$.

For example, determining that the relative longitudinal position for the remote vehicle is behind the host vehicle may be expressed as the following:

$$B_{Q_2} = \frac{1}{4}\left[\frac{\delta_{HV} - 0 + \sigma}{|\delta_{HV} - 0| + \sigma} + 1\right] \times \left[\frac{A_9 - \delta_{HV} - \sigma}{|A_9 - \delta_{HV}| + \sigma} + 1\right] + \quad \text{[Equation 15]}$$
$$\frac{1}{4}\left[\frac{\delta_{HV} - A_2 + \sigma}{|\delta_{HV} - A_2| + \sigma} + 1\right] \times \left[\frac{2\pi - \delta_{HV} - \sigma}{2\pi - \delta_{HV}| + \sigma} + 1\right].$$

In some embodiments, for the second orientation sector $Q_2$, a relative lateral position for the remote vehicle (VU) may be identified based on host vehicle information, such as a geospatial location of the host vehicle, remote vehicle information, such as a geospatial location of the remote vehicle, or a combination thereof.

FIG. 12 is a diagram of identifying inter-vehicle state information including relative lateral position information for the remote vehicle (VU) for a second orientation sector $Q_2$ for use in generating converging path information in accordance with this disclosure. Identifying inter-vehicle state information including the relative lateral position for the remote vehicle (VU) for the second orientation sector for use in generating converging path information may be similar to the identification shown in FIG. 8, except as described herein. In some embodiments, the relative lateral position for the remote vehicle may be identified as being in-line with, or in the same lane as, the host vehicle (VU=00), a remote vehicle heading angle $\delta_{RV}$ may indicate a heading angle for the remote vehicle, which may correspond with expected path for the remote vehicle, a host vehicle heading angle $\delta_{HV}$ may indicate a heading angle for the host vehicle, which may correspond with an expected path for the host vehicle, an angular offset threshold $\phi_I$ may define an angular range in which the relative lateral position for the remote vehicle may be determined to be in-line with the host vehicle, and $A_5 <= \delta_{HV} < A_6$ or $A_7 <= \delta_{HV} < A_8$ may indicate that the remote vehicle is in-line with the host vehicle, where $A_5 = \beta_1 - \phi_I$, $A_6 = \beta_1 + \phi_I$, $A_7 = \beta_1 + \pi - \phi_I$, and $A_8 = \beta_1 + \pi + \phi_I$.

For example, determining that the relative lateral position for the remote vehicle is in-line with the host vehicle may be expressed as the following:

$$I_{Q_2} = \frac{1}{4}\left[\frac{\delta_{HV} - A_5 + \sigma}{|\delta_{HV} - A_5| + \sigma} + 1\right] \times \left[\frac{A_6 - \delta_{HV} - \sigma}{|A_6 - \delta_{HV}| + \sigma} + 1\right] + \quad \text{[Equation 16]}$$
$$\frac{1}{4}\left[\frac{\delta_{HV} - A_7 + \sigma}{|\delta_{HV} - A_7| + \sigma} + 1\right] \times \left[\frac{A_8 - \delta_{HV} - \sigma}{|A_8 - \delta_{HV}| + \sigma} + 1\right].$$

In some embodiments, as shown in FIG. 12, the relative lateral position for the remote vehicle may be identified as being to the left of the host vehicle (VU=01), and $A_6 <= \delta_{HV} < A_7$ may indicate that the relative lateral position for the remote vehicle is to the left of the host vehicle, where $A_6 = \beta_1 + \phi_I$ and $A_7 = \beta_1 + \pi - \phi_I$.

For example, determining that the relative lateral position for the remote vehicle is to the left of the host vehicle may be expressed as the following:

$$L_{Q_2} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right]. \quad \text{[Equation 17]}$$

In some embodiments, as shown in FIG. 12, the relative lateral position for the remote vehicle may be identified as being to the right of the host vehicle (VU=10), and $0 <= \delta_{HV} < A_5$ or $A_5 <= \delta_{HV} < 2\pi$ may indicate that the relative lateral position for the remote vehicle is to the right of the host vehicle, where $A_5 = \beta_1 - \phi_I$ and $A_5 = \beta_1 + \pi + \phi_I$.

For example, determining that the relative lateral position for the remote vehicle is to the right of the host vehicle may be expressed as the following:

$$R_{Q_2} = \frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] + \quad \text{[Equation 18]}$$
$$\frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{2\pi - \delta_{HV}| + \sigma} + 1\right].$$

In an example, for the second orientation sector $Q_2$, determining relative position information may be expressed as shown in the following table:

TABLE 16

| Q2 | | Lateral Position | | |
|---|---|---|---|---|
| | | RV in lane ($I_{Q2}$) | RV Left ($L_{Q2}$) | RV Right ($R_{Q2}$) |
| Longitudinal Position | RV Ahead ($P_{Q2}$) | $Q_2 \times P_{Q2} \times I_{Q2}$ | $Q_2 \times P_{Q2} \times L_{Q2}$ | $Q_2 \times P_{Q2} \times R_{Q2}$ |
| | RV Adjacent ($A_{Q2}$) | $Q_2 \times A_{Q2} \times I_{Q2}$ | $Q_2 \times A_{Q2} \times L_{Q2}$ | $Q_2 \times A_{Q2} \times R_{Q2}$ |
| | RV Behind ($B_{Q2}$) | $Q_2 \times B_{Q2} \times I_{Q2}$ | $Q_2 \times B_{Q2} \times L_{Q2}$ | $Q_2 \times B_{Q2} \times R_{Q2}$ |

In some embodiments, a remote vehicle (RV) may be identified in the third orientation sector $Q_3$, to the southwest of the host vehicle (HV), as shown in FIGS. 13-16. For example, the latitude of the remote vehicle may be less than the latitude for the host vehicle, the longitude for remote vehicle may be less than the longitude for the host vehicle, and the remote vehicle may be identified as being in the third orientation sector $Q_3$, which may be expressed as the following:

$$Q_3 = \frac{1}{4}\left[\frac{\phi_{HV} - \phi_{RV} - \sigma}{|\phi_{HV} - \phi_{RV}| + \sigma} + 1\right] \times \left[\frac{\theta_{HV} - \theta_{RV} + \sigma}{|\theta_{HV} - \theta_{RV}| + \sigma} + 1\right]. \quad \text{[Equation 19]}$$

For example, the latitude of the remote vehicle may be less than the latitude for the host vehicle, the longitude for remote vehicle may be less than the longitude for the host vehicle, Equation 19 may evaluate to one, and the remote vehicle may be identified as being in the third orientation sector $Q_3$ In some embodiments, the remote vehicle may be in an orientation sector other than the third orientation sector $Q_3$ and Equation 19 may evaluate to zero.

Figure 13:
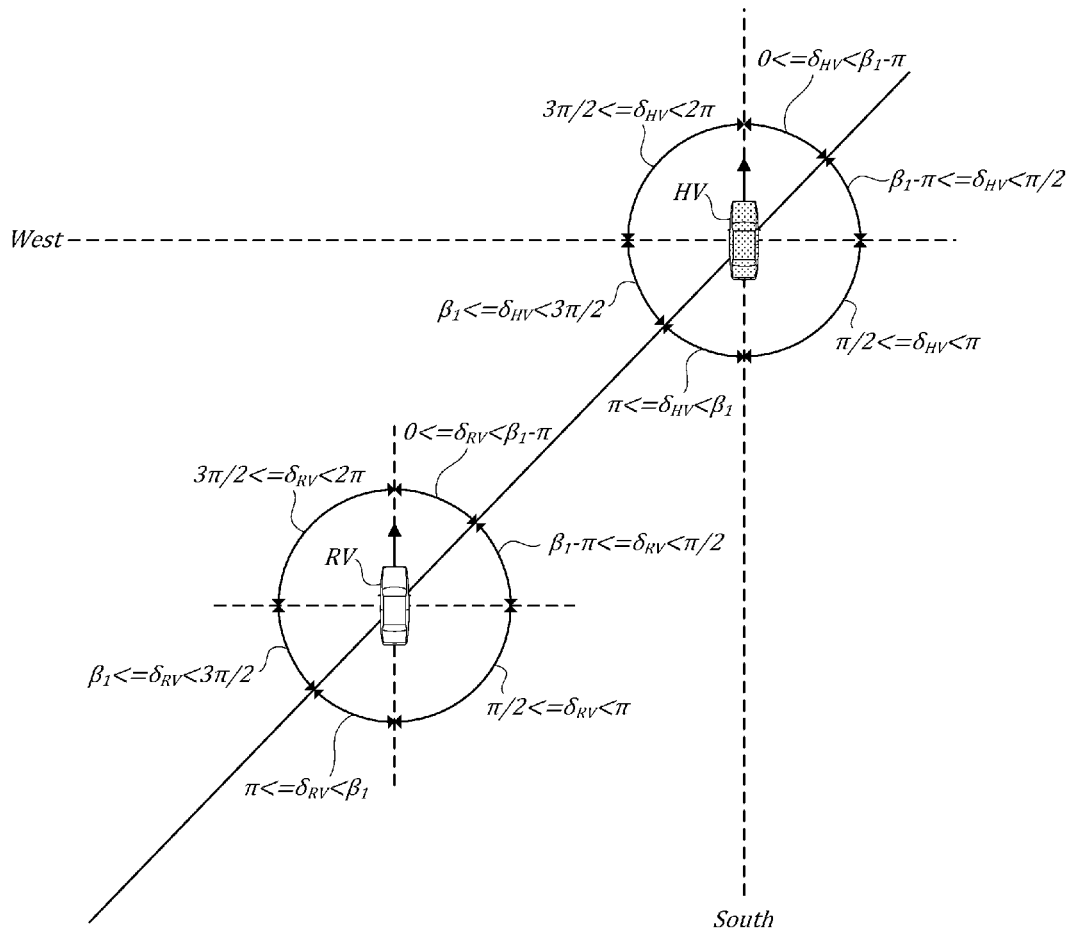
FIG. 13 is a diagram of identifying inter-vehicle state information including a geodesic for a third orientation sector for use in generating converging path information in accordance with this disclosure.

FIG. 13 is a diagram of identifying inter-vehicle state information including a geodesic for a third orientation sector $Q_3$ for use in generating converging path information in accordance with this disclosure. Identifying inter-vehicle state information including a geodesic for a third orientation sector for use in generating converging path information may be similar to the identification shown in FIG. 5, except as described herein. In the third orientation sector $Q_3$ the remote vehicle, and the geodesic, is located to the southwest of the host vehicle in the geospatial domain.

In some embodiments, as shown in FIG. 13, for the third orientation sector, generating converging path information may include determining a host vehicle region for the host vehicle. A first host vehicle region may include host vehicle heading angles $\delta_{HV}$ from the reference direction, which may correspond with north, to a difference of the convergence angle $\beta_1$ of the geodesic and 180 degrees $\pi$, which may be expressed as $0<=\delta_{HV}<\beta_1-\pi$. A second host vehicle region may include host vehicle heading angles $\delta_{HV}$ from the difference of the convergence angle $\beta_1$ of the geodesic and 180 degrees to ninety degrees, which may correspond with east, and which may be expressed as $\beta_1-\pi<=\delta_{HV}<\pi/2$. A third host vehicle region may include host vehicle heading angles $\delta_{HV}$ from ninety degrees to 180 degrees, which may correspond with south, and which may be expressed as $\pi/2<=\delta_{HV}<\pi$. A fourth host vehicle region may include host vehicle heading angles $\delta_{HV}$ from 180 degrees to the convergence angle $\beta_1$ of the geodesic, which may be expressed as $\pi<=\delta_{HV}<\beta_1$. A fifth host vehicle region may include host vehicle heading angles $\delta_{HV}$ from the convergence angle $\beta_1$ of the geodesic, to 270 degrees, which may correspond with west, and which may be expressed as $\beta_1<=\delta_{HV}<3\pi/2$. A sixth host vehicle region may include host vehicle heading angles $\delta_{HV}$ from 270 degrees to 360 degrees, which may correspond with the reference direction, north, and which may be expressed as $3\pi/2<=\delta_{HV}<2\pi$.

In some embodiments, as shown in FIG. 13, for the third orientation sector, generating converging path information may include determining a remote vehicle region for the remote vehicle. A first remote vehicle region may include remote vehicle heading angles $\delta_{RV}$ from the reference direction, which may correspond with north, to a difference of the convergence angle $\beta_1$ of the geodesic and 180 degrees $\pi$, which may be expressed as $0<=\delta_{RV}<\beta_1-\pi$. A second remote vehicle region may include remote vehicle heading angles $\delta_{RV}$ from the difference of the convergence angle $\beta_1$ of the geodesic and 180 degrees to ninety degrees, which may correspond with east, and which may be expressed as $\beta_1-\pi<=\delta_{RV}<\pi/2$. A third remote vehicle region may include remote vehicle heading angles $\delta_{RV}$ from ninety degrees to 180 degrees, which may correspond with south, and which may be expressed as $\pi/2<=\delta_{RV}<\pi$. A fourth remote vehicle region may include remote vehicle heading angles $\delta_{RV}$ from 180 degrees to the convergence angle $\beta_1$ of the geodesic, which may be expressed as $\pi<=\delta_{RV}<\beta_1$. A fifth remote vehicle region may include remote vehicle heading angles $\delta_{RV}$ from the convergence angle $\beta_1$ of the geodesic, to 270 degrees, which may correspond with west, and which may be expressed as $\beta_1<=\delta_{RV}<3\pi/2$. A sixth remote vehicle region may include remote vehicle heading angles $\delta_{RV}$ from 270 degrees to 360 degrees, which may correspond with the reference direction, north, and which may be expressed as $3\pi/2<=\delta_{RV}<2\pi$.

Figure 14:
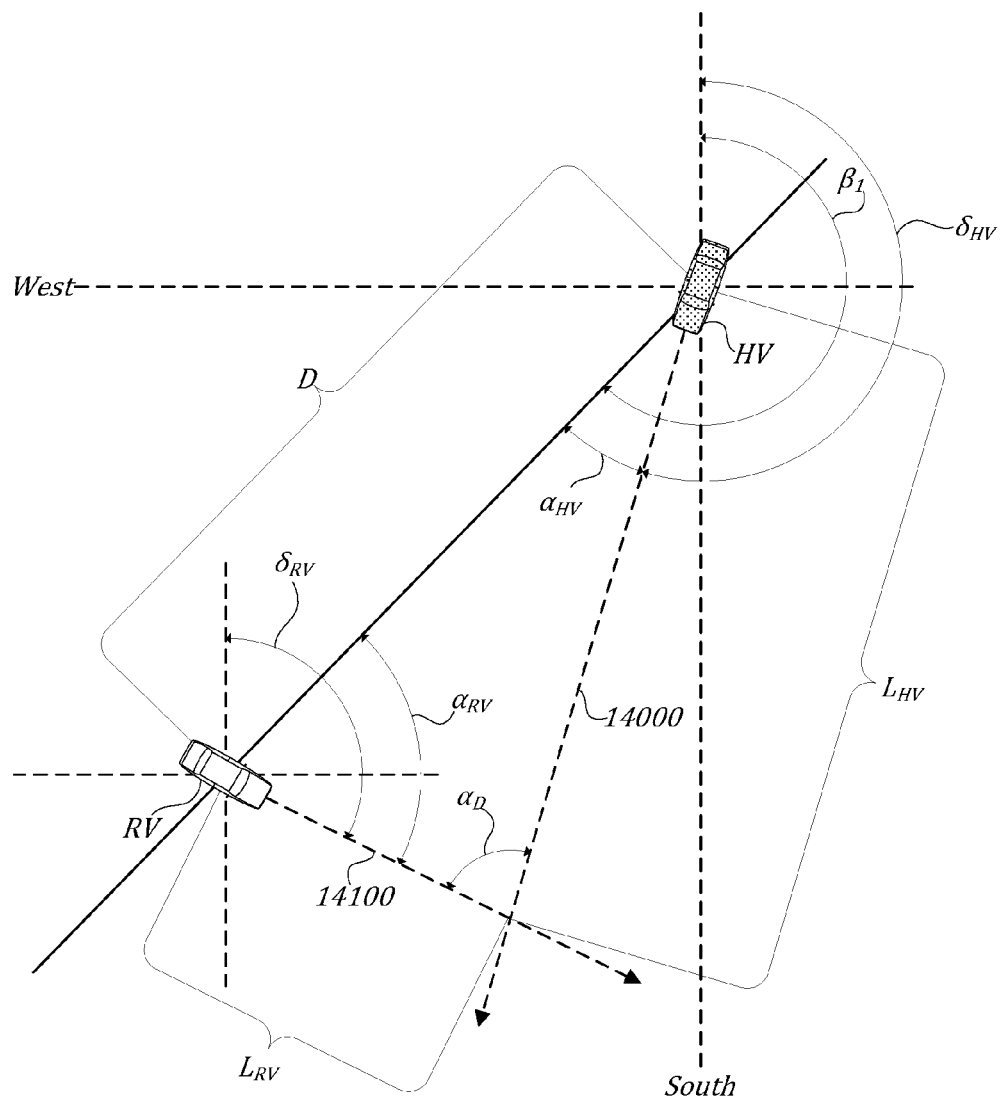
FIG. 14 is a diagram of identifying inter-vehicle state information including convergence information for the third orientation sector for use in generating converging path information in accordance with this disclosure.

FIG. 14 is a diagram of identifying inter-vehicle state information including convergence information for the third orientation sector for use in generating converging path information in accordance with this disclosure. Identifying inter-vehicle state information including a geodesic for the third orientation sector for use in generating converging path information may be similar to the identification shown in FIG. 6, except as described herein.

In some embodiments, for the third orientation sector $Q_3$, generating converging path information may include identifying a host vehicle expected path 14000 for the host vehicle (HV), identifying respective remote vehicle expected paths 14100 for one or more of the remote vehicles (RV), or identifying respective expected paths 14000/14100 for the host vehicle and for one or more of the remote vehicles. In some embodiments, the expected paths may be projected, such as in a straight line, from the respective heading information.

In some embodiments, generating converging path information may include determining whether the remote vehicle expected path 14100 and the host vehicle expected path 14000 are convergent, which may indicate that the host vehicle expected path 14000 and the respective remote vehicle expected path 14100 intersect.

In some embodiments, for the third orientation sector $Q_3$, determining whether the remote vehicle expected path 14100 and the host vehicle expected path 14000 are convergent may include examining defined convergence data, such as the defined convergence data shown in Table 17.

TABLE 17

|  | $RV_1$ | $RV_2$ | $RV_3$ | $RV_4$ | $RV_5$ | $RV_6$ |
|---|---|---|---|---|---|---|
| $HV_1$ | $\eta_{HV}$ | 0 | 0 | 0 | 0 | 0 |
| $HV_2$ | 0 | $\eta_{HV}$ | 0 | 0 | 0 | 0 |
| $HV_3$ | 0 | 1 | $\eta_{HV}$ | 0 | 0 | 0 |
| $HV_4$ | 0 | 1 | 1 | $\eta_{HV}$ | 0 | 0 |
| $HV_5$ | 1 | 0 | 0 | 0 | $\eta_{HV}$ | 1 |
| $HV_6$ | 1 | 0 | 0 | 0 | 0 | $\eta_{HV}$ |

In some embodiments, for the third orientation sector $Q_3$, determining $\eta_{HV}$ may be expressed as shown in Equation 37. In some embodiments, determining $\eta_{RV}$ may be expressed as shown in Equation 38.

In some embodiments, for the third orientation sector $Q_3$, a combination ($F_{m,n}$) of the host vehicle heading angle $\delta_{HV}$ and the remote vehicle heading angle $\delta_{RV}$ may be expressed as shown in Tables 18-20.

TABLE 18

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 19

| | |
|---|---|
| $H_1$ | $\frac{1}{4}\left[\frac{\delta_{HV} - 0 - \sigma}{\|\delta_{HV} - 0\| + \sigma} + 1\right] \times \left[\frac{\beta_1 - \pi - \delta_{HV} - \sigma}{\|\beta_1 - \pi - \delta_{HV}\| + \sigma} + 1\right]$ |
| $H_2$ | $\frac{1}{4}\left[\frac{\delta_{HV} - (\beta_1 - \pi) - \sigma}{\|\delta_{HV} - (\beta_1 - \pi)\| + \sigma} + 1\right] \times \left[\frac{\frac{\pi}{2} - \delta_{HV} - \sigma}{\left\|\frac{\pi}{2} - \delta_{HV}\right\| + \sigma} + 1\right]$ |
| $H_3$ | $\frac{1}{4}\left[\frac{\delta_{HV} - \frac{\pi}{2} - \sigma}{\left\|\delta_{HV} - \frac{\pi}{2}\right\| + \sigma} + 1\right] \times \left[\frac{\pi - \delta_{HV} - \sigma}{\|\pi - \delta_{HV}\| + \sigma} + 1\right]$ |
| $H_4$ | $\frac{1}{4}\left[\frac{\delta_{HV} - \pi - \sigma}{\|\delta_{HV} - \pi\| + \sigma} + 1\right] \times \left[\frac{\beta_1 - \delta_{HV} - \sigma}{\|\beta_1 - \delta_{HV}\| + \sigma} + 1\right]$ |
| $H_5$ | $\frac{1}{4}\left[\frac{\delta_{HV} - \beta_1 - \sigma}{\|\delta_{HV} - \beta_1\| + \sigma} + 1\right] \times \left[\frac{\frac{3\pi}{2} - \delta_{HV} - \sigma}{\left\|\frac{3\pi}{2} - \delta_{HV}\right\| + \sigma} + 1\right]$ |
| $H_6$ | $\frac{1}{4}\left[\frac{\delta_{HV} - \frac{3\pi}{2} - \sigma}{\left\|\delta_{HV} - \frac{3\pi}{2}\right\| + \sigma} + 1\right] \times \left[\frac{2\pi - \delta_{HV} - \sigma}{\|2\pi - \delta_{HV}\| + \sigma} + 1\right]$ |

TABLE 20

| | |
|---|---|
| $R_1$ | $\frac{1}{4}\left[\frac{\delta_{RV} - 0 - \sigma}{|\delta_{RV} - 0| + \sigma} + 1\right] \times \left[\frac{\beta_1 - \pi - \delta_{RV} - \sigma}{|\beta_1 - \pi - \delta_{RV}| + \sigma} + 1\right]$ |
| $R_2$ | $\frac{1}{4}\left[\frac{\delta_{RV} - (\beta_1 - \pi) - \sigma}{|\delta_{RV} - (\beta_1 - \pi)| + \sigma} + 1\right] \times \left[\frac{\frac{\pi}{2} - \delta_{RV} - \sigma}{\left|\frac{\pi}{2} - \delta_{RV}\right| + \sigma} + 1\right]$ |
| $R_3$ | $\frac{1}{4}\left[\frac{\delta_{RV} - \frac{\pi}{2} - \sigma}{\left|\delta_{RV} - \frac{\pi}{2}\right| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\beta_1 - \delta_{RV} - \sigma}{|\beta_1 - \delta_{RV}| + \sigma} + 1\right]$ |

TABLE 20-continued

| | |
|---|---|
| $R_5$ | $\frac{1}{4}\left[\frac{\delta_{RV} - \beta_1 - \sigma}{|\delta_{RV} - \beta_1| + \sigma} + 1\right] \times \left[\frac{\frac{3\pi}{2} - \delta_{RV} - \sigma}{\left|\frac{3\pi}{2} - \delta_{RV}\right| + \sigma} + 1\right]$ |
| $R_6$ | $\frac{1}{4}\left[\frac{\delta_{RV} - \frac{3\pi}{2} - \sigma}{\left|\delta_{RV} - \frac{3\pi}{2}\right| + \sigma} + 1\right] \times \left[\frac{2\pi - \delta_{RV} - \sigma}{|2\pi - \delta_{RV}| + \sigma} + 1\right]$ |

In some embodiments, for the third orientation sector $Q_3$, generating converging path information may include determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 21.

TABLE 21

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_2$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_3$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_4$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_5$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_6$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |

In some embodiments, for the third orientation sector $Q_3$, generating converging path information may include determining a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 22.

TABLE 22

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $-(\delta_{RV} - \beta_1 + \pi)$ | 0 | 0 | 0 | 0 | 0 |
| $HV_2$ | 0 | $\delta_{RV} - \beta_1 + \pi$ | 0 | 0 | 0 | 0 |
| $HV_3$ | 0 | $\delta_{RV} - \beta_1 + \pi$ | $\delta_{RV} - \beta_1 + \pi$ | 0 | 0 | 0 |
| $HV_4$ | 0 | $\delta_{RV} - \beta_1 + \pi$ | $\delta_{RV} - \beta_1 + \pi$ | $\delta_{RV} - \beta_1 + \pi$ | 0 | 0 |
| $HV_5$ | $-(\delta_{RV} - \beta_1 + \pi)$ | 0 | 0 | 0 | $-(\delta_{RV} - \beta_1 - \pi)$ | $-(\delta_{RV} - \beta_1 - \pi)$ |
| $HV_6$ | $-(\delta_{RV} - \beta_1 + \pi)$ | 0 | 0 | 0 | 0 | $-(\delta_{RV} - \beta_1 - \pi)$ |

In some embodiments, for the third orientation sector $Q_3$, generating converging path information may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 23.

TABLE 23

| $\alpha_D=$ | $RV_1$ | $RV_2$ | $RV_3$ | $RV_4$ | $RV_5$ | $RV_6$ |
|---|---|---|---|---|---|---|
| $HV_1$ | $-(\delta_{HV} - \delta_{RV})$ | 0 | 0 | 0 | 0 | 0 |
| $HV_2$ | 0 | $\delta_{HV} - \delta_{RV}$ | 0 | 0 | 0 | 0 |
| $HV_3$ | 0 | $\delta_{HV} - \delta_{RV}$ | $\delta_{HV} - \delta_{RV}$ | 0 | 0 | 0 |
| $HV_4$ | 0 | $\delta_{HV} - \delta_{RV}$ | $\delta_{HV} - \delta_{RV}$ | $\delta_{HV} - \delta_{RV}$ | 0 | 0 |
| $HV_5$ | $2\pi - (\delta_{HV} - \delta_{RV})$ | 0 | 0 | 0 | $-(\delta_{HV} - \delta_{RV})$ | $-(\delta_{HV} - \delta_{RV})$ |
| $HV_6$ | $2\pi - (\delta_{HV} - \delta_{RV})$ | 0 | 0 | 0 | 0 | $-(\delta_{HV} - \delta_{RV})$ |

In FIG. 14, $L_{HV}$ indicates a distance from the host vehicle to the projected point of convergence with the remote vehicle expected path 14100, and $L_{RV}$ indicates a distance from the remote vehicle to the projected point of convergence with the host vehicle expected path 14000.

Figure 15:
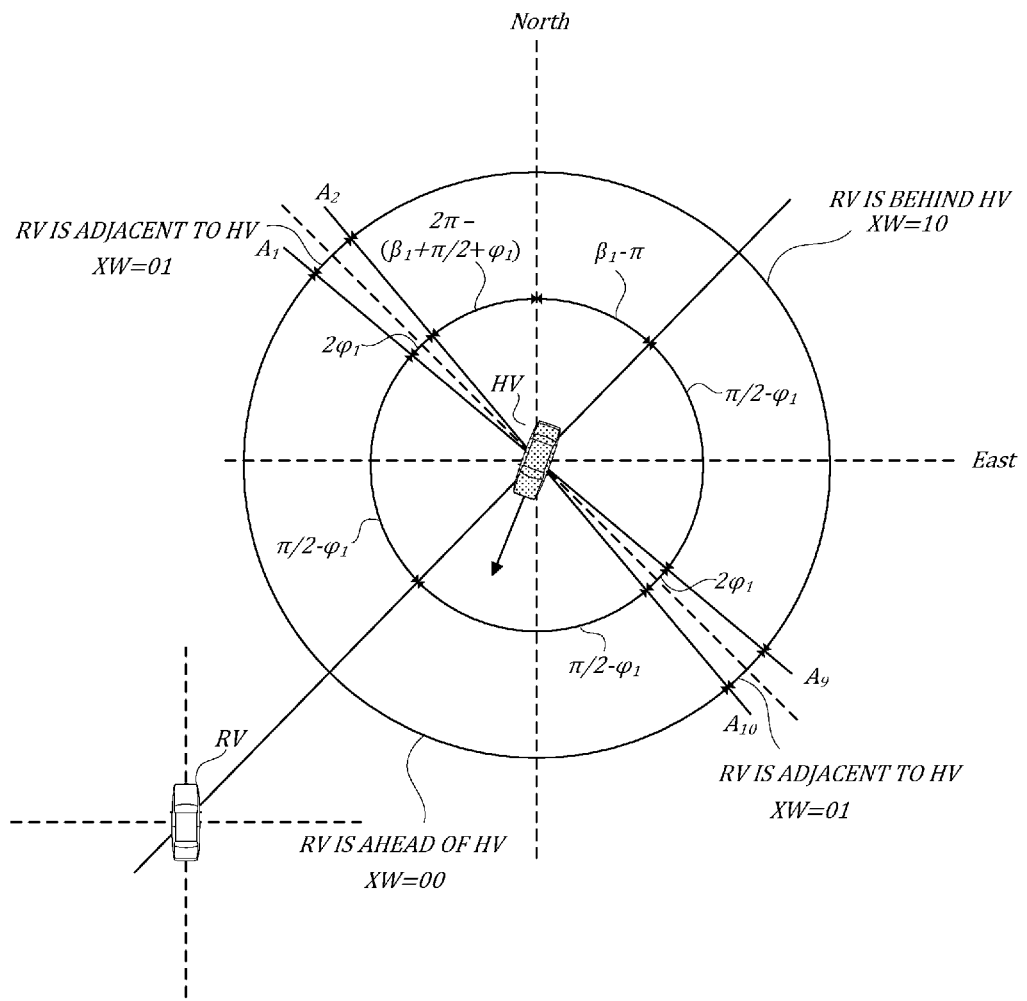
FIG. 15 is a diagram of identifying inter-vehicle state information including longitudinal position for the remote vehicle for a third orientation sector for use in generating converging path information in accordance with this disclosure.
Figure 16:
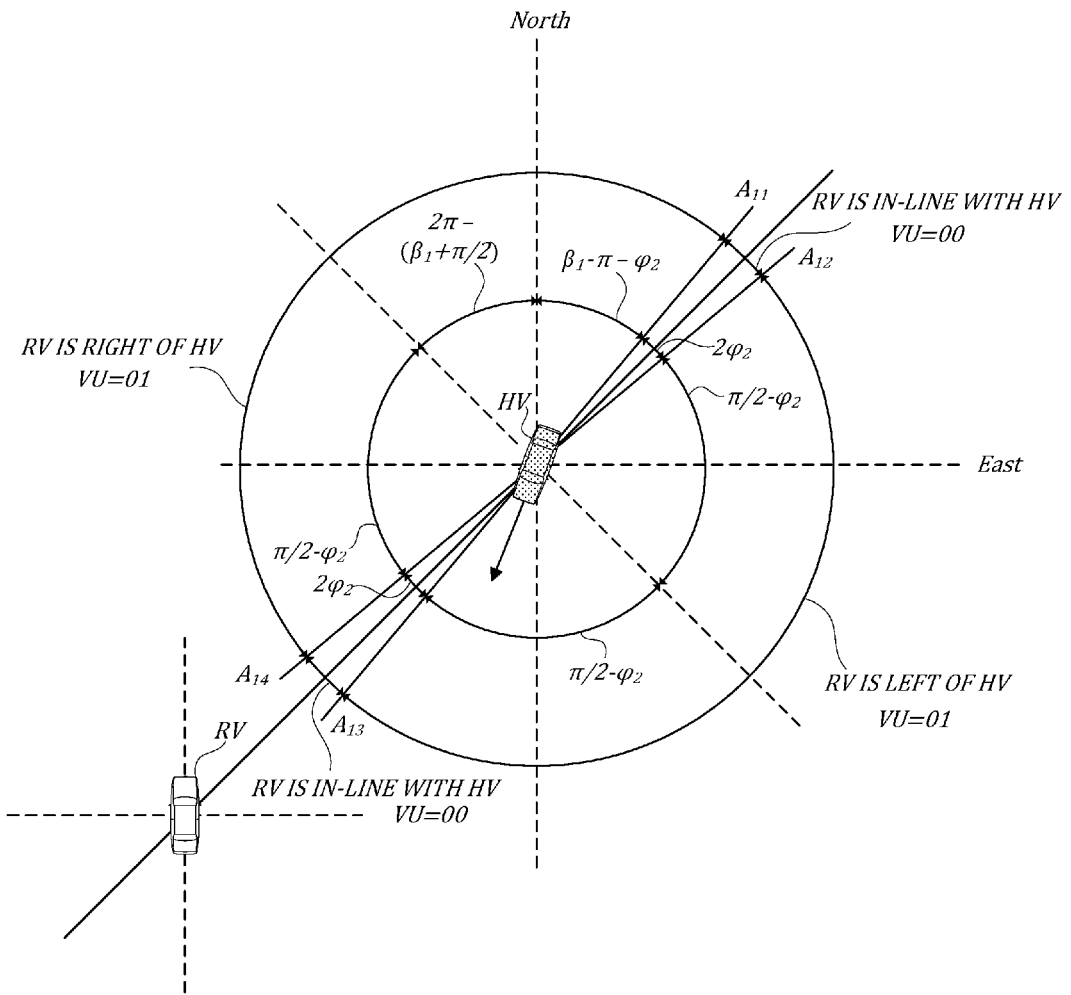
FIG. 16 is a diagram of identifying inter-vehicle state information including relative lateral position for the remote vehicle for a third orientation sector for use in generating converging path information in accordance with this disclosure.

In some embodiments, for the third orientation sector $Q_3$, determining the relative position information for the remote vehicle may include determining a relative longitudinal position for the remote vehicle (XW), as shown in FIG. 15, a relative lateral position for the remote vehicle (VU), as shown in FIG. 16, or both. For simplicity and clarity, in FIGS. 15 and 16, the host vehicle is shown as heading southwest and the remote vehicle heading is omitted.

FIG. 15 is a diagram of identifying inter-vehicle state information including longitudinal position for the remote vehicle (XW) for a third orientation sector $Q_3$ for use in generating converging path information in accordance with this disclosure. Identifying inter-vehicle state information including the longitudinal position for the remote vehicle (XW) for the third orientation sector for use in generating converging path information may be similar to the identification shown in FIG. 7, except as described herein. In some embodiments a longitudinal position of the remote vehicle (XW) may be identified based on host vehicle information, such as a geospatial location of the host vehicle, remote vehicle information, such as a geospatial location of the remote vehicle, or a combination thereof.

In some embodiments, as shown in FIG. 15, the relative longitudinal position for the remote vehicle may be identified as being ahead of the host vehicle (XW=00), a remote vehicle heading angle $\delta_{RV}$ may indicate a heading angle for the remote vehicle, which may correspond with expected path for the remote vehicle, a host vehicle heading angle $\delta_{HV}$ may indicate a heading angle for the host vehicle, which may correspond with expected path for the host vehicle, an angular offset threshold $\phi_P$ may define an angular range in which the remote vehicle may be determined to be adjacent to the host vehicle, and $A_{12}<=\delta_{HV}\leq A_1$ may indicate that the relative longitudinal position for the remote vehicle is ahead of the host vehicle, where $A_1=\beta_1+\pi/2-\phi_P$ and $A_{10}=\beta_1-\pi/2+\phi_P$.

For example, determining that the relative longitudinal position for the remote vehicle is ahead of the host vehicle may be expressed as the following:

$$P_{Q_3} = \frac{1}{4}\left[\frac{\delta_{HV} - A_{10} + \sigma}{|\delta_{HV} - A_{10}| + \sigma} + 1\right] \times \left[\frac{A_1 - \delta_{HV} - \sigma}{|A_1 - \delta_{HV}| + \sigma} + 1\right]. \quad \text{[Equation 20]}$$

In some embodiments, as shown in FIG. 15, the relative longitudinal position for the remote vehicle may be identified as being adjacent to the host vehicle (XW=01), and $A_1<=\delta_{HV}<A_2$ or $A_9<=\delta_{HV}<A_{10}$ may indicate that the relative longitudinal position for the remote vehicle is adjacent to the host vehicle, where $A_1=\beta_1+\pi/2-\phi_P$, $A_2=\beta_1+\pi/2+\phi_P$, $A_9=\beta_1-\pi/2-\phi_P$, and $A_{10}=\beta_1-\pi/2+\phi_P$.

For example, determining that the relative longitudinal position for the remote vehicle is adjacent to the host vehicle may be expressed as the following:

$$A_{Q_3} = \frac{1}{4}\left[\frac{\delta_{HV} - A_1 + \sigma}{|\delta_{HV} - A_1| + \sigma} + 1\right] \times \left[\frac{A_2 - \delta_{HV} - \sigma}{|A_2 - \delta_{HV}| + \sigma} + 1\right] + \quad \text{[Equation 21]}$$
$$\frac{1}{4}\left[\frac{\delta_{HV} - A_9 + \sigma}{|\delta_{HV} - A_9| + \sigma} + 1\right] \times \left[\frac{A_{10} - \delta_{HV} - \sigma}{A_{10} - \delta_{HV}| + \sigma} + 1\right].$$

In some embodiments, as shown in FIG. 15, the relative longitudinal position for the remote vehicle may be identified as being behind the host vehicle (XW=10), and $A_2<=\delta_{HV}<2\pi$ or $0<=\delta_{HV}<A_9$ may indicate that the relative longitudinal position for the remote vehicle is behind the host vehicle, where $A_2=\beta_1+\pi/2+\phi_P$, and $A_9=\beta_1-\pi/2-\phi_P$.

For example, determining that the relative longitudinal position for the remote vehicle is behind the host vehicle may be expressed as the following:

$$B_{Q_3} = \frac{1}{4}\left[\frac{\delta_{HV} - 0 + \sigma}{|\delta_{HV} - 0| + \sigma} + 1\right] \times \left[\frac{A_9 - \delta_{HV} - \sigma}{|A_9 - \delta_{HV}| + \sigma} + 1\right] + \quad \text{[Equation 22]}$$
$$\frac{1}{4}\left[\frac{\delta_{HV} - A_2 + \sigma}{|\delta_{HV} - A_2| + \sigma} + 1\right] \times \left[\frac{2\pi - \delta_{HV} - \sigma}{2\pi - \delta_{HV}| + \sigma} + 1\right].$$

In some embodiments, for the third orientation sector $Q_3$, a relative lateral position for the remote vehicle (VU) may be identified based on host vehicle information, such as a geospatial location of the host vehicle, remote vehicle information, such as a geospatial location of the remote vehicle, or a combination thereof.

FIG. 16 is a diagram of identifying inter-vehicle state information including relative lateral position for the remote vehicle (VU) for a third orientation sector $Q_3$ for use in generating converging path information in accordance with this disclosure. Identifying inter-vehicle state information including the relative lateral position for the remote vehicle (VU) for the third orientation sector for use in generating converging path information may be similar to the identification shown in FIG. 8, except as described herein. In some embodiments, the relative lateral position for the remote vehicle may be identified as being in-line with, or in the same lane as, the host vehicle (VU=00), a remote vehicle heading angle $\delta_{RV}$ may indicate a heading angle for the remote vehicle, which may correspond with expected path for the remote vehicle, a host vehicle heading angle $\delta_{HV}$ may indicate a heading angle for the host vehicle, which may correspond with an expected path for the host vehicle, an angular offset threshold $\phi_I$ may define an angular range in which the relative lateral position for the remote vehicle may be determined to be in-line with the host vehicle, and $A_{11}<=\delta_{HV}<A_{12}$ or $A_{13}<=\delta_{HV}<A_{14}$ may indicate that the relative lateral position for the remote vehicle is in-line with the host vehicle, where $A_{11}=\beta_1-\pi-\phi_I$, $A_{12}=\beta_1-\pi+\phi_I$, $A_{13}=\beta_1-\phi_I$, and $A_{14}=\beta_1-I-\phi_I$.

For example, determining that the relative lateral position for the remote vehicle is in-line with the host vehicle may be expressed as the following:

$$I_{Q_3} = \frac{1}{4}\left[\frac{\delta_{HV} - A_{11} + \sigma}{|\delta_{HV} - A_{11}| + \sigma} + 1\right] \times \left[\frac{A_{12} - \delta_{HV} - \sigma}{|A_{12} - \delta_{HV}| + \sigma} + 1\right] + \quad \text{[Equation 23]}$$
$$\frac{1}{4}\left[\frac{\delta_{HV} - A_{13} + \sigma}{|\delta_{HV} - A_{13}| + \sigma} + 1\right] \times \left[\frac{A_{14} - \delta_{HV} - \sigma}{A_{14} - \delta_{HV}| + \sigma} + 1\right].$$

In some embodiments, as shown in FIG. 16, the relative lateral position for the remote vehicle may be identified as being to the left of the host vehicle (VU=01), and $0<=\delta_{HV}<A_{11}$ or $A_{14}<=\delta_{HV}<2\pi$ may indicate that the relative lateral position for the remote vehicle is to the left of the host vehicle, where $A_{11}=\beta_1-\pi-\phi_I$, $A_{12}=\beta_1-\pi+\phi_I$, $A_{13}=\beta_1-\phi_I$, and $A_{14}=\beta_1+\phi_I$.

For example, determining that the relative lateral position for the remote vehicle is to the left of the host vehicle may be expressed as the following:

$$L_{Q_3} = \frac{1}{4}\left[\frac{\delta_{HV} - 0 + \sigma}{|\delta_{HV} - 0| + \sigma} + 1\right] \times \left[\frac{A_{11} - \delta_{HV} - \sigma}{|A_{11} - \delta_{HV}| + \sigma} + 1\right] + \quad \text{[Equation 24]}$$
$$\frac{1}{4}\left[\frac{\delta_{HV} - A_{14} + \sigma}{|\delta_{HV} - A_{14}| + \sigma} + 1\right] \times \left[\frac{2\pi - \delta_{HV} - \sigma}{|2\pi - \delta_{HV}| + \sigma} + 1\right].$$

In some embodiments, as shown in FIG. 16, the relative lateral position for the remote vehicle may be identified as being to the right of the host vehicle (VU=10), and $A_{12}<=\delta_{HV}<A_{13}$ may indicate that the relative lateral position for the remote vehicle is to the right of the host vehicle, where $A_{11}=\beta_1-\pi-\phi_I$, $A_{12}=\beta_1-\pi+\phi_I$, $A_{13}=\beta_1-\phi_I$, and $A_{14}=\beta_1+\phi_I$.

For example, determining that the relative lateral position for the remote vehicle is to the right of the host vehicle may be expressed as the following:

$$R_{Q_3} = \frac{1}{4}\left[\frac{\delta_{HV} - A_{12} + \sigma}{|\delta_{HV} - A_{12}| + \sigma} + 1\right] \times \left[\frac{A_{13} - \delta_{HV} - \sigma}{|A_{13} - \delta_{HV}| + \sigma} + 1\right]. \quad \text{[Equation 25]}$$

In an example, for the third orientation sector $Q_3$, determining relative position information may be expressed as shown in the following table:

TABLE 24

| $Q_3$ | | Lateral Position | | |
|---|---|---|---|---|
| | | RV in lane ($I_{Q3}$) | RV Left ($L_{Q3}$) | RV Right ($R_{Q3}$) |
| Longitudinal Position | RV Ahead ($P_{Q3}$) | $Q_3 \times P_{Q3} \times I_{Q3}$ | $Q_3 \times P_{Q3} \times L_{Q3}$ | $Q_3 \times P_{Q3} \times R_{Q3}$ |
| | RV Adjacent ($A_{Q3}$) | $Q_3 \times A_{Q3} \times I_{Q3}$ | $Q_3 \times A_{Q3} \times L_{Q3}$ | $Q_3 \times A_{Q3} \times R_{Q3}$ |
| | RV Behind ($B_{Q3}$) | $Q_3 \times B_{Q3} \times I_{Q3}$ | $Q_3 \times B_{Q3} \times L_{Q3}$ | $Q_3 \times B_{Q3} \times R_{Q3}$ |

In some embodiments, a remote vehicle (RV) may be identified in the fourth orientation sector $Q_4$, to the northwest of the host vehicle (HV), as shown in FIGS. 17-20. For example, the latitude of the remote vehicle may be greater than the latitude for the host vehicle, the longitude for remote vehicle may be less than the longitude for the host vehicle, and the remote vehicle may be identified as being in the fourth orientation sector $Q_4$, which may be expressed as the following:

$$Q_4 = \frac{1}{4}\left[\frac{\phi_{RV} - \phi_{HV} + \sigma}{|\phi_{RV} - \phi_{HV}| + \sigma} + 1\right] \times \left[\frac{\theta_{HV} - \theta_{RV} - \sigma}{|\theta_{HV} - \theta_{RV}| + \sigma} + 1\right]. \quad \text{[Equation 26]}$$

For example, the latitude of the remote vehicle may be greater than the latitude for the host vehicle, the longitude for remote vehicle may be less than the longitude for the host vehicle, Equation 26 may evaluate to one, and the remote vehicle may be identified as being in the fourth orientation sector $Q_4$. In some embodiments, the remote vehicle may be in an orientation sector other than the fourth orientation sector $Q_4$ and Equation 26 may evaluate to zero.

Figure 17:
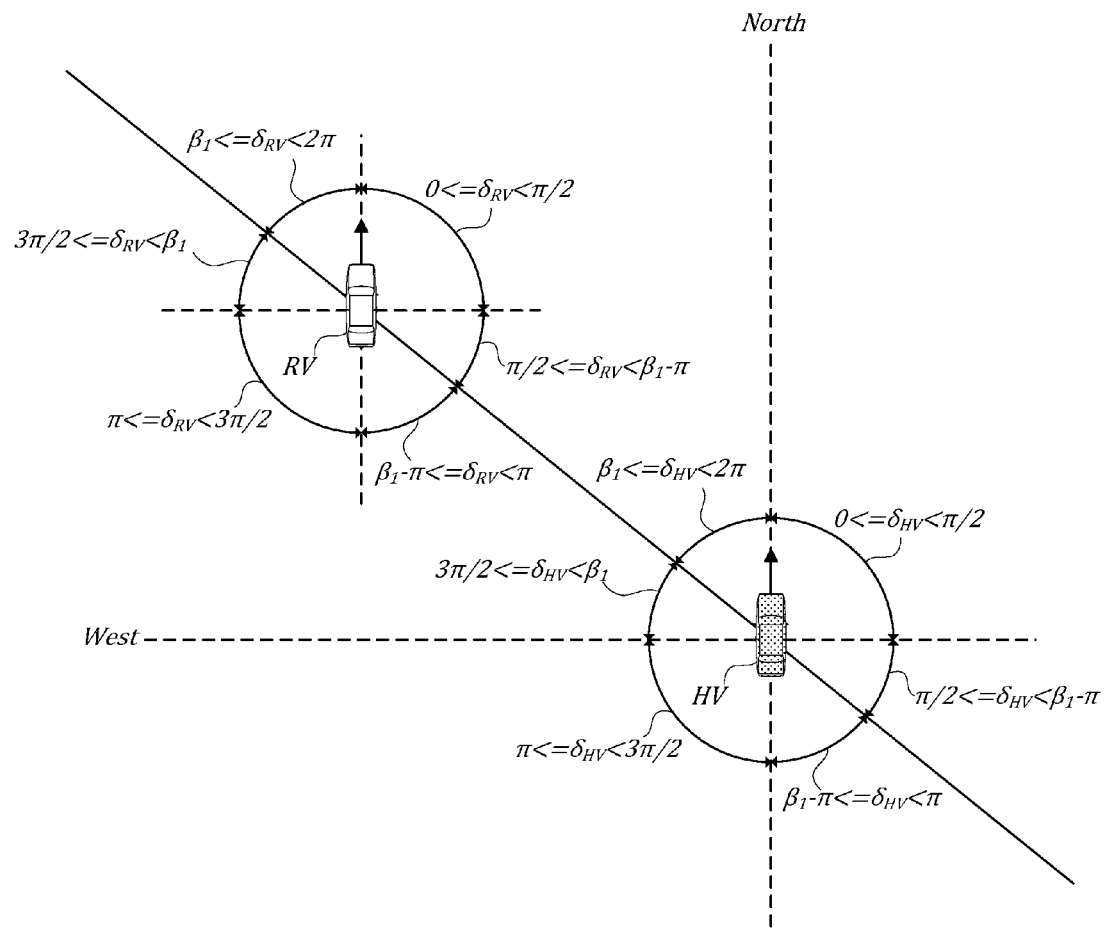
FIG. 17 is a diagram of identifying inter-vehicle state information including a geodesic for a fourth orientation sector for use in generating converging path information in accordance with this disclosure.

FIG. 17 is a diagram of identifying inter-vehicle state information including a geodesic for a fourth orientation sector for use in generating converging path information in accordance with this disclosure. Identifying inter-vehicle state information including a geodesic for a fourth orientation sector for use in generating converging path information may be similar to the identification shown in FIG. 5, except as described herein. In the fourth orientation sector $Q_4$ the remote vehicle, and the geodesic, is located to the northwest of the host vehicle in the geospatial domain.

In some embodiments, as shown in FIG. 17, for the fourth orientation sector $Q_4$, generating converging path information may include determining a host vehicle region for the host vehicle. A first host vehicle region may include host vehicle heading angles $\delta_{HV}$ from the reference direction, which may correspond with north, to ninety degrees, which may correspond with east, and which may be expressed as $0 \mathord{<}\mathord{=} \delta_{HV} \mathord{<} \pi/2$. A second host vehicle region may include host vehicle heading angles $\delta_{HV}$ from ninety degrees to a difference of the convergence angle $\beta_1$ of the geodesic and 180 degrees $\pi$, which may be expressed as $\pi/2 \mathord{<}\mathord{=} \delta_{HV} \mathord{<} \beta_1 - \pi$. A third host vehicle region may include host vehicle heading angles $\delta_{HV}$ from the difference of the convergence angle $\beta_1$ of the geodesic and 180 degrees $\pi$ to 180 degrees, which may correspond with south, and which may be expressed as $\beta_1 - \pi \mathord{<}\mathord{=} \delta_{HV} \mathord{<} \pi$. A fourth host vehicle region may include host vehicle heading angles $\delta_{HV}$ from 180 degrees to 270 degrees, which may correspond with west, and which may be expressed as $\pi \mathord{<}\mathord{=} \delta_{HV} \mathord{<} 3\pi/2$. A fifth host vehicle region may include host vehicle heading angles $\delta_{HV}$ from 270 degrees to the convergence angle $\beta_1$ of the geodesic, which may be expressed as $3\pi/2 \mathord{<}\mathord{=} \delta_{HV} \mathord{<} \beta_1$. A sixth host vehicle region may include host vehicle heading angles $\delta_{HV}$ from the convergence angle $\beta_1$ of the geodesic to 360 degrees, which may correspond with the reference direction, north, and which may be expressed as $\beta_1 \mathord{<}\mathord{=} \delta_{HV} \mathord{<} 2\pi$.

In some embodiments, as shown in FIG. 17, for the fourth orientation sector, generating converging path information may include determining a remote vehicle region for the remote vehicle. A first remote vehicle region may include remote vehicle heading angles $\delta_{HV}$ from the reference direction, which may correspond with north, to ninety degrees, which may correspond with east, and which may be expressed as $0 \mathord{<}\mathord{=} \delta_{RV} \mathord{<} \pi/2$. A second remote vehicle region may include remote vehicle heading angles $\delta_{RV}$ from ninety degrees to a difference of the convergence angle $\beta_1$ of the geodesic and 180 degrees $\pi$, which may be expressed as $\pi/2 \mathord{<}\mathord{=} \delta_{RV} \mathord{<} \beta_1 - \pi$. A third remote vehicle region may include remote vehicle heading angles $\delta_{RV}$ from the difference of the convergence angle $\beta_1$ of the geodesic and 180 degrees $\pi$ to 180 degrees, which may correspond with south, and which may be expressed as $\beta_1 - \pi \mathord{<}\mathord{=} \delta_{RV} \mathord{<} \pi$. A fourth remote vehicle region may include remote vehicle heading angles $\delta_{RV}$ from 180 degrees to 270 degrees, which may correspond with west, and which may be expressed as $\pi \mathord{<}\mathord{=} \delta_{RV} \mathord{<} 3\pi/2$. A fifth remote vehicle region may include remote vehicle heading angles $\delta_{RV}$ from 270 degrees to the convergence angle $\beta_1$ of the geodesic, which may be expressed as $3\pi/2 \mathord{<}\mathord{=} \delta_{RV} \mathord{<} \beta_1$. A sixth remote vehicle region may include remote vehicle heading angles $\delta_{RV}$ from the convergence angle $\beta_1$ of the geodesic to 360 degrees, which may correspond with the reference direction, north, and which may be expressed as $\beta_1 \mathord{<}\mathord{=} \delta_{RV} \mathord{<} 2\pi$.

Figure 18:
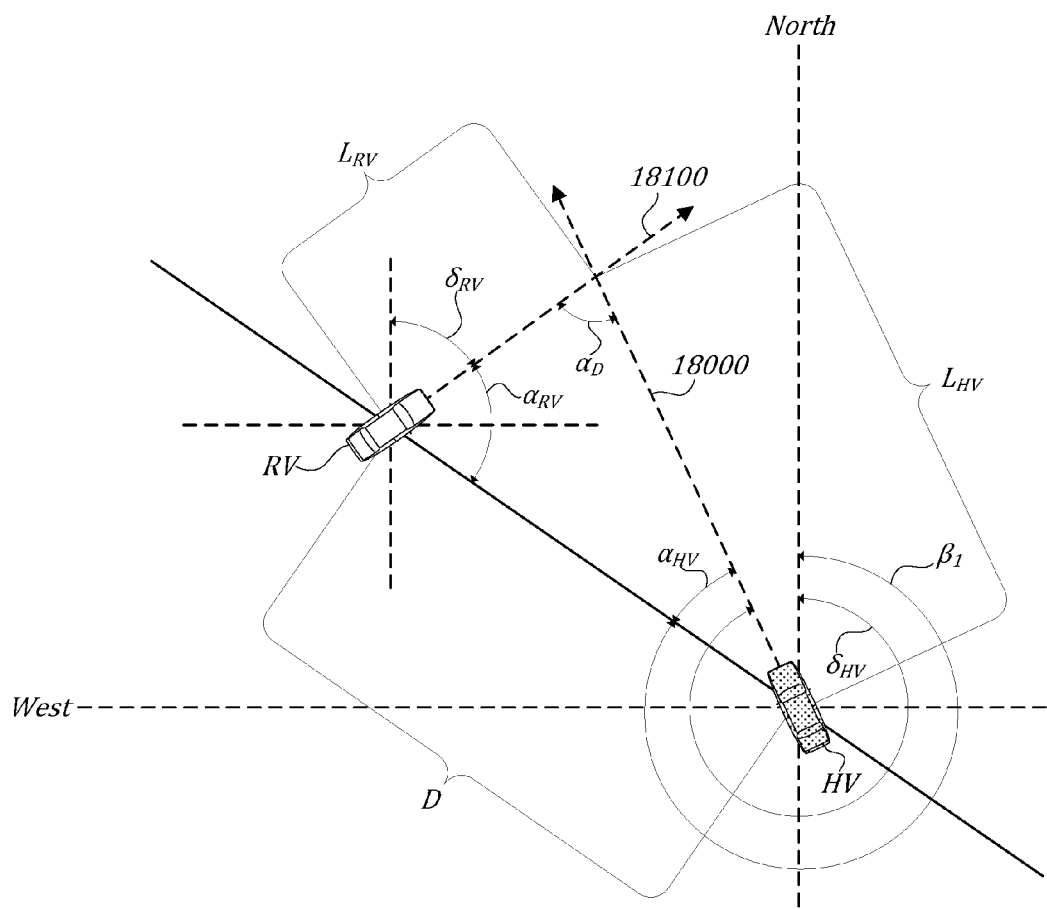
FIG. 18 is a diagram of identifying inter-vehicle state information including convergence information for the fourth orientation sector for use in generating converging path information in accordance with this disclosure.

FIG. 18 is a diagram of identifying inter-vehicle state information including convergence information for the fourth orientation sector for use in generating converging path information in accordance with this disclosure. Identifying inter-vehicle state information including a geodesic for a fourth orientation sector for use in generating converging path information may be similar to the identification shown in FIG. 6, except as described herein.

In some embodiments, for the fourth orientation sector $Q_4$, generating converging path information may include identifying a host vehicle expected path 18000 for the host vehicle (HV), identifying respective remote vehicle expected paths 18100 for one or more of the remote vehicles (RV), or identifying respective expected paths 18000/18100 for the host vehicle and for one or more of the remote vehicles. In some embodiments, the expected paths may be projected, such as in a straight line, from the respective heading information.

In some embodiments, generating converging path information may include determining whether the remote vehicle expected path 18100 and the host vehicle expected path 18000 are convergent, which may indicate that the host vehicle expected path 18000 and the respective remote vehicle expected path 18100 intersect.

In some embodiments, for the fourth orientation sector $Q_4$, determining whether the remote vehicle expected path 18100 and the host vehicle expected path 18000 are convergent may include examining defined convergence data, such as the defined convergence data shown in Table 25.

TABLE 25

|  | $RV_1$ | $RV_2$ | $RV_3$ | $RV_4$ | $RV_5$ | $RV_6$ |
|---|---|---|---|---|---|---|
| $HV_1$ | $\eta_{HV}$ | 1 | 0 | 0 | 0 | 0 |
| $HV_2$ | 0 | $\eta_{HV}$ | 0 | 0 | 0 | 0 |
| $HV_3$ | 0 | 0 | $\eta_{HV}$ | 0 | 0 | 0 |
| $HV_4$ | 0 | 0 | 1 | $\eta_{HV}$ | 0 | 0 |
| $HV_5$ | 0 | 0 | 1 | 1 | $\eta_{HV}$ | 0 |
| $HV_6$ | 1 | 1 | 0 | 0 | 1 | $\eta_{HV}$ |

In some embodiments, determining $\eta_{HV}$ may be expressed as shown in Equation 37. In some embodiments, determining $\eta_{RV}$ may be expressed as shown in Equation 38.

In some embodiments, for the fourth orientation sector $Q_4$, a combination ($F_{m,n}$) of the host vehicle heading angle $\delta_{HV}$ and the remote vehicle heading angle $\delta_{RV}$ may be expressed as shown in Tables 26-28.

TABLE 26

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 27

| $H_1$ | $\frac{1}{4}\left[\frac{\delta_{HV} - 0 - \sigma}{|\delta_{HV} - 0| + \sigma} + 1\right] \times \left[\frac{\frac{\pi}{2} - \delta_{HV} - \sigma}{\left|\frac{\pi}{2} - \delta_{HV}\right| + \sigma} + 1\right]$ |
|---|---|
| $H_2$ | $\frac{1}{4}\left[\frac{\delta_{HV} - \frac{\pi}{2} - \sigma}{\left|\delta_{HV} - \frac{\pi}{2}\right| + \sigma} + 1\right] \times \left[\frac{(\beta_1 - \pi) - \delta_{HV} - \sigma}{|(\beta_1 - \pi) - \delta_{HV}| + \sigma} + 1\right]$ |

TABLE 27-continued

| $H_3$ | $\frac{1}{4}\left[\frac{\delta_{HV} - (\beta_1 - \pi) - \sigma}{|\delta_{HV} - (\beta_1 - \pi)| + \sigma} + 1\right] \times \left[\frac{\pi - \delta_{HV} - \sigma}{|\pi - \delta_{HV}| + \sigma} + 1\right]$ |
|---|---|
| $H_4$ | $\frac{1}{4}\left[\frac{\delta_{HV} - \pi - \sigma}{|\delta_{HV} - \pi| + \sigma} + 1\right] \times \left[\frac{\frac{3\pi}{2} - \delta_{HV} - \sigma}{\left|\frac{3\pi}{2} - \delta_{HV}\right| + \sigma} + 1\right]$ |
| $H_5$ | $\frac{1}{4}\left[\frac{\delta_{HV} - \frac{3\pi}{2} - \sigma}{\left|\delta_{HV} - \frac{3\pi}{2}\right| + \sigma} + 1\right] \times \left[\frac{\beta_1 - \delta_{HV} - \sigma}{|\beta_1 - \delta_{HV}| + \sigma} + 1\right]$ |
| $H_6$ | $\frac{1}{4}\left[\frac{\delta_{HV} - \beta_1 - \sigma}{|\delta_{HV} - \beta_1| + \sigma} + 1\right] \times \left[\frac{2\pi - \delta_{HV} - \sigma}{|2\pi - \delta_{HV}| + \sigma} + 1\right]$ |

TABLE 28

| $R_1$ | $\frac{1}{4}\left[\frac{\delta_{RV} - 0 - \sigma}{|\delta_{RV} - 0| + \sigma} + 1\right] \times \left[\frac{\frac{\pi}{2} - \delta_{RV} - \sigma}{\left|\frac{\pi}{2} - \delta_{RV}\right| + \sigma} + 1\right]$ |
|---|---|
| $R_2$ | $\frac{1}{4}\left[\frac{\delta_{RV} - \frac{\pi}{2} - \sigma}{\left|\delta_{RV} - \frac{\pi}{2}\right| + \sigma} + 1\right] \times \left[\frac{(\beta_1 - \pi) - \delta_{RV} - \sigma}{|(\beta_1 - \pi) - \delta_{RV}| + \sigma} + 1\right]$ |
| $R_3$ | $\frac{1}{4}\left[\frac{\delta_{RV} - (\beta_1 - \pi) - \sigma}{|\delta_{RV} - (\beta_1 - \pi)| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\frac{3\pi}{2} - \delta_{RV} - \sigma}{\left|\frac{3\pi}{2} - \delta_{RV}\right| + \sigma} + 1\right]$ |
| $R_5$ | $\frac{1}{4}\left[\frac{\delta_{RV} - \frac{3\pi}{2} - \sigma}{\left|\delta_{RV} - \frac{3\pi}{2}\right| + \sigma} + 1\right] \times \left[\frac{\beta_1 - \delta_{RV} - \sigma}{|\beta_1 - \delta_{RV}| + \sigma} + 1\right]$ |
| $R_6$ | $\frac{1}{4}\left[\frac{\delta_{RV} - \beta_1 - \sigma}{|\delta_{RV} - \beta_1| + \sigma} + 1\right] \times \left[\frac{2\pi - \delta_{RV} - \sigma}{|2\pi - \delta_{RV}| + \sigma} + 1\right]$ |

In some embodiments, for the fourth orientation sector $Q_4$, generating converging path information may include determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 29.

TABLE 29

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_2$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_3$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_4$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_5$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_6$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |

In some embodiments, for the fourth orientation sector $Q_4$, generating converging path information may include determining a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 30.

TABLE 30

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $-(\delta_{RV}-\beta_1+\pi)$ | $-(\delta_{RV}-\beta_1+\pi)$ | 0 | 0 | 0 | 0 |
| $HV_2$ | 0 | $-(\delta_{RV}-\beta_1+\pi)$ | 0 | 0 | 0 | 0 |
| $HV_3$ | 0 | 0 | $\delta_{RV}-\beta_1+\pi$ | 0 | 0 | 0 |
| $HV_4$ | 0 | 0 | $\delta_{RV}-\beta_1+\pi$ | $\delta_{RV}-\beta_1+\pi$ | 0 | 0 |
| $HV_5$ | 0 | 0 | $\delta_{RV}-\beta_1+\pi$ | $\delta_{RV}-\beta_1+\pi$ | $\delta_{RV}-\beta_1+\pi$ | 0 |
| $HV_6$ | $-(\delta_{RV}-\beta_1+\pi)$ | $-(\delta_{RV}-\beta_1+\pi)$ | 0 | 0 | 0 | $-(\delta_{RV}-\beta_1-\pi)$ |

In some embodiments, for the fourth orientation sector $Q_4$, generating converging path information may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 31.

TABLE 31

| $\alpha_D=$ | $RV_1$ | $RV_2$ | $RV_3$ | $RV_4$ | $RV_5$ | $RV_6$ |
|---|---|---|---|---|---|---|
| $HV_1$ | $-(\delta_{HV}-\delta_{RV})$ | $-(\delta_{HV}-\delta_{RV})$ | 0 | 0 | 0 | 0 |
| $HV_2$ | 0 | $-(\delta_{HV}-\delta_{RV})$ | 0 | 0 | 0 | 0 |
| $HV_3$ | 0 | 0 | $\delta_{HV}-\delta_{RV}$ | 0 | 0 | 0 |
| $HV_4$ | 0 | 0 | $\delta_{HV}-\delta_{RV}$ | $\delta_{HV}-\delta_{RV}$ | 0 | 0 |
| $HV_5$ | 0 | 0 | $\delta_{HV}-\delta_{RV}$ | $\delta_{HV}-\delta_{RV}$ | $\delta_{HV}-\delta_{RV}$ | 0 |
| $HV_6$ | $2\pi+(\delta_{HV}-\delta_{RV})$ | $2\pi+(\delta_{HV}-\delta_{RV})$ | 0 | 0 | 0 | $-(\delta_{HV}-\delta_{RV})$ |

In FIG. 18, $L_{HV}$ indicates a distance from the host vehicle to the projected point of convergence with the remote vehicle expected path 18100, and $L_{RV}$ indicates a distance from the remote vehicle to the projected point of convergence with the host vehicle expected path 18000.

Figure 19:
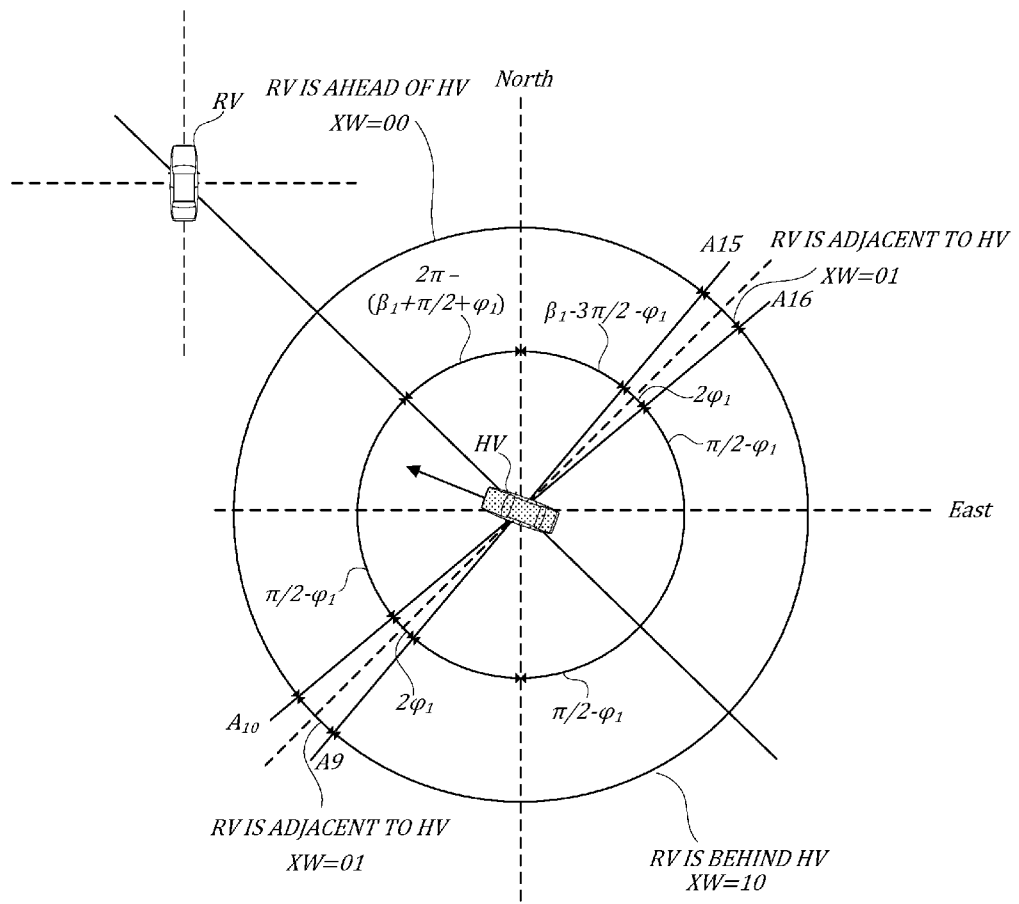
FIG. 19 is a diagram of identifying inter-vehicle state information including longitudinal position for the remote vehicle for a fourth orientation sector for use in generating converging path information in accordance with this disclosure.
Figure 20:
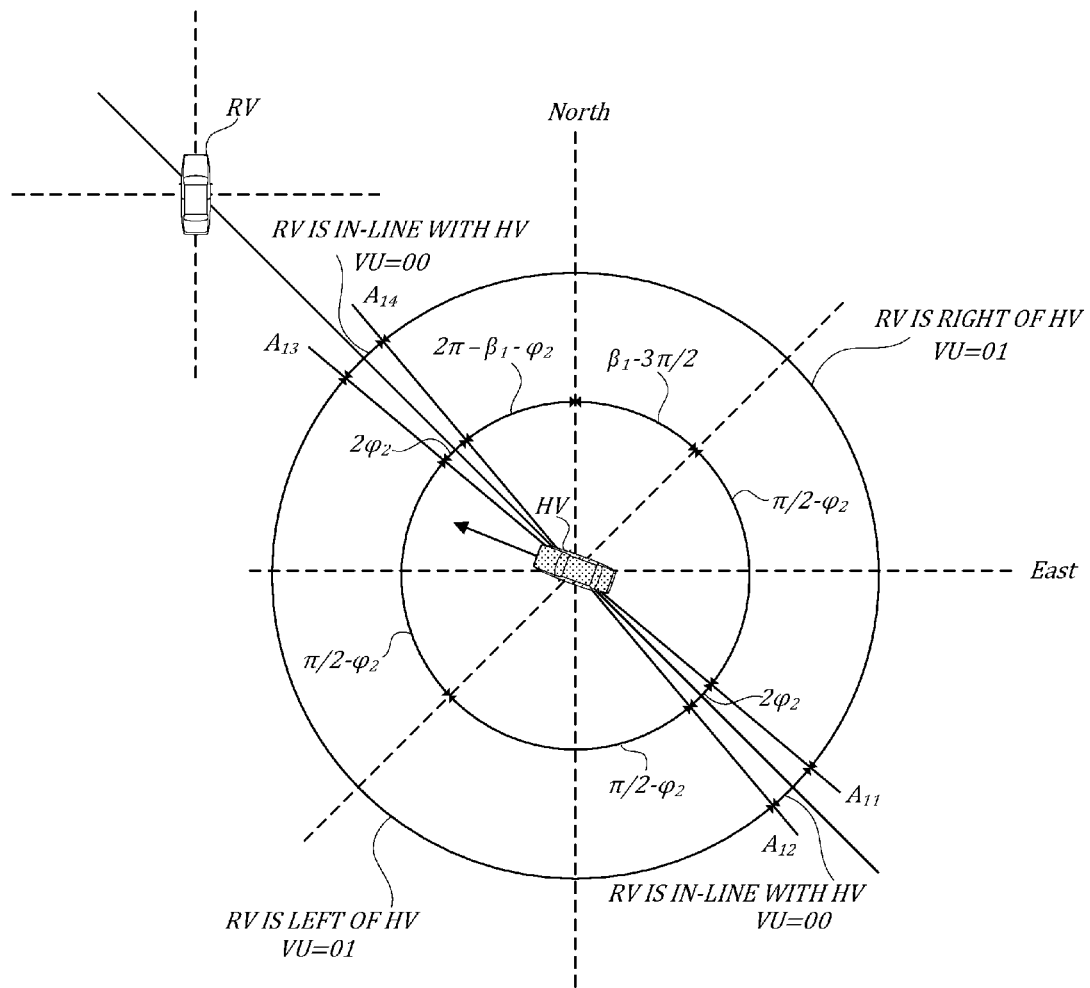
FIG. 20 is a diagram of identifying inter-vehicle state information including a relative lateral position of the remote vehicle for a fourth orientation sector for use in generating converging path information in accordance with this disclosure.
Figure 21:
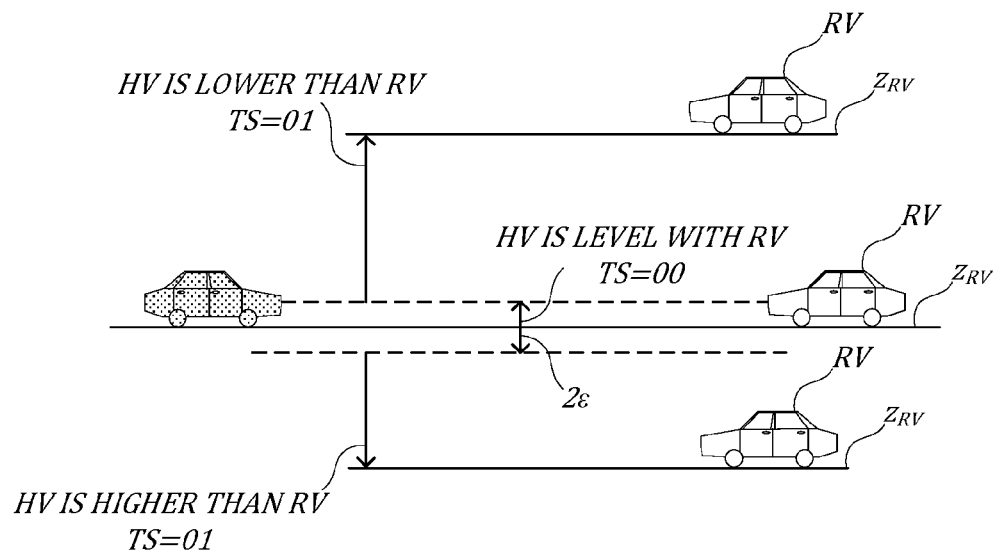
FIG. 21 is a diagram of identifying inter-vehicle state information including relative elevation information for use in generating converging path information in accordance with this disclosure.

In some embodiments, for the fourth orientation sector $Q_4$, determining the relative position information for the remote vehicle may include determining a relative longitudinal position for the remote vehicle (XW), as shown in FIG. 19, a relative lateral position for the remote vehicle (VU), as shown in FIG. 20, or both. For simplicity and clarity, in FIGS. 19 and 20, the host vehicle is shown as heading northwest and the remote vehicle heading is omitted.

FIG. 19 is a diagram of identifying inter-vehicle state information including longitudinal position for the remote vehicle (XW) for a fourth orientation sector $Q_4$ for use in generating converging path information in accordance with this disclosure. Identifying inter-vehicle state information including the longitudinal position for the remote vehicle (XW) for the fourth orientation sector for use in generating converging path information may be similar to the identification shown in FIG. 7, except as described herein. In some embodiments a relative longitudinal position of the remote vehicle (XW) may be identified based on host vehicle information, such as a geospatial location of the host vehicle, remote vehicle information, such as a geospatial location of the remote vehicle, or a combination thereof.

In some embodiments, as shown in FIG. 19, the relative longitudinal position of the remote vehicle may be identified as being ahead of the host vehicle (XW=00), a remote vehicle heading angle $\delta_{RV}$ may indicate a heading angle for the remote vehicle, which may correspond with expected path for the remote vehicle, a host vehicle heading angle $\delta_{HV}$ may indicate a heading angle for the host vehicle, which may correspond with expected path for the host vehicle, an angular offset threshold $\phi_P$ may define an angular range in which the relative longitudinal position of the remote vehicle may be determined to be adjacent to the host vehicle, and $0<=\delta_{HV}<A_{15}$ or $A_{10}<=\delta_{HV}<2\pi$ may indicate that the relative longitudinal position of the remote vehicle is ahead of the host vehicle, where $A_{15}=\beta_1-3\pi/2-\phi_P$, $A_{16}=\beta_1-3\pi/2+\phi_P$, $A_9=\beta_1-\pi/2-\phi_P$, and $A_{10}=\beta_1-\pi/2+\phi_P$.

For example, determining that the relative longitudinal position of the remote vehicle is ahead of the host vehicle may be expressed as the following:

$$P_{Q4} = \frac{1}{4}\left[\frac{\delta_{HV}-0+\sigma}{|\delta_{HV}-0|+\sigma}+1\right]\times\left[\frac{A_{15}-\delta_{HV}-\sigma}{|A_{15}-\delta_{HV}|+\sigma}+1\right]+ \quad \text{[Equation 27]}$$
$$\frac{1}{4}\left[\frac{\delta_{HV}-A_{10}+\sigma}{|\delta_{HV}-A_{10}|+\sigma}+1\right]\times\left[\frac{2\pi-\delta_{HV}-\sigma}{|2\pi-\delta_{HV}|+\sigma}+1\right].$$

In some embodiments, as shown in FIG. 19, the relative longitudinal position of the remote vehicle may be identified as being adjacent to the host vehicle (XW=01), and $A_{15}<=\delta_{HV}<A_{16}$ or $A_9<=\delta_{HV}<A_{10}$ may indicate that the relative longitudinal position of the remote vehicle is adjacent to the host vehicle, where $A_{15}=\beta_1-3\pi/2-\phi_P$, $A_{16}=\beta_1-3\pi/2+\phi_P$, $A_9=\beta_1-\pi/2-\phi_P$, and $A_{10}=\beta_1-\pi/2+\phi_P$.

For example, determining that the relative longitudinal position of the remote vehicle is adjacent to the host vehicle may be expressed as the following:

$$A_{Q4} = \frac{1}{4}\left[\frac{\delta_{HV}-A_{15}+\sigma}{|\delta_{HV}-A_{15}|+\sigma}+1\right]\times\left[\frac{A_{12}-\delta_{HV}-\sigma}{|A_{12}-\delta_{HV}|+\sigma}+1\right]+ \quad \text{[Equation 28]}$$
$$\frac{1}{4}\left[\frac{\delta_{HV}-A_9+\sigma}{|\delta_{HV}-A_9|+\sigma}+1\right]\times\left[\frac{A_{10}-\delta_{HV}-\sigma}{A_{10}-\delta_{HV}|+\sigma}+1\right].$$

In some embodiments, as shown in FIG. 19, the relative longitudinal position of the remote vehicle may be identified as being behind the host vehicle (XW=10), and $A_{16}<=\delta_{HV}<A_9$ may indicate that the relative longitudinal position of the remote vehicle is behind the host vehicle, where $A_{15}=\beta_1-3\pi/2-\phi_P$, $A_{16}=\beta_1-3\pi/2+\phi_P$, $A_9=\beta_1-\pi/2-\phi_P$, and $A_{10}=\beta_1-\pi/2+\phi_P$.

For example, determining that the relative longitudinal position of the remote vehicle is behind the host vehicle may be expressed as the following:

$$B_{Q4} = \frac{1}{4}\left[\frac{\delta_{HV}-A_{16}+\sigma}{|\delta_{HV}-A_{16}|+\sigma}+1\right] \times \left[\frac{A_9-\delta_{HV}-\sigma}{|A_9-\delta_{HV}|+\sigma}+1\right]. \quad \text{[Equation 29]}$$

In some embodiments, for the fourth orientation sector $Q_4$, a relative lateral position of the remote vehicle (VU) may be identified based on host vehicle information, such as a geospatial location of the host vehicle, remote vehicle information, such as a geospatial location of the remote vehicle, or a combination thereof.

FIG. 20 is a diagram of identifying inter-vehicle state information including a relative lateral position of the remote vehicle (VU) for a fourth orientation sector $Q_4$ for use in generating converging path information in accordance with this disclosure. Identifying inter-vehicle state information including the relative lateral position of the remote vehicle (VU) for the fourth orientation sector for use in generating converging path information may be similar to the identification shown in FIG. 8, except as described herein. In some embodiments, the relative lateral position of the remote vehicle may be identified as being in-line with, or in the same lane as, the host vehicle (VU=00), a remote vehicle heading angle $\delta_{RV}$ may indicate a heading angle for the remote vehicle, which may correspond with expected path for the remote vehicle, a host vehicle heading angle $\delta_{HV}$ may indicate a heading angle for the host vehicle, which may correspond with an expected path for the host vehicle, an angular offset threshold $\phi_I$ may define an angular range in which the remote vehicle may be determined to be in-line with the host vehicle, and $A_{11}<=\delta_{HV}<A_{12}$ or $A_{13}<=\delta_{HV}<A_{14}$ may indicate that the relative lateral position of the remote vehicle is in-line with the host vehicle, where $A_{11}=\beta_1-\pi-\phi_I$, $A_{12}=\beta_1-\pi+\phi_I$, $A_{13}=\beta_1-\phi_I$, and $A_{14}=\beta_1+\phi_I$.

For example, determining that the relative lateral position of the remote vehicle is in-line with the host vehicle may be expressed as the following:

$$I_{Q4} = \frac{1}{4}\left[\frac{\delta_{HV}-A_{11}+\sigma}{|\delta_{HV}-A_{11}|+\sigma}+1\right] \times \left[\frac{A_{12}-\delta_{HV}-\sigma}{|A_{12}-\delta_{HV}|+\sigma}+1\right] + \frac{1}{4}\left[\frac{\delta_{HV}-A_{13}+\sigma}{|\delta_{HV}-A_{13}|+\sigma}+1\right] \times \left[\frac{A_{14}-\delta_{HV}-\sigma}{|A_{14}-\delta_{HV}|+\sigma}+1\right]. \quad \text{[Equation 30]}$$

In some embodiments, as shown in FIG. 20, the relative lateral position of the remote vehicle may be identified as being to the left of the host vehicle (VU=01), and $0<=\delta_{HV}<A_{11}$ or $A_{14}<=\delta_{HV}<2\pi$ may indicate that the relative lateral position of the remote vehicle is to the left of the host vehicle, where $A_{11}=\beta_1-\pi-\phi_I$, $A_{12}=\beta_1-\pi+\phi_I$, $A_{13}=\beta_1-\phi_I$, and $A_{14}=\beta_1+\phi_I$.

For example, determining that the relative lateral position of the remote vehicle is to the left of the host vehicle may be expressed as the following:

$$L_{Q4} = \frac{1}{4}\left[\frac{\delta_{HV}-0+\sigma}{|\delta_{HV}-0|+\sigma}+1\right] \times \left[\frac{A_{11}-\delta_{HV}-\sigma}{|A_{11}-\delta_{HV}|+\sigma}+1\right] + \quad \text{[Equation 31]}$$

$$\frac{1}{4}\left[\frac{\delta_{HV}-A_{14}+\sigma}{|\delta_{HV}-A_{14}|+\sigma}+1\right] \times \left[\frac{2\pi-\delta_{HV}-\sigma}{|2\pi-\delta_{HV}|+\sigma}+1\right].$$

In some embodiments, as shown in FIG. 20, the relative lateral position of the remote vehicle may be identified as being to the right of the host vehicle (VU=10), and $A_{12}<=\delta_{HV}<A_{13}$ may indicate that the relative lateral position of the remote vehicle is to the right of the host vehicle, where $A_{11}=\beta_1-\pi-\phi_I$, $A_{12}=\beta_1-\pi+\phi_I$, $A_{13}=\beta_1-\phi_I$, and $A_{14}=\beta_1+\phi_I$.

For example, determining that the relative lateral position of the remote vehicle is to the right of the host vehicle may be expressed as the following:

$$R_{Q4} = \frac{1}{4}\left[\frac{\delta_{HV}-A_{12}+\sigma}{|\delta_{HV}-A_{12}|+\sigma}+1\right] \times \left[\frac{A_{13}-\delta_{HV}-\sigma}{|A_{13}-\delta_{HV}|+\sigma}+1\right]. \quad \text{[Equation 32]}$$

In an example, for the fourth orientation sector $Q_4$, determining relative position information may be expressed as shown in the following table:

TABLE 32

| | | Lateral Position | | |
|---|---|---|---|---|
| $Q_4$ | | RV in lane ($I_{Q4}$) | RV Left ($L_{Q4}$) | RV Right ($R_{Q4}$) |
| Longitudinal Position | RV Ahead ($P_{Q4}$) | $Q_4 \times P_{Q4} \times I_{Q4}$ | $Q_4 \times P_{Q4} \times L_{Q4}$ | $Q_4 \times P_{Q4} \times R_{Q4}$ |
| | RV Adjacent ($A_{Q4}$) | $Q_4 \times A_{Q4} \times I_{Q4}$ | $Q_4 \times A_{Q4} \times L_{Q4}$ | $Q_4 \times A_{Q4} \times R_{Q4}$ |
| | RV Behind ($B_{Q4}$) | $Q_4 \times B_{Q4} \times I_{Q4}$ | $Q_4 \times B_{Q4} \times L_{Q4}$ | $Q_4 \times B_{Q4} \times R_{Q4}$ |

In some embodiments, the relative position information for the remote vehicle relative to the host vehicle may be expressed as a codeword, or partial codeword, such as a codeword, or partial codeword, including four bits (X, W, V, U), as shown in Table 33 below.

TABLE 33

| | | VU | | | |
|---|---|---|---|---|---|
| | | 00 | 01 | 10 | 11 |
| XW | 00 | 0000 | 0001 | 0010 | 0011 |
| | 01 | 0100 | 0101 | 0110 | 0111 |
| | 10 | 1000 | 1001 | 1010 | 1011 |
| | 11 | 1100 | 1101 | 1110 | 1111 |

In some embodiments, generating the codeword, or partial codeword, representing the longitudinal and lateral position of the remote vehicle relative to the host vehicle, such as the four bits (X, W, V, U), may be expressed as shown in the following table.

TABLE 34

| x | w | v | u |
|---|---|---|---|
| $x_1 = 0$ | $w_1 = 0$ | $v_1 = 0$ | $u_1 = 0$ |
| $x_2 = 0$ | $w_2 = 0$ | $v_2 = 0$ | $u_2 = \Sigma_{i=1}^{4} Q_i \times P_{Qi} \times L_{Qi} \times 1$ |
| $x_3 = 0$ | $w_3 = 0$ | $v_3 = \Sigma_{i=1}^{4} Q_i \times P_{Qi} \times R_{Qi} \times 1$ | $u_3 = 0$ |
| $x_4 = 0$ | $w_4 = \Sigma_{i=1}^{4} Q_i \times A_{Qi} \times I_{Qi} \times 1$ | $v_5 = 0$ | $u_5 = \Sigma_{i=1}^{4} Q_i \times A_{Qi} \times L_{Qi} \times 1$ |

TABLE 34-continued

| x | w | v | u |
|---|---|---|---|
| $x_5 = 0$ | $w_5 = \Sigma_{i=1}^4 Q_i \times A_{Qi} \times L_{Qi} \times 1$ | $v_1 = 0$ | $u_1 = 0$ |
| $x_6 = 0$ | $w_6 = \Sigma_{i=1}^4 Q_i \times A_{Qi} \times R_{Qi} \times 1$ | $v_6 = \Sigma_{i=1}^4 Q_i \times A_{Qi} \times R_{Qi} \times 1$ | $u_6 = 0$ |
| $x_7 = \Sigma_{i=1}^4 Q_i \times B_{Qi} \times I_{Qi} \times 1$ | $w_7 = 0$ | $v_7 = 0$ | $u_7 = 0$ |
| $x_8 = \Sigma_{i=1}^4 Q_i \times B_{Qi} \times L_{Qi} \times 1$ | $w_8 = 0$ | $v_8 = 0$ | $u_8 = \Sigma_{i=1}^4 Q_i \times B_{Qi} \times L_{Qi} \times 1$ |
| $x_9 = \Sigma_{i=1}^4 Q_i \times B_{Qi} \times R_{Qi} \times 1$ | $w_9 = 0$ | $v_9 = \Sigma_{i=1}^4 Q_i \times B_{Qi} \times R_{Qi} \times 1$ | $u_9 = 0$ |
| $X = \Sigma_{i=1}^9 x_i$ | $W = \Sigma_{i=1}^9 w_i$ | $V = \Sigma_{i=1}^9 v_i$ | $U = \Sigma_{i=1}^9 u_i$ |

In some embodiments, determining the host vehicle approach angle $\alpha_{HV}$, the remote vehicle approach angle $\alpha_{RV}$, and the intersection angle $\alpha_D$ for any combination of orientation sector, host vehicle region, and remote vehicle region may be expressed as the in Equations 33-39:

$$Q_1 = \frac{1}{4}\left[\frac{\phi_{RV} - \phi_{HV} - \sigma}{|\phi_{RV} - \phi_{HV}| + \sigma} + 1\right] \times \left[\frac{\theta_{RV} - \theta_{HV} - \sigma}{|\theta_{RV} - \theta_{HV}| + \sigma} + 1\right]. \quad \text{[Equation 33]}$$

$$Q_2 = \frac{1}{4}\left[\frac{\phi_{HV} - \phi_{RV} - \sigma}{|\phi_{RV} - \phi_{HV}| + \sigma} + 1\right] \times \left[\frac{\theta_{RV} - \theta_{HV} - \sigma}{|\theta_{RV} - \theta_{HV}| + \sigma} + 1\right]. \quad \text{[Equation 34]}$$

$$Q_3 = \frac{1}{4}\left[\frac{\phi_{HV} - \phi_{RV} - \sigma}{|\phi_{RV} - \phi_{HV}| + \sigma} + 1\right] \times \left[\frac{\theta_{HV} - \theta_{RV} - \sigma}{|\theta_{RV} - \theta_{HV}| + \sigma} + 1\right]. \quad \text{[Equation 35]}$$

$$Q_4 = \frac{1}{4}\left[\frac{\phi_{RV} - \phi_{HV} - \sigma}{|\phi_{RV} - \phi_{HV}| + \sigma} + 1\right] \times \left[\frac{\theta_{HV} - \theta_{RV} - \sigma}{|\theta_{RV} - \theta_{HV}| + \sigma} + 1\right]. \quad \text{[Equation 36]}$$

$$\alpha_{HV} = Q_1 \sum_{m=1}^{6}\sum_{n=1}^{6} F\eta\alpha_{HV} + Q_2 \sum_{m=1}^{6}\sum_{n=1}^{6} F\eta\alpha_{HV} + Q_3 \sum_{m=1}^{6}\sum_{n=1}^{6} F\eta\alpha_{HV} + Q_4 \sum_{m=1}^{6}\sum_{n=1}^{6} F\eta\alpha_{HV}. \quad \text{[Equation 37]}$$

$$\alpha_{RV} = Q_1 \sum_{m=1}^{6}\sum_{n=1}^{6} F\eta\alpha_{RV} + Q_2 \sum_{m=1}^{6}\sum_{n=1}^{6} F\eta\alpha_{RV} + Q_3 \sum_{m=1}^{6}\sum_{n=1}^{6} F\eta\alpha_{RV} + Q_4 \sum_{m=1}^{6}\sum_{n=1}^{6} F\eta\alpha_{RV}. \quad \text{[Equation 38]}$$

$$\alpha_D = Q_1 \sum_{m=1}^{6}\sum_{n=1}^{6} F\eta\alpha_D + Q_2 \sum_{m=1}^{6}\sum_{n=1}^{6} F\eta\alpha_D + Q_3 \sum_{m=1}^{6}\sum_{n=1}^{6} F\eta\alpha_D + Q_4 \sum_{m=1}^{6}\sum_{n=1}^{6} F\eta\alpha_D. \quad \text{[Equation 39]}$$

For simplicity and clarity, some notation has been omitted from Equations 33-39. For example, the portion $F\eta_{HV}$ at the right hand side of Equation 37 may be more expansively recited as follows:

$$F_{4_{m,n}}\downarrow_{4_{m,n}}\alpha_{HV4_{min}}.$$

In some embodiments, the distance from the host vehicle to the intersection ($l_{HV}$) may be determined as shown in the following:

$$\frac{D}{\sin\alpha_D} = \frac{l_{HV}}{\sin\alpha_{RV}} = \frac{l_{RV}}{\sin\alpha_{HV}}; \quad \text{[Equation 40]}$$

$$l_{HV} = D\frac{\sin\alpha_{RV}}{\sin\alpha_D}.$$

FIG. 21 is a diagram of identifying inter-vehicle state information including relative elevation information for use in generating converging path information in accordance with this disclosure. Identifying inter-vehicle state information may be implemented in a vehicle, such as the vehicle 1000 shown in FIG. 1 or the vehicles 2100/2110 shown in FIG. 2.

In some embodiments, generating converging path information may include determining relative elevation information for the host vehicle (HV), the remote vehicle (RV), or both. In some embodiments, $z_{HV}$ may indicate the host vehicle elevation, $z_{RV}$ may indicate the remote vehicle elevation, $\epsilon$ may indicate a spatial distance offset threshold, such as four meters, and the relative elevation information for the host vehicle and the remote vehicle may indicate that the host vehicle and the remote vehicle are at equivalent elevations, or level, (TS=00), which may be expressed as shown in Equation 41, the relative elevation information for the host vehicle and the remote vehicle may indicate that the host vehicle is at a lower elevation than the remote vehicle (TS=01), which may be expressed as shown in Equation 42, or the relative elevation information for the host vehicle and the remote vehicle may indicate that the host vehicle is at a higher elevation than the remote vehicle (TS=10), which may be expressed as shown in Equation 43, as follows:

$$Z_1 = \frac{1}{4}\left[\frac{\epsilon - (z_{HV} - z_{RV}) + \sigma}{|\epsilon - (z_{HV} - z_{RV})| + \sigma}\right] \times \left[\frac{\epsilon - (z_{RV} - z_{HV}) - \sigma}{|\epsilon - (z_{RV} - z_{HV})| + \sigma}\right] = 1. \quad \text{[Equation 41]}$$

$$Z_2 = \frac{1}{2}\left[\frac{(z_{RV} - z_{HV}) - \epsilon - \sigma}{|(z_{RV} - z_{HV}) - \epsilon| + \sigma}\right] = 1. \quad \text{[Equation 42]}$$

$$Z_3 = \frac{1}{2}\left[\frac{(z_{HV} - z_{RV}) - \epsilon - \sigma}{|(z_{HV} - z_{RV}) - \epsilon| + \sigma}\right] = 1. \quad \text{[Equation 43]}$$

In some embodiments, the relative elevation information for the remote vehicle and the host vehicle may be expressed as a codeword, or partial codeword, such as a codeword, or partial codeword, including two bits (T, S), as shown in Table 35 below.

TABLE 35

| t | s |
|---|---|
| $t_1 = Z_1 \times 0$ | $s_1 = Z_1 \times 0$ |
| $t_2 = Z_2 \times 0$ | $s_2 = Z_2 \times 0$ |
| $t_3 = Z_3 \times 0$ | $s_3 = Z_3 \times 0$ |
| $T = \Sigma_{i=1}^{3} t_i$ | $S = \Sigma_{i=1}^{3} s_i$ |

In some embodiments, generating converging path information may include determining relative heading information, such as heading information for a remote vehicle relative to the host vehicle (RQ), which may include determining a remote vehicle heading angle as a function of the host vehicle heading angle. For example, a remote vehicle may be following behind the host vehicle and traveling in the same direction and the remote vehicle heading angle may be equivalent to the host vehicle heading angle ($\delta_{RV} = \delta_{HV}$).

In some embodiments, determining relative heading information may include using an approximation of a remote vehicle heading. For example, a heading approximation offset threshold $\phi_A$, which may be an angular offset threshold, may indicate a defined range of heading angles, such as a ten degree range of heading angles ($\phi_A=5$), in which the remote vehicle heading may be determined to be aligned with the host vehicle heading. In some embodiments, approximate remote vehicle headings within the defined range of heading angles, centered on the remote vehicle heading, that are equivalent to the host vehicle heading, may be identified, and a remote vehicle heading may be determined using the approximate remote vehicle headings.

In some embodiments, relative heading information (RQ) may indicate that a remote vehicle heading and the host vehicle heading are directionally aligned (RQ=01), the remote vehicle heading and the host vehicle heading are directionally opposed (RQ=10), the remote vehicle heading and the host vehicle heading are directionally perpendicular (RQ=11), or the remote vehicle heading and the host vehicle heading are divergent (RQ=00).

Figure 22:
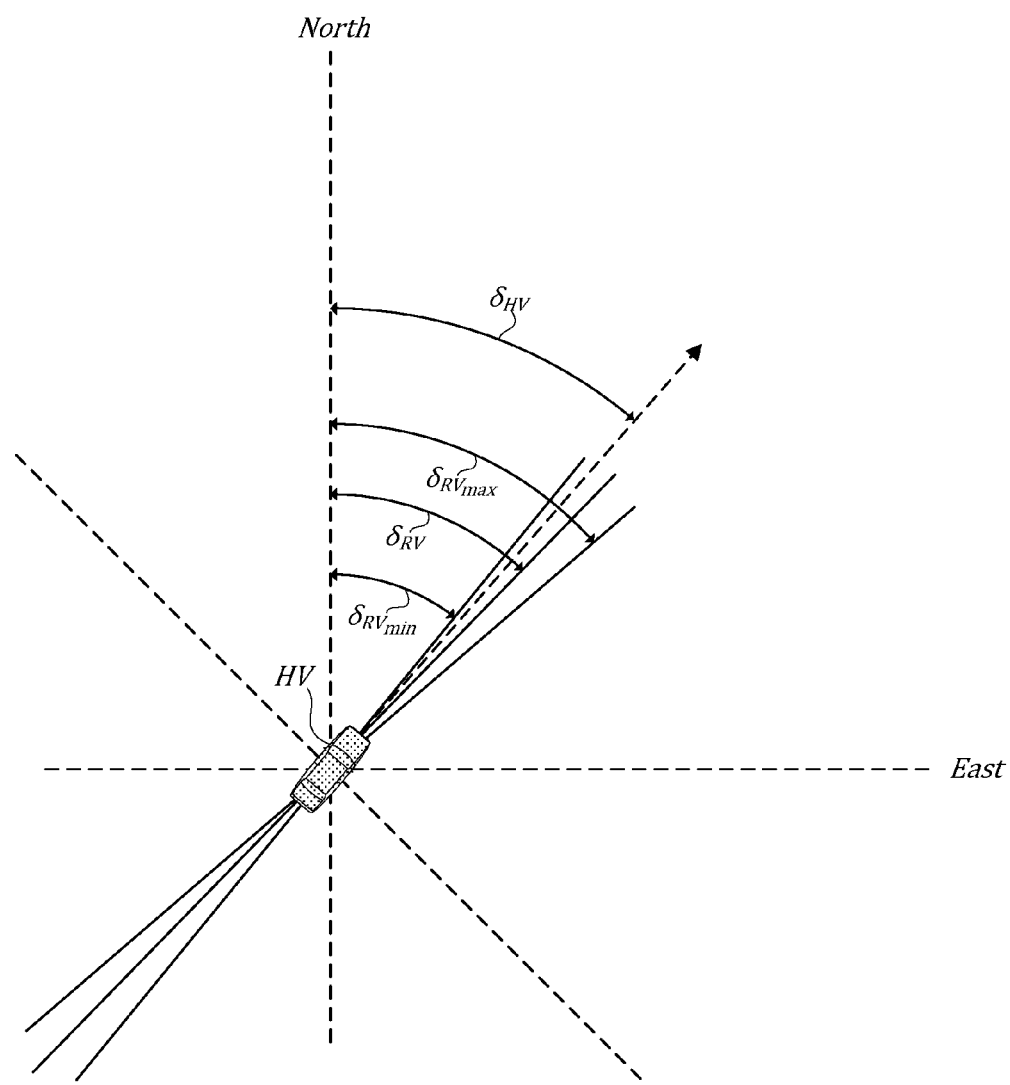
FIG. 22 is a diagram of determining relative heading information for directionally aligned vehicles in accordance with this disclosure.

FIG. 22 is a diagram of determining relative heading information for directionally aligned vehicles in accordance with this disclosure. In some embodiments, determining relative heading information may include identifying a minimum approximate remote vehicle heading angle $\delta_{RV_{min}}^{01}$. For example, the remote vehicle heading angle may be less than the heading approximation offset $\phi_A$, which may be expressed as $\delta_{RV} - \phi_A < 0$, and determining the minimum approximate remote vehicle heading angle may be expressed as follows:

$$\delta_{RV_{min}}^{01} = 2\pi + \delta_{RV} - \phi_A. \quad \text{[Equation 44]}$$

In another example, the remote vehicle heading angle may be at least the heading approximation offset threshold $\phi_A$, which may be expressed as $\delta_{RV} - \phi_A >= 0$, and determining the minimum approximate remote vehicle heading angle may be expressed as follows:

$$\delta_{RV_{min}}^{01} = \delta_{RV} - \phi_A. \quad \text{[Equation 45]}$$

In some embodiments, evaluating whether the remote vehicle heading angle is within the heading approximation range, as expressed in Equations 44 and 45, may be expressed in combination as shown in Equation 46-48, as follows:

$$\varsigma_{min_1} = \frac{1}{2}\left[\frac{0 - (\delta_{RV} - \varphi_A) - \sigma}{|0 - (\delta_{RV} - \varphi_A)| + \sigma} + 1\right]. \quad \text{[Equation 46]}$$

$$\varsigma_{min_2} = \frac{1}{2}\left[\frac{(\delta_{RV} - \varphi_A) - 0 + \sigma}{|(\delta_{RV} - \varphi_A) - 0| + \sigma} + 1\right]. \quad \text{[Equation 47]}$$

$$\delta_{RV_{min}}^{01} = \varsigma_{min_1} \times (2\pi + \delta_{RV} - \phi_A) + \varsigma_{min_2} \times (\delta_{RV} - \phi_A). \quad \text{[Equation 48]}$$

In some embodiments, determining relative heading information may include identifying a maximum approximate remote vehicle heading angle $\delta_{RV_{max}}^{01}$. For example, a sum of the remote vehicle heading angle $\delta_{RV}$ and the heading approximation offset $\phi_A$ may be less than $2\pi$, which may be expressed as $\delta_{RV} + \phi_A < 2\pi$, and determining the maximum approximate remote vehicle heading angle may be expressed as follows:

$$\delta_{RV_{max}}^{01} = \gamma_{RV} + \phi_A. \quad \text{[Equation 49]}$$

In another example, the sum of the remote vehicle heading angle $\delta_{RV}$ and the heading approximation offset $\phi_A$ may be at least $2\pi$, which may be expressed as $\delta_{RV} + \phi_A >= 2\pi$, and determining the maximum approximate remote vehicle heading angle may be expressed as follows:

$$\delta_{RV_{max}}^{01} = \delta_{RV} + \phi_A - 2\pi. \quad \text{[Equation 50]}$$

In some embodiments, evaluating whether the remote vehicle heading angle is within the heading approximation range, as expressed in Equations 49 and 50, may be expressed in combination as shown in Equation 51-53, as follows:

$$\varsigma_{max_1} = \frac{1}{2}\left[\frac{2\pi - (\delta_{RV} + \varphi_A) - \sigma}{|2\pi - (\delta_{RV} + \varphi_A)| + \sigma} + 1\right]. \quad \text{[Equation 51]}$$

$$\varsigma_{max_2} = \frac{1}{2}\left[\frac{(\delta_{RV} + \varphi_A) - 2\pi + \sigma}{|(\delta_{RV} + \varphi_A) - 2\pi| + \sigma} + 1\right]. \quad \text{[Equation 52]}$$

$$\delta_{RV_{max}}^{01} = \varsigma_{max_1} \times (\delta_{RV} + \phi_A) + \varsigma_{max_2} \times (\delta_{RV} + \phi_A - 2\pi). \quad \text{[Equation 53]}$$

In some embodiments, the host vehicle heading angle $\delta_{HV}$ may be within the range from the minimum approximate remote vehicle heading angle $\delta_{RV_{min}}^{01}$ to the maximum approximate remote vehicle heading angle $\delta_{RV_{max}}^{01}$ and the remote vehicle heading angle may be determined to be directionally aligned with the host vehicle heading angle, which may be expressed as $\delta_{RV_{min}}^{01} \leq \delta_{HV} < \delta_{RV_{max}}^{01}$.

Figure 23:
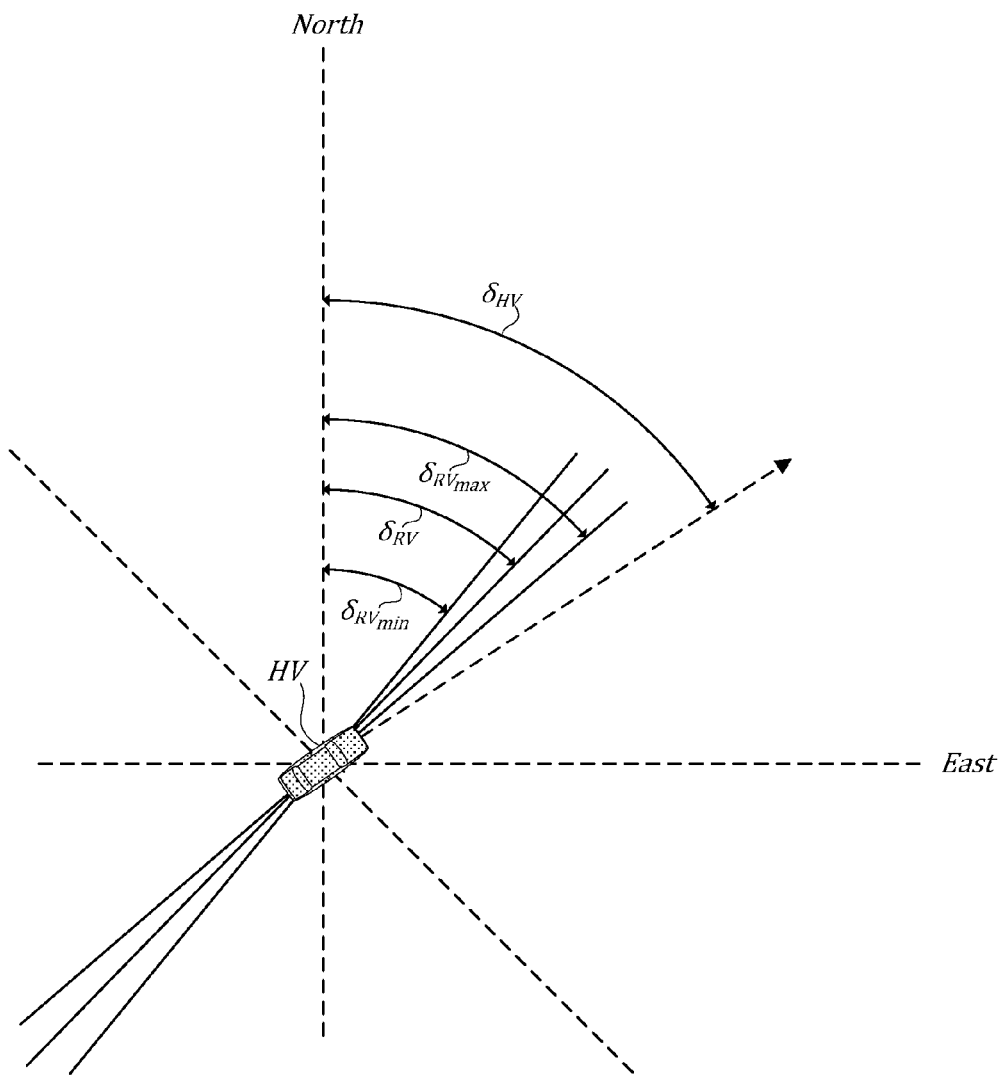
FIG. 23 is a diagram of determining relative heading information with divergent paths in accordance with this disclosure.

FIG. 23 is a diagram of determining relative heading information with divergent paths in accordance with this disclosure. In some embodiments, the host vehicle heading angle $\delta_{HV}$ may be outside the range from the minimum approximate remote vehicle heading angle $\delta_{RV_{min}}^{01}$ to the maximum approximate remote vehicle heading angle $\delta_{RV_{max}}^{01}$ and the remote vehicle expected path may be determined to be divergent with the host vehicle expected path, which may be expressed as $\delta_{RV_{min}}^{01} < \delta_{RV_{max}}^{01} < \delta_{HV}$ (as shown) or $\delta_{HV} < \delta_{RV_{min}}^{01} < \delta_{RV_{max}}^{01}$ (not expressly shown).

Figure 24:
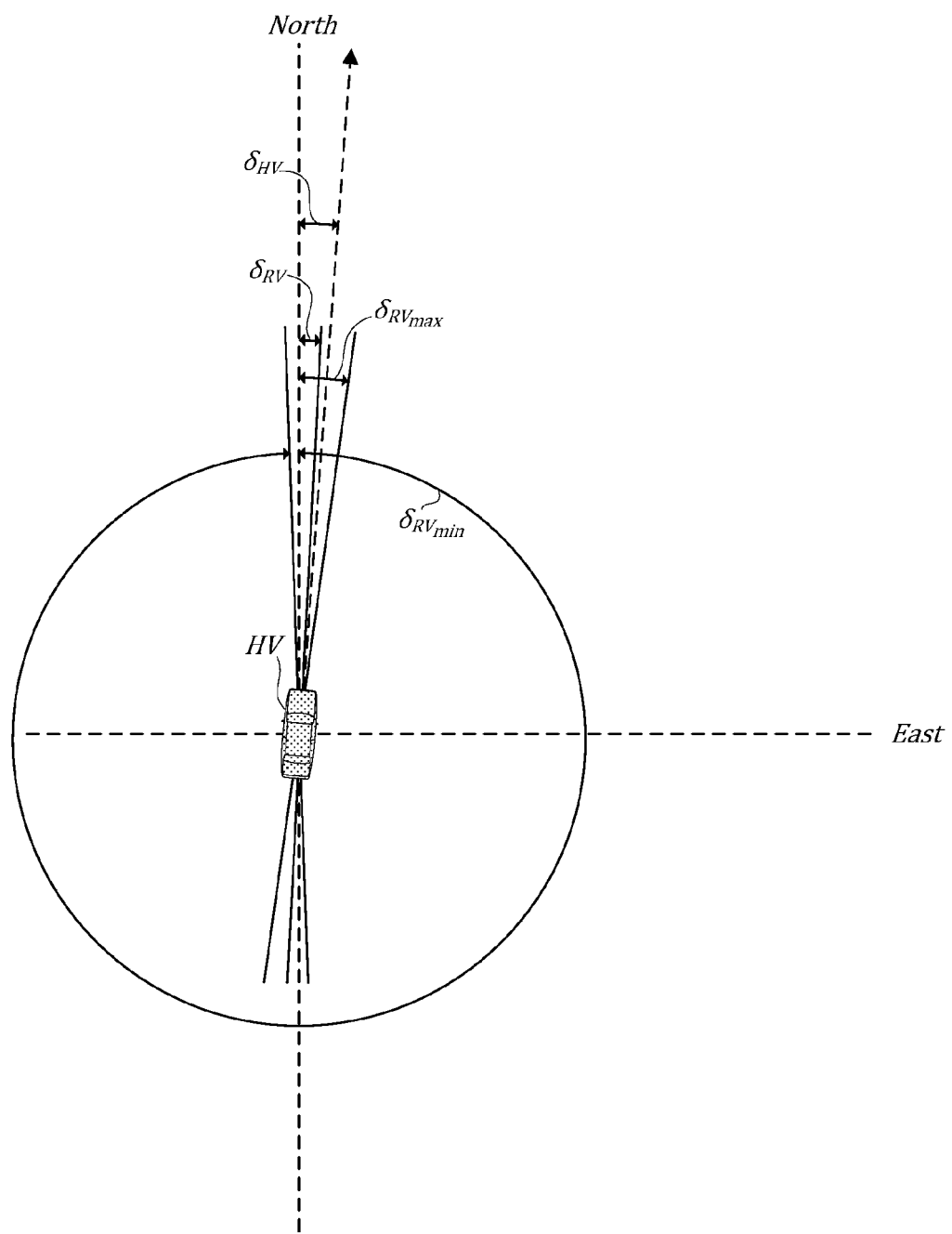
FIGS. 24 and 25 are diagrams of determining relative heading information wherein a difference between the remote vehicle heading angle and the reference direction is within a threshold in accordance with this disclosure.
Figure 25:
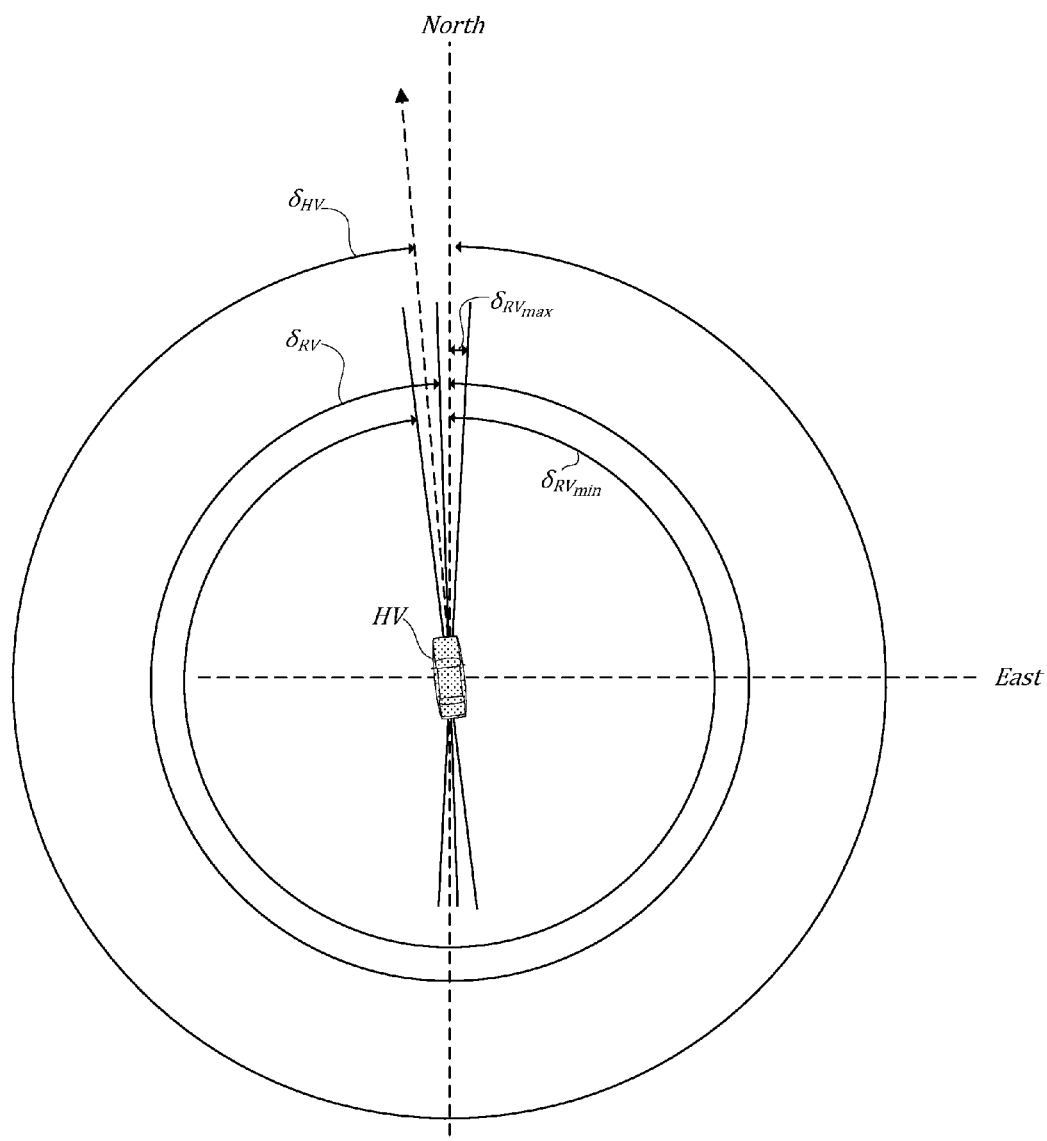

FIGS. 24 and 25 are diagrams of determining relative heading information wherein a difference between the remote vehicle heading angle and the reference direction is within a threshold in accordance with this disclosure. As shown in FIG. 24, the remote vehicle heading angle $\delta_{RV}$ may be less than heading approximation offset threshold $\phi_A$, the maximum approximate remote vehicle heading angle $\delta_{RV_{max}}^{01}$ may be greater than the remote vehicle heading angle $\delta_{RV}$ and the minimum approximate remote vehicle heading angle $\delta_{RV_{min}}^{01}$ may be greater than the maximum approximate remote vehicle heading angle $\delta_{RV_{min}}^{01}$. As shown in FIG. 25, a sum of the remote vehicle heading angle $\delta_{RV}$ and the heading approximation offset $\phi_A$ may be less than $2\pi$, the maximum approximate remote vehicle heading angle $\delta_{RV_{max}}^{01}$ may be less than the remote vehicle heading angle $\delta_{RV}$, and the minimum approximate remote vehicle heading angle $\delta_{RV_{min}}^{01}$ may be greater than the maximum approximate remote vehicle heading angle $\delta_{RV_{max}}^{01}$.

In some embodiments, the host vehicle heading angle $\delta_{HV}$ may be outside the range from the minimum approximate remote vehicle heading angle $\delta_{RV_{min}}^{01}$ to the maximum approximate remote vehicle heading angle $\delta_{RV_{max}}^{01}$ and the remote vehicle expected path may be determined to be divergent with the host vehicle expected path. For example, the host vehicle heading angle $\delta_{HV}$ may be less than the maximum approximate remote vehicle heading angle $\delta_{RV_{max}}^{01}$ and may be less than the minimum approximate remote vehicle heading angle $\delta_{RV_{min}}^{01}$ (as shown), which may be expressed as $\delta_{RV_{min}}^{01} < \delta_{RV_{max}}^{01} < \delta_{HV}$, or the host vehicle heading angle $\delta_{HV}$ may be greater than the maximum approximate remote vehicle heading angle $\delta_{RV_{max}}^{01}$ and may be greater than the minimum approximate remote vehicle heading angle $\delta_{RV_{min}}^{01}$ (not shown), which may be expressed as $\delta_{HV} < \delta_{RV_{min}}^{01} < \delta_{RV_{max}}^{01}$, and a false negative incorrectly indicating that the expected path for the remote vehicle and the expected path for the host vehicle are divergent may be identified. In some embodiments, generating converging path information may include using a stabilization function such that the false negative is correctly identified as convergent. For example, generating converging path information may include generating a codeword indicating whether the remote vehicle expected path and the host vehicle expected path are convergent, and generating converging path information using the stabilization function may include generating a stabilized codeword.

In some embodiments, determining relative heading information using a stabilization function may include determining a minimum stabilization metric $H_1$ a maximum stabilization metric $H_2$, or both. The host vehicle heading angle $\delta_{HV}$ may be at least zero and may be less than $2\pi$, the remote vehicle heading angle $\delta_{RV}$ may be at least zero and may be less than $2\pi$, the minimum approximate remote vehicle heading angle $\delta_{RV_{min}}^{01}$ may be at least zero and may be less than $2\pi$, the maximum approximate remote vehicle heading angle $\delta_{RV_{max}}^{01}$ may be at least zero and may be less than $2\pi$, the minimum stabilization metric $H_1$ may be greater than zero (positive) or less than zero (negative), and the maximum stabilization metric $H_2$ may be greater than zero (positive) or less than zero (negative).

In some embodiments, determining relative heading information using a stabilization function may include determining a minimum stabilization metric $H_1$ by subtracting the minimum approximate remote vehicle heading angle $\delta_{RV_{min}}^{01}$ from the host vehicle heading angle $\delta_{HV}$, which may be expressed as $H_1 = \delta_{HV} - \delta_{RV_{min}}^{01}$, determining a maximum stabilization metric $H_2$ by subtracting the maximum approximate remote vehicle heading angle $\delta_{RV_{max}}^{01}$ from the host vehicle heading angle $\delta_{HV}$, which may be expressed as $H_2 = \delta_{HV} - \delta_{RV_{max}}^{01}$, or generating the minimum stabilization metric and the maximum stabilization metric.

In some embodiments, the host vehicle heading angle $\delta_{HV}$ may be less than the minimum approximate remote vehicle heading angle $\delta_{RV_{min}}^{01}$, the host vehicle heading angle $\delta_{HV}$ may be less than the maximum approximate remote vehicle heading angle $\delta_{RV_{max}}^{01}$, the minimum stabilization metric $H_1$ may be a negative value, the maximum stabilization metric $H_2$ may be a negative value, and the minimum stabilization metric $H_1$ may be less than the maximum stabilization metric $H_2$.

In some embodiments, the host vehicle heading angle $\delta_{HV}$ may be greater than the minimum approximate remote vehicle heading angle $\delta_{RV_{min}}^{01}$, the host vehicle heading angle $\delta_{HV}$ may be less than the maximum approximate remote vehicle heading angle $\delta_{RV_{max}}^{01}$, the minimum stabilization metric $H_1$ may be a positive value, the maximum stabilization metric $H_2$ may be a negative value, and the minimum stabilization metric $H_1$ may be greater than the maximum stabilization metric $H_2$.

In some embodiments, the host vehicle heading angle $\delta_{HV}$ may be greater than the minimum approximate remote vehicle heading angle $\delta_{RV_{min}}^{01}$, the host vehicle heading angle $\delta_{HV}$ may be greater than the maximum approximate remote vehicle heading angle $\delta_{RV_{max}}^{01}$, the minimum stabilization metric $H_1$ may be a positive value, the maximum stabilization metric $H_2$ may be a positive value, and the minimum stabilization metric $H_1$ may be less than the maximum stabilization metric $H_2$.

In some embodiments, a first partial stabilization function $\Delta_1^{01}$ may be expressed as the following:

$$\Delta_1^{01} = \frac{1}{8}\left[\frac{\delta_{RV_{min}}^{01} - \delta_{RV} + \sigma}{|\delta_{RV_{min}}^{01} - \delta_{RV}| + \sigma} + 1\right] \times \qquad \text{[Equation 54]}$$

$$\left[\frac{\delta_{RV_{max}}^{01} - \delta_{RV} + \sigma}{|\delta_{RV_{max}}^{01} - \delta_{RV}| + \sigma} + 1\right] \times \left[1 - \frac{H_1 - H_2 - \sigma}{|H_1 - H_2| + \sigma}\right].$$

In some embodiments, the minimum stabilization metric $H_1$ may be less than the maximum stabilization metric $H_2$, the remote vehicle heading angle $\delta_{RV}$ may be within the minimum approximate remote vehicle heading angle $\delta_{RV_{min}}^{01}$, the remote vehicle heading angle $\delta_{RV}$ may be within the maximum approximate remote vehicle heading angle $\delta_{RV_{max}}^{01}$ and the first partial stabilization function $\Delta_1^{01}$ may evaluate to one. In some embodiments, the minimum stabilization metric $H_1$ may be at least the maximum stabilization metric $H_2$, the remote vehicle heading angle $\delta_{RV}$ may exceed the minimum approximate remote vehicle heading angle $\delta_{RV_{min}}^{01}$, or the remote vehicle heading angle $\delta_{RV}$ may exceed the maximum approximate remote vehicle heading angle $\delta_{RV_{max}}^{01}$, and the first partial stabilization function $\Delta_1^{01}$ may evaluate to zero.

In some embodiments, a second partial stabilization function $\Delta_2^{01}$ may be expressed as the following:

$$\Delta_2^{01} = \frac{1}{8}\left[\frac{\delta_{RV} - \delta_{RV_{min}}^{01} + \sigma}{|\delta_{RV} - \delta_{RV_{min}}^{01}| + \sigma} + 1\right] \times \qquad \text{[Equation 55]}$$

$$\left[\frac{\delta_{RV_{max}}^{01} - \delta_{RV} + \sigma}{|\delta_{RV_{max}}^{01} - \delta_{RV}| + \sigma} + 1\right] \times \left[\frac{H_1 - H_2 - \sigma}{|H_1 - H_2| + \sigma} + 1\right].$$

In some embodiments, the minimum stabilization metric $H_1$ may be greater than the maximum stabilization metric $H_2$, the minimum approximate remote vehicle heading angle $\delta_{RV_{min}}^{01}$ may be within the remote vehicle heading angle $\delta_{RV}$, the remote vehicle heading angle $\delta_{RV}$ may be within the maximum approximate remote vehicle heading angle $\delta_{RV_{max}}^{01}$, and the second partial stabilization function $\Delta_2^{01}$ may evaluate to one. In some embodiments, the minimum stabilization metric $H_1$ may be at least the maximum stabilization metric $H_2$, the minimum approximate remote vehicle heading angle $\delta_{RV_{min}}^{01}$ may exceed the remote vehicle heading angle $\delta_{RV}$, or the remote vehicle heading angle $\delta_{RV}$ may exceed the maximum approximate remote vehicle heading angle $\delta_{RV_{max}}^{01}$, and the second partial stabilization function $\Delta_2^{01}$ may evaluate to zero.

In some embodiments, a third partial stabilization function $\Delta_1^{01}$ may be expressed as the following:

$$\Delta_3^{01} = \frac{1}{8}\left[\frac{\delta_{RV} - \delta_{RV_{min}}^{01} + \sigma}{|\delta_{RV} - \delta_{RV_{min}}^{01}| + \sigma} + 1\right] \times \qquad \text{[Equation 56]}$$

$$\left[\frac{\delta_{RV} - \delta_{RV_{max}}^{01} + \sigma}{|\delta_{RV} - \delta_{RV_{max}}^{01}| + \sigma} + 1\right] \times \left[1 - \frac{H_1 - H_2 - \sigma}{|H_1 - H_2| + \sigma}\right].$$

In some embodiments, the minimum stabilization metric $H_1$ may be less than the maximum stabilization metric $H_2$, the minimum approximate remote vehicle heading angle $\delta_{RV_{min}}^{01}$ may be within the remote vehicle heading angle $\delta_{RV}$, the maximum approximate remote vehicle heading angle $\delta_{RV_{max}}^{01}$ may be within the remote vehicle heading angle $\delta_{RV}$, and the third partial stabilization function $\Delta_1^{01}$ may evaluate to one. In some embodiments, the minimum stabilization metric $H_1$ may be at least the maximum stabilization metric $H_2$, the minimum approximate remote vehicle heading angle $\delta_{RV_{min}}^{01}$ may exceed the remote vehicle heading angle $\delta_{RV}$, or the maximum approximate remote vehicle heading angle $\delta_{RV_{max}}^{01}$ may exceed the remote vehicle heading angle $\delta_{RV}$, and the third partial stabilization function $\Delta_1^{01}$ may evaluate to zero.

In some embodiments, the difference between the minimum stabilization metric $H_1$ and the maximum stabilization metric $H_2$ may be expressed as the following:

$$H_1 - H_2 = \delta_{HV} - \delta_{RV_{min}}^{01} - (\delta_{HV} - \delta_{RV_{max}}^{01}),$$

$$H_1 - H_2 = \delta_{HV} - \delta_{RV_{min}}^{01} - \delta_{HV} + \delta_{RV_{max}}^{01},$$

$$H_1 - H_2 = \delta_{RV_{max}}^{01} - \delta_{HV} - \delta_{RV_{min}}^{01}. \qquad \text{[Equation 57]}$$

In some embodiments, the first partial stabilization function $\Delta_1^{01}$ may be expressed as the following:

$$\Delta_1^{01} = \frac{1}{8}\left[\frac{\delta_{RV_{min}}^{01} - \delta_{RV} + \sigma}{|\delta_{RV_{min}}^{01} - \delta_{RV}| + \sigma} + 1\right] \times \qquad \text{[Equation 58]}$$

$$\left[\frac{\delta_{RV_{max}}^{01} - \delta_{RV} + \sigma}{|\delta_{RV_{max}}^{01} - \delta_{RV}| + \sigma} + 1\right] \times \left[1 - \frac{\delta_{RV_{max}}^{01} - \delta_{RV_{min}}^{01} - \sigma}{|\delta_{RV_{max}}^{01} - \delta_{RV_{min}}^{01}| + \sigma}\right].$$

In some embodiments, the second partial stabilization function $\Delta_2^{01}$ may be expressed as the following:

$$\Delta_2^{01} = \frac{1}{8}\left[\frac{\delta_{RV} - \delta_{RV_{min}}^{01} + \sigma}{|\delta_{RV} - \delta_{RV_{min}}^{01}| + \sigma} + 1\right] \times \qquad \text{[Equation 59]}$$

$$\left[\frac{\delta_{RV_{max}}^{01} - \delta_{RV} + \sigma}{|\delta_{RV_{max}}^{01} - \delta_{RV}| + \sigma} + 1\right] \times \left[\frac{\delta_{RV_{max}}^{01} - \delta_{RV_{min}}^{01} - \sigma}{|\delta_{RV_{max}}^{01} - \delta_{RV_{min}}^{01}| + \sigma} + 1\right].$$

In some embodiments, the third partial stabilization function $\Delta_1^{01}$ may be expressed as the following:

$$\Delta_3^{01} = \frac{1}{8}\left[\frac{\delta_{RV} - \delta_{RV_{min}}^{01} + \sigma}{|\delta_{RV} - \delta_{RV_{min}}^{01}| + \sigma} + 1\right] \times \qquad \text{[Equation 60]}$$

$$\left[\frac{\delta_{RV} - \delta_{RV_{max}}^{01} + \sigma}{|\delta_{RV} - \delta_{RV_{max}}^{01}| + \sigma} + 1\right] \times \left[1 - \frac{\delta_{RV_{max}}^{01} - \delta_{RV_{min}}^{01} - \sigma}{|\delta_{RV_{max}}^{01} - \delta_{RV_{min}}^{01}| + \sigma}\right].$$

In some embodiments, the sum of the first partial stabilization function $\Delta_1^{01}$, the second partial stabilization function $\Delta_2^{01}$, and the third partial stabilization function $\Delta_1^{01}$ may be one and the remote vehicle and the host vehicle may be determined to be traveling in the same direction (RQ=01), which may be expressed as the following:

$$\sum_{i=1}^{3} \Delta_i^{01} = 1; \qquad \text{[Equation 61]}$$

$$r_1 = \sum_{i=1}^{3} \Delta_i^{01} \times 0,$$

$$q_1 = \sum_{i=1}^{3} \Delta_i^{01} \times 1.$$

Figure 26:
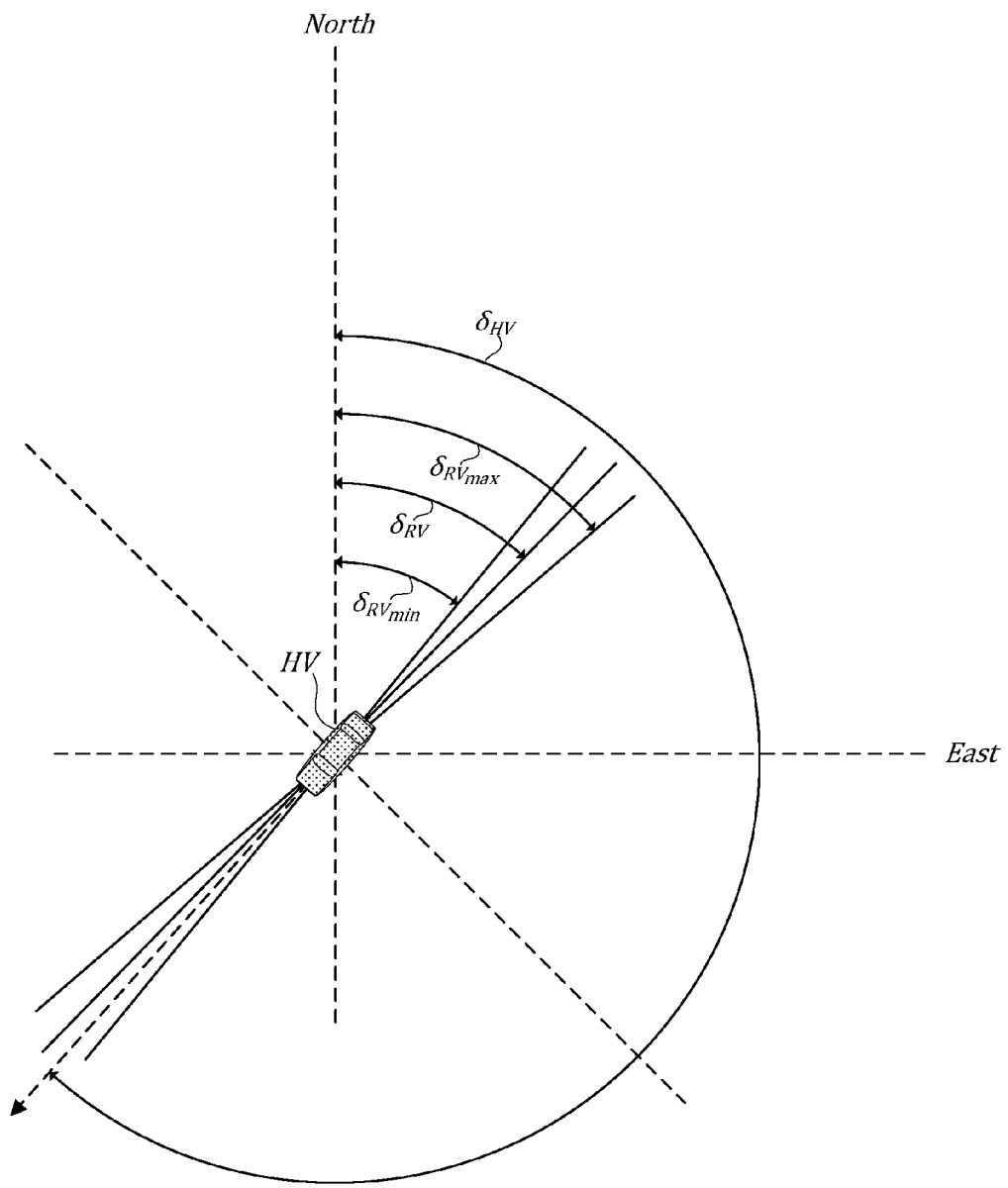
FIG. 26 is a diagram of determining relative heading information for directionally opposed vehicles in accordance with this disclosure.

FIG. 26 is a diagram of determining relative heading information for directionally opposed vehicles in accordance with this disclosure. In some embodiments, determining relative heading information may include determining relative heading information wherein the remote vehicle heading and the host vehicle heading are directionally opposed (RQ=10). For example, a remote vehicle may be in front of the host vehicle and traveling in the opposite direction and the remote vehicle heading angle may be equivalent to the host vehicle heading angle, which may be expressed as the following:

$$\delta_{RV} = \frac{1}{2}\left[\frac{\delta_{HV} - \pi - \sigma}{|\delta_{HV} - \pi| + \sigma} + 1\right] \times (\delta_{HV} - \pi) + \qquad \text{[Equation 62]}$$

$$\frac{1}{2}\left[\frac{\pi - \delta_{HV} - \sigma}{|\pi - \delta_{HV}| + \sigma} + 1\right] \times (\delta_{HV} + \pi).$$

In some embodiments, determining relative heading information wherein the remote vehicle heading and the host vehicle heading are directionally opposed may include identifying a minimum approximate remote vehicle heading angle $\delta_{RV_{min}}^{10}$. In some embodiments, a heading approximation offset threshold $\phi_C$, which may be an angular offset threshold, may indicate a defined range of heading angles, such as a ten degree range of heading angles ($\phi_C$=5), in which the remote vehicle heading may be determined to be opposite to the host vehicle heading. For example, the remote vehicle heading angle may be less than a heading approximation offset $\phi_C$, which may be expressed as $\delta_{RV} - \phi_C < 0$, and determining the minimum approximate remote vehicle heading angle may be expressed as follows:

$$\delta_{RV_{min}}{}^{10} = 2\pi + \delta_{RV} - \phi_C. \quad \text{[Equation 63]}$$

In another example, the remote vehicle heading angle may be at least the heading approximation offset threshold $\phi_C$, which may be expressed as $\delta_{RV} - \phi_C >= 0$, and determining the minimum approximate remote vehicle heading angle may be expressed as follows:

$$\delta_{RV_{min}}{}^{10} = \delta_{RV} - \phi_C. \quad \text{[Equation 64]}$$

In some embodiments, evaluating whether the remote vehicle heading angle is within the heading approximation range, as expressed in Equations 63 and 64, may be expressed in combination as shown in Equation 65-67, as follows:

$$\varsigma_{min_1} = \frac{1}{2}\left[\frac{0 - (\delta_{RV} - \varphi_C) - \sigma}{|0 - (\delta_{RV} - \varphi_C)| + \sigma} + 1\right]. \quad \text{[Equation 65]}$$

$$\varsigma_{min_2} = \frac{1}{2}\left[\frac{(\delta_{RV} - \varphi_C) - 0 + \sigma}{|(\delta_{RV} - \varphi_C) - 0| + \sigma} + 1\right]. \quad \text{[Equation 66]}$$

$$\delta_{RV_{min}}{}^{10} = \varsigma_{min_1} \times (2\pi + \delta_{RV} - \phi_C) + \varsigma_{min_2} \times (\delta_{RV} - \phi_C). \quad \text{[Equation 67]}$$

In some embodiments, determining relative heading information wherein the remote vehicle heading and the host vehicle heading are directionally opposed may include identifying a maximum approximate remote vehicle heading angle $\delta_{RV_{max}}{}^{10}$. For example, a sum of the remote vehicle heading angle $\delta_{RV}$ and the heading approximation offset $\phi_C$ may be less than $2\pi$, which may be expressed as $\delta_{RV} + \phi_C < 2\pi$, and determining the maximum approximate remote vehicle heading angle may be expressed as follows:

$$\delta_{RV_{max}}{}^{10} = \delta_{RV} + \phi_C. \quad \text{[Equation 68]}$$

In another example, the sum of the remote vehicle heading angle $\delta_{RV}$ and the heading approximation offset $\phi_C$ may be at least $2\pi$, which may be expressed as $\delta_{RV} + \phi_C >= 2\pi$, and determining the maximum approximate remote vehicle heading angle may be expressed as follows:

$$\delta_{RV_{max}}{}^{10} \times \delta_{RV} + \phi_C - 2\pi. \quad \text{[Equation 69]}$$

In some embodiments, evaluating whether the remote vehicle heading angle is within the heading approximation range, as expressed in Equations 68 and 69, may be expressed in combination as shown in Equation 70-72, as follows:

$$\varsigma_{max_1} = \frac{1}{2}\left[\frac{2\pi - (\delta_{RV} + \varphi_C) - \sigma}{|2\pi - (\delta_{RV} + \varphi_C)| + \sigma} + 1\right]. \quad \text{[Equation 70]}$$

$$\varsigma_{max_2} = \frac{1}{2}\left[\frac{(\delta_{RV} + \varphi_C) - 2\pi + \sigma}{|(\delta_{RV} + \varphi_C) - 2\pi| + \sigma} + 1\right]. \quad \text{[Equation 71]}$$

$$\delta_{RV_{max}}{}^{10} = \varsigma_{max_1} \times (\delta_{RV} + \phi_C) + \varsigma_{max_2} \times (\delta_{RV} + \phi_C - 2\pi). \quad \text{[Equation 72]}$$

As shown in FIG. 26, the host vehicle angle $\delta_{HV}$ may be greater than $\pi$, greater than the minimum approximate remote vehicle heading angle $\delta_{RV_{min}}{}^{10}$, greater than the maximum approximate remote vehicle heading angle $\delta_{RV_{max}}{}^{10}$, and the remote vehicle heading and the host vehicle heading may be directionally opposed (RQ=10). Although not shown expressly in FIG. 26, in some embodiments, the host vehicle angle $\delta_{HV}$ may be less than $\pi$, less than the minimum approximate remote vehicle heading angle $\delta_{RV_{min}}{}^{10}$, less than the maximum approximate remote vehicle heading angle $\delta_{RV_{max}}{}^{10}$, and the remote vehicle heading and the host vehicle heading may be directionally opposed (RQ=10).

Figure 27:
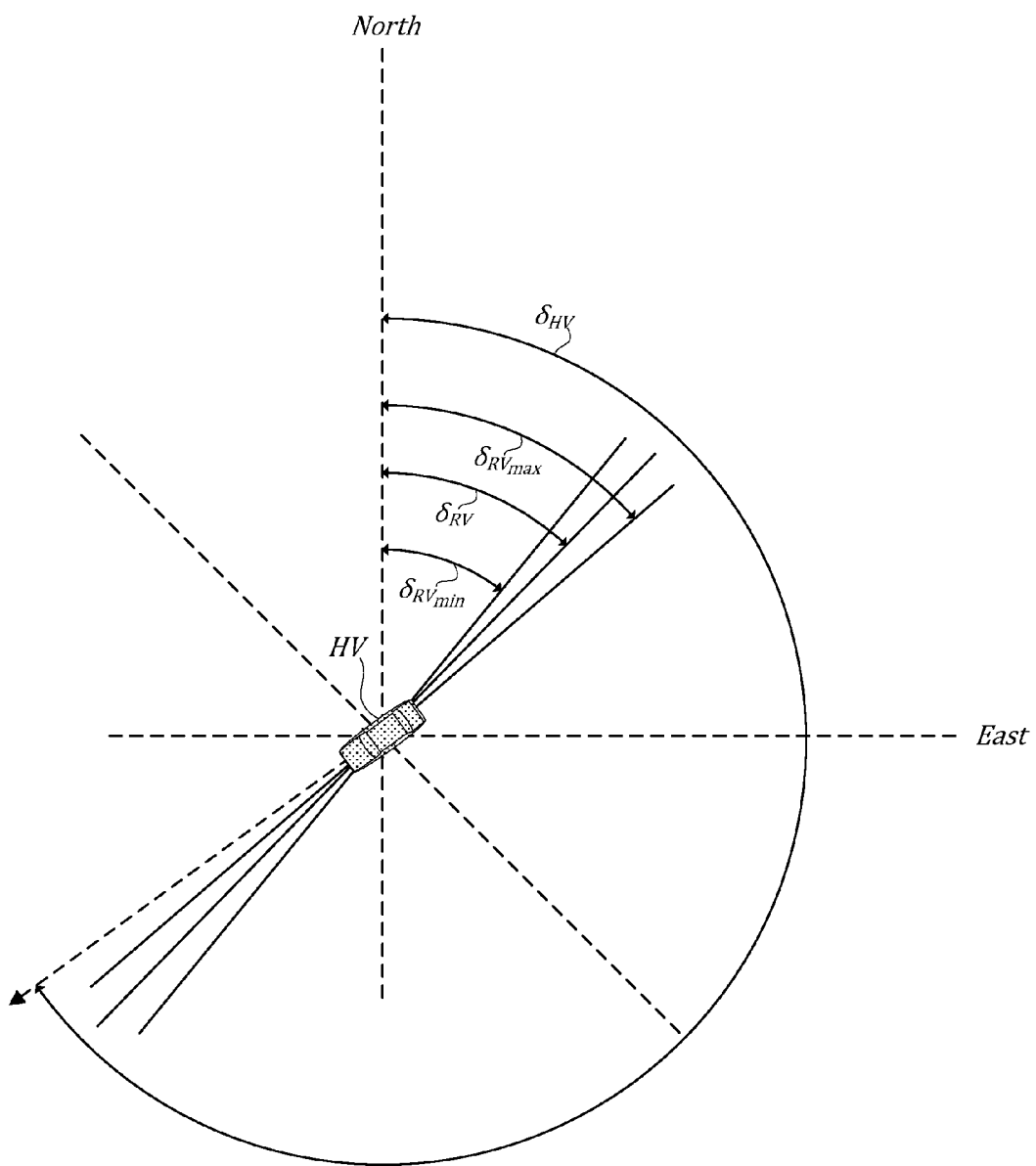
FIG. 27 is a diagram of determining relative heading information with divergent paths in accordance with this disclosure.

FIG. 27 is a diagram of determining relative heading information with divergent paths in accordance with this disclosure. In some embodiments, the host vehicle angle $\delta_{HV}$ may be greater than $\pi$, greater than the minimum approximate remote vehicle heading angle $\delta_{RV_{min}}{}^{10}$, greater than the maximum approximate remote vehicle heading angle $\delta_{RV_{max}}{}^{10}$, and the remote vehicle heading and the host vehicle heading may be divergent. Although not shown expressly in FIG. 27, in some embodiments, the host vehicle angle $\delta_{HV}$ may be less than $\pi$, less than the minimum approximate remote vehicle heading angle $\delta_{RV_{min}}{}^{10}$, less than the maximum approximate remote vehicle heading angle $\delta_{RV_{min}}{}^{10}$, and the remote vehicle heading and the host vehicle heading may be divergent.

Figure 28:
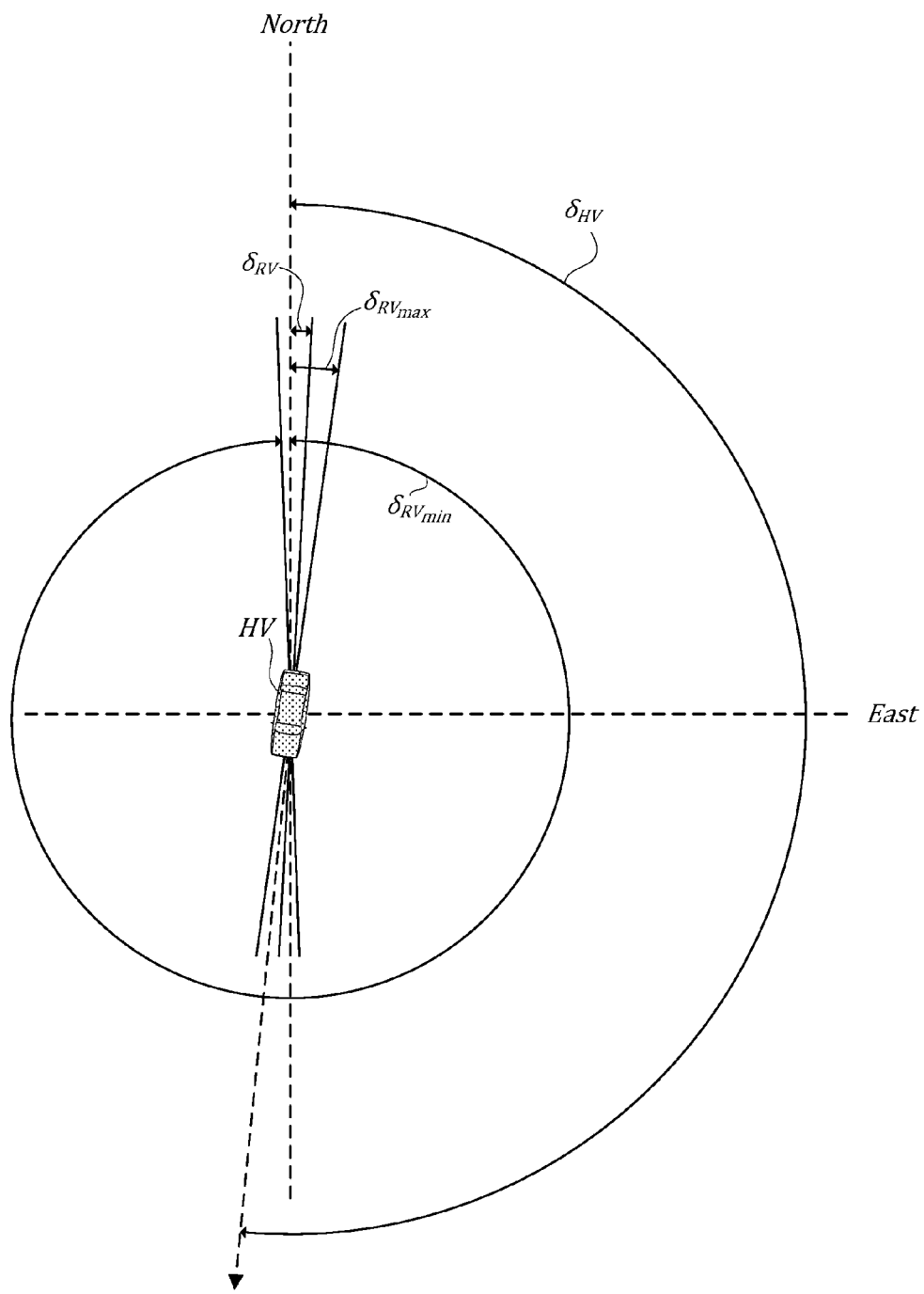
FIGS. 28 and 29 are diagrams of determining relative heading information wherein a difference between the remote vehicle heading angle and the reference direction is within a threshold in accordance with this disclosure.
Figure 29:
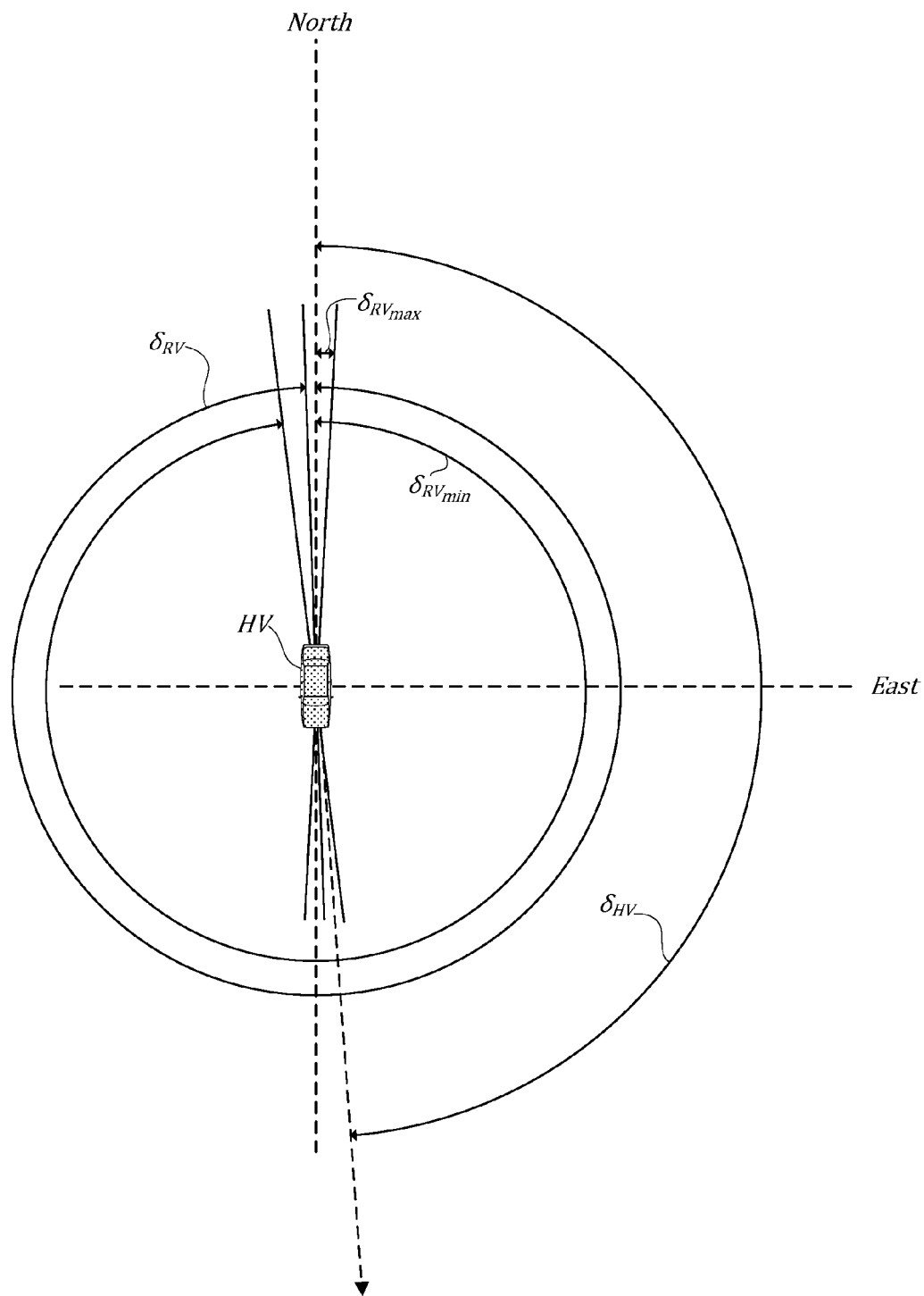

FIGS. 28 and 29 are diagrams of determining relative heading information wherein a difference between the remote vehicle heading angle and the reference direction is within a threshold in accordance with this disclosure. As shown in FIG. 28, the remote vehicle heading angle $\delta_{RV}$ may be less than heading approximation offset threshold $\phi_C$, the maximum approximate remote vehicle heading angle $\delta_{RV_{max}}{}^{10}$ may be greater than the remote vehicle heading angle $\delta_{RV}$ and the minimum approximate remote vehicle heading angle $\delta_{RV_{min}}{}^{10}$ may be greater than the maximum approximate remote vehicle heading angle $\delta_{RV_{max}}{}^{10}$. As shown in FIG. 29, a sum of the remote vehicle heading angle $\delta_{RV}$ and the heading approximation offset $\phi_C$ may be less than $2\pi$, the maximum approximate remote vehicle heading angle $\delta_{RV_{max}}{}^{10}$ may be less than the remote vehicle heading angle $\delta_{RV}$, and the minimum approximate remote vehicle heading angle $\delta_{RV_{min}}{}^{10}$ may be greater than the maximum approximate remote vehicle heading angle $\delta_{RV_{max}}{}^{10}$.

In some embodiments, the host vehicle angle $\delta_{HV}$ may be greater than $\pi$, the maximum approximate remote vehicle heading angle $\delta_{RV_{max}}{}^{10}$ may be less than the host vehicle angle $\delta_{HV}$, the host vehicle angle $\delta_{HV}$ may be less than the minimum approximate remote vehicle heading angle $\delta_{RV_{min}}{}^{10}$, and a false negative incorrectly indicating that the expected path for the remote vehicle and the expected path for the host vehicle are divergent may be identified. In some embodiments, the host vehicle angle $\delta_{HV}$ may be less than $\pi$, the maximum approximate remote vehicle heading angle $\delta_{RV_{max}}{}^{10}$ may be less than the host vehicle angle $\delta_{HV}$, the host vehicle angle $\delta_{HV}$ may be less than the minimum approximate remote vehicle heading angle $\delta_{RV_{min}}{}^{10}$, and a false negative incorrectly indicating that the expected path for the remote vehicle and the expected path for the host vehicle are divergent may be identified. In some embodiments, generating converging path information may include using a stabilization function such that the false negative is correctly identified as convergent.

In some embodiments, determining relative heading information using a stabilization function may include determining a minimum stabilization metric $H_1$, a maximum stabilization metric $H_2$, or both. The host vehicle heading angle $\delta_{HV}$ may be at least zero and may be less than $2\pi$, the remote vehicle heading angle $\delta_{RV}$ may be at least zero and may be less than $2\pi$, the minimum approximate remote vehicle heading angle $\delta_{RV_{min}}^{10}$ may be at least zero and may be less than $2\pi$, the maximum approximate remote vehicle heading angle $\delta_{RV_{max}}^{10}$ may be at least zero and may be less than $2\pi$, the minimum stabilization metric $H_1$ may be greater than zero (positive) or less than zero (negative), and the maximum stabilization metric $H_2$ may be greater than zero (positive) or less than zero (negative).

In some embodiments, determining relative heading information using a stabilization function may include determining a minimum stabilization metric $H_1$ by subtracting the minimum approximate remote vehicle heading angle $\delta_{RV_{min}}^{10}$ from the host vehicle heading angle $\delta_{HV}$, which may be expressed as $H_1 = \delta_{HV} - \delta_{RV_{min}}^{10}$, determining a maximum stabilization metric $H_2$ by subtracting the maximum approximate remote vehicle heading angle $\delta_{RV_{max}}^{10}$ from the host vehicle heading angle $\delta_{HV}$, which may be expressed as $H_2 = \delta_{HV} - \delta_{RV_{max}}^{10}$, or generating the minimum stabilization metric and the maximum stabilization metric.

In some embodiments, the host vehicle heading angle $\delta_{HV}$ may be less than the minimum approximate remote vehicle heading angle $\delta_{RV_{min}}^{01}$, the host vehicle heading angle $\delta_{HV}$ may be less than the maximum approximate remote vehicle heading angle $\delta_{RV_{max}}^{01}$, the minimum stabilization metric $H_1$ may be a negative value, the maximum stabilization metric $H_2$ may be a negative value, and the minimum stabilization metric $H_1$ may be greater than the maximum stabilization metric $H_2$.

In some embodiments, the host vehicle heading angle $\delta_{HV}$ may be less than the minimum approximate remote vehicle heading angle $\delta_{RV_{min}}^{01}$, the host vehicle heading angle $\delta_{HV}$ may be greater than the maximum approximate remote vehicle heading angle $\delta_{RV_{max}}^{01}$, the minimum stabilization metric $H_1$ may be a negative value, the maximum stabilization metric $H_2$ may be a positive value, and the minimum stabilization metric $H_1$ may be less than the maximum stabilization metric $H_2$.

In some embodiments, the host vehicle heading angle $\delta_{HV}$ may be greater than the minimum approximate remote vehicle heading angle $\delta_{RV_{min}}^{01}$, the host vehicle heading angle $\delta_{HV}$ may be greater than the maximum approximate remote vehicle heading angle $\delta_{RV_{max}}^{01}$, the minimum stabilization metric $H_1$ may be a positive value, the maximum stabilization metric $H_2$ may be a positive value, and the minimum stabilization metric $H_1$ may be greater than the maximum stabilization metric $H_2$.

In some embodiments, a first partial stabilization function $\Delta_1^{10}$ may be expressed as the following:

$$\Delta_1^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times \left[\frac{\delta_{RV_{max}}^{10} - \delta_{RV} + \sigma}{|\delta_{RV_{max}}^{10} - \delta_{RV}| + \sigma} + 1\right] \times \left[\frac{H_1 - H_2 - \sigma}{|H_1 - H_2| + \sigma} + 1\right]. \quad \text{[Equation 73]}$$

In some embodiments, the minimum stabilization metric $H_1$ may be greater than the maximum stabilization metric $H_2$, the remote vehicle heading angle $\delta_{RV}$ may be at least the minimum approximate remote vehicle heading angle $\delta_{RV_{min}}^{10}$, the remote vehicle heading angle $\delta_{RV}$ may be within the maximum approximate remote vehicle heading angle $\delta_{RV_{max}}^{10}$ and the first partial stabilization function $\Delta_1^{10}$ may evaluate to one. In some embodiments, the minimum stabilization metric $H_1$ may be within the maximum stabilization metric $H_2$, the remote vehicle heading angle $\delta_{RV}$ may be less than the minimum approximate remote vehicle heading angle $\delta_{RV_{min}}^{10}$, or the remote vehicle heading angle $\delta_{RV}$ may exceed the maximum approximate remote vehicle heading angle $\delta_{RV_{max}}^{10}$, and the first partial stabilization function $\Delta_1^{10}$ may evaluate to zero.

In some embodiments, a second partial stabilization function $\Delta_2^{10}$ may be expressed as the following:

$$\Delta_2^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times \left[\frac{\delta_{RV} - \delta_{RV_{max}}^{10} + \sigma}{|\delta_{RV} - \delta_{RV_{max}}^{10}| + \sigma} + 1\right] \times \left[1 - \frac{H_1 - H_2 - \sigma}{|H_1 - H_2| + \sigma}\right]. \quad \text{[Equation 74]}$$

In some embodiments, the minimum stabilization metric $H_1$ may be less than the maximum stabilization metric $H_2$, the minimum approximate remote vehicle heading angle $\delta_{RV_{min}}^{01}$ may be within the remote vehicle heading angle $\delta_{RV}$, the maximum approximate remote vehicle heading angle $\delta_{RV_{max}}^{10}$ may be within the remote vehicle heading angle $\delta_{RV}$, and the second partial stabilization function $\Delta_2^{10}$ may evaluate to one. In some embodiments, the minimum stabilization metric $H_1$ may be at least the maximum stabilization metric $H_2$, the minimum approximate remote vehicle heading angle $\delta_{RV_{min}}^{10}$ may exceed the remote vehicle heading angle $\delta_{RV}$, or the maximum approximate remote vehicle heading angle $\delta_{RV_{max}}^{10}$ may exceed the remote vehicle heading angle $\delta_{RV}$, and the second partial stabilization function $\Delta_2^{10}$ may evaluate to zero.

In some embodiments, a third partial stabilization function $\Delta_3^{10}$ may be expressed as the following:

$$\Delta_3^{10} = \frac{1}{8}\left[\frac{\delta_{RV_{min}}^{10} - \delta_{RV} + \sigma}{|\delta_{RV_{min}}^{10} - \delta_{RV}| + \sigma} + 1\right] \times \left[\frac{\delta_{RV_{max}}^{10} - \delta_{RV} + \sigma}{|\delta_{RV_{max}}^{10} - \delta_{RV}| + \sigma} + 1\right] \times \left[1 - \frac{H_1 - H_2 - \sigma}{|H_1 - H_2| + \sigma}\right]. \quad \text{[Equation 75]}$$

In some embodiments, the minimum stabilization metric $H_1$ may be less than the maximum stabilization metric $H_2$, the remote vehicle heading angle $\delta_{RV}$ may be within the minimum approximate remote vehicle heading angle $\delta_{RV_{min}}^{10}$, the remote vehicle heading angle $\delta_{RV}$ may be within the maximum approximate remote vehicle heading angle $\delta_{RV_{max}}^{10}$, and the third partial stabilization function $\Delta_3^{10}$ may evaluate to one. In some embodiments, the minimum stabilization metric $H_1$ may be at least the maximum stabilization metric $H_2$, the remote vehicle heading angle $\delta_{RV}$ may exceed the minimum approximate remote vehicle heading angle $\delta_{RV_{min}}^{10}$, or the maximum approximate remote vehicle heading angle $\delta_{RV_{max}}^{10}$ may exceed the remote vehicle heading angle $\delta_{RV}$, and the third partial stabilization function $\Delta_3^{10}$ may evaluate to zero.

In some embodiments, the difference between the minimum stabilization metric $H_1$ and the maximum stabilization metric $H_2$ may be expressed as the following:

$$H_1 - H_2 = \delta_{HV} - \delta_{RV_{min}}^{10} - (\delta_{HV} - \delta_{RV_{max}}^{10}),$$

$$H_1 - H_2 = \delta_{HV} - \delta_{RV_{min}}^{10} - \delta_{HV} + \delta_{RV_{max}}^{10},$$

$$H_1 - H_2 = \delta_{RV_{max}}^{10} - \delta_{RV_{min}}^{10}. \quad \text{[Equation 76]}$$

In some embodiments, the first partial stabilization function $\Delta_1^{10}$ may be expressed as the following:

$$\Delta_1^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$
$$\left[\frac{\delta_{RV_{max}}^{10} - \delta_{RV} + \sigma}{|\delta_{RV_{max}}^{10} - \delta_{RV}| + \sigma} + 1\right] \times \left[\frac{\delta_{RV_{max}}^{10} - \delta_{RV_{min}}^{10} - \sigma}{|\delta_{RV_{max}}^{10} - \delta_{RV_{min}}^{10}| + \sigma} + 1\right].$$
[Equation 77]

In some embodiments, the second partial stabilization function $\Delta_2^{10}$ may be expressed as the following:

$$\Delta_2^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$
$$\left[\frac{\delta_{RV} - \delta_{RV_{max}}^{10} + \sigma}{|\delta_{RV} - \delta_{RV_{max}}^{10}| + \sigma} + 1\right] \times \left[1 - \frac{\delta_{RV_{max}}^{10} - \delta_{RV_{min}}^{10} - \sigma}{|\delta_{RV_{max}}^{10} - \delta_{RV_{min}}^{10}| + \sigma}\right].$$
[Equation 78]

In some embodiments, the third partial stabilization function $\Delta_3^{10}$ may be expressed as the following:

$$\Delta_3^{10} = \frac{1}{8}\left[\frac{\delta_{RV_{min}}^{10} - \delta_{RV} + \sigma}{|\delta_{RV_{min}}^{10} - \delta_{RV}| + \sigma} + 1\right] \times$$
$$\left[\frac{\delta_{RV_{max}}^{10} - \delta_{RV} + \sigma}{|\delta_{RV_{max}}^{10} - \delta_{RV}| + \sigma} + 1\right] \times \left[1 - \frac{\delta_{RV_{max}}^{10} - \delta_{RV_{min}}^{10} - \sigma}{|\delta_{RV_{max}}^{10} - \delta_{RV_{min}}^{10}| + \sigma}\right].$$
[Equation 79]

In some embodiments, the sum of the first partial stabilization function $\Delta_1^{\circ}$, the second partial stabilization function $\Delta_2^{10}$, and the third partial stabilization function $\Delta_3^{10}$ may be one and the remote vehicle and the host vehicle may be determined to be traveling in the opposite direction (RQ=10), which may be expressed as the following:

$$\sum_{i=1}^{3} \Delta_i^{10} = 1;$$
$$r_2 = \sum_{i=1}^{3} \Delta_i^{10} \times 1,$$
$$q_2 = \sum_{i=1}^{3} \Delta_i^{10} \times 0.$$
[Equation 80]

Figure 30:
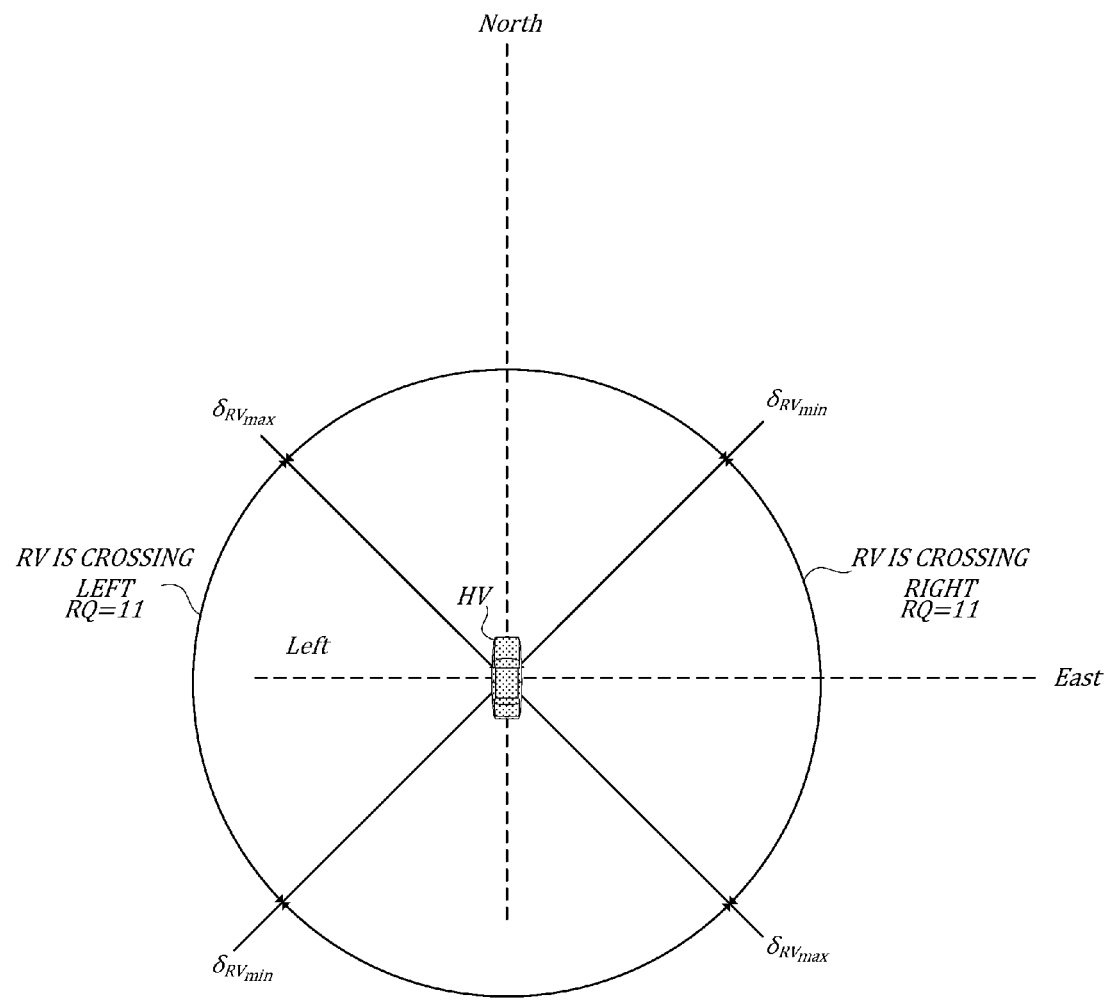
FIG. 30 is a diagram of determining relative heading information for directionally crossing vehicles in accordance with this disclosure.

FIG. 30 is a diagram of determining relative heading information for directionally crossing vehicles in accordance with this disclosure. In some embodiments, determining relative heading information may include determining relative heading information wherein the remote vehicle heading and the host vehicle heading are directionally crossing (RQ=11). Although only one example of the remote vehicle crossing with the host vehicle is shown, any angle wherein the remote vehicle is crossing with the host vehicle, as described herein, may be used.

In some embodiments, determining relative heading information wherein the remote vehicle heading and the host vehicle heading are crossing from the left may include identifying a minimum left approximate remote vehicle heading angle $\delta_{RV_{minL}}^{11}$. In some embodiments, determining relative heading information wherein the remote vehicle heading and the host vehicle heading are crossing from the right may include identifying a minimum right approximate remote vehicle heading angle $\delta_{RV_{minR}}^{11}$. In some embodiments, determining the minimum left approximate remote vehicle heading angle $\delta_{RV_{minL}}^{11}$ or the minimum right approximate remote vehicle heading angle $\delta_{RV_{minR}}^{11}$ may include using a left cross heading approximation offset $\phi_L$, such that $\phi_1 = \pi/2 - \phi_L$ and $\phi_2 = \pi/2 + \phi_L$; or a right cross heading approximation offset $\phi_R$, such that $\phi_3 = 3\pi/2 - \phi_R$ and $\phi_4 = 3\pi/2 + \phi_R$; and determining the minimum remote vehicle heading approximation angle may be expressed as shown in Equation 81 and determining the maximum remote vehicle heading approximation angle may be expressed as shown in Equation 82, as follows:

$$\delta_{RV_{minL}}^{11} = \frac{1}{4}\left[\frac{\delta_{HV} - 0 + \sigma}{|\delta_{HV} - 0| + \sigma} + 1\right] \times \left[\frac{\varphi_4 - \delta_{HV} - \sigma}{|\varphi_4 - \delta_{HV}| + \sigma} + 1\right] \times$$
$$(\delta_{HV} + \varphi_1) +$$
$$\frac{1}{4}\left[\frac{\delta_{HV} - \varphi_4 + \sigma}{|\delta_{HV} - \varphi_4| + \sigma} + 1\right] \times \left[\frac{2\pi - \delta_{HV} - \sigma}{|2\pi - \delta_{HV}| + \sigma} + 1\right] \times$$
$$(\delta_{HV} - \varphi_4);$$
[Equation 81]

$$\delta_{RV_{minR}}^{11} = \frac{1}{4}\left[\frac{\delta_{HV} - 0 + \sigma}{|\delta_{HV} - 0| + \sigma} + 1\right] \times \left[\frac{\varphi_2 - \delta_{HV} - \sigma}{|\varphi_2 - \delta_{HV}| + \sigma} + 1\right] \times$$
$$(\delta_{HV} + \varphi_3) +$$
$$\frac{1}{4}\left[\frac{\delta_{HV} - \varphi_2 + \sigma}{|\delta_{HV} - \varphi_2| + \sigma} + 1\right] \times \left[\frac{2\pi - \delta_{HV} - \sigma}{|2\pi - \delta_{HV}| + \sigma} + 1\right] \times (\delta_{HV} - \varphi_2).$$

$$\delta_{RV_{maxL}}^{11} = \frac{1}{4}\left[\frac{\delta_{HV} - 0 + \sigma}{|\delta_{HV} - 0| + \sigma} + 1\right] \times \left[\frac{\varphi_3 - \delta_{HV} - \sigma}{|\varphi_3 - \delta_{HV}| + \sigma} + 1\right] \times$$
$$(\delta_{HV} + \varphi_2) +$$
$$\frac{1}{4}\left[\frac{\delta_{HV} - \varphi_3 + \sigma}{|\delta_{HV} - \varphi_3| + \sigma}\right] \times \left[\frac{2\pi - \delta_{HV} - \sigma}{|2\pi - \delta_{HV}| + \sigma} + 1\right] \times$$
$$(\delta_{HV} - \varphi_3);$$
[Equation 82]

$$\delta_{RV_{maxR}}^{11} = \frac{1}{4}\left[\frac{\delta_{HV} - 0 + \sigma}{|\delta_{HV} - 0| + \sigma} + 1\right] \times \left[\frac{\varphi_1 - \delta_{HV} - \sigma}{|\varphi_1 - \delta_{HV}| + \sigma} + 1\right] \times$$
$$(\delta_{HV} + \varphi_4) +$$
$$\frac{1}{4}\left[\frac{\delta_{HV} - \varphi_1 + \sigma}{|\delta_{HV} - \varphi_1| + \sigma} + 1\right] \times \left[\frac{2\pi - \delta_{HV} - \sigma}{|2\pi - \delta_{HV}| + \sigma} + 1\right] \times (\delta_{HV} - \varphi_1).$$

In some embodiments, $A_1 = \beta_1 + \pi/2 - \phi_P$, $A_2 = \pi/2 + \phi_P$, $A_3 = 3\pi/2 - \phi_P$, $A_4 = \beta_1 + 3\pi/2 + \phi_P$, $A_5 = \beta_1 + \phi_I$, $A_6 = \beta_1 + \phi_I$, $A_7 = \beta_1 - \phi_I$, $A_8 = \beta_1 + \phi_I$, $A_9 = -\pi/2 - \phi_P$, $A_{10} = \beta_1 - \pi/2 + \phi_P$, $A_{11} = \beta_1 - \pi - \phi_I$, $A_{12} = \beta_1 - \pi + \phi_I$, $A_{13} = \beta_1 - \phi_1$, $A_{14} = \beta_1 + \phi_1$, $A_{15} = \beta_1 - 3\pi/2 - \phi_P$, and $A_{16} = \beta_1 - 3\pi/2 + \phi_P$, and the minimum approximate remote vehicle heading angle $\delta_{RV_{min}}^{11}$ and the maximum approximate remote vehicle heading angle $\delta_{RV_{max}}^{11}$ may be respectively expressed as shown in the following:

$$L_{Q_1} =$$
$$L_{Q_4} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right],$$
$$L_{Q_2} = L_{Q_3} =$$
$$\frac{1}{4}\left[\frac{\delta_{HV} - 0 + \sigma}{|\delta_{HV} - 0| + \sigma} + 1\right] \times \left[\frac{A_{11} - \delta_{HV} - \sigma}{|A_{11} - \delta_{HV}| + \sigma} + 1\right] +$$
[Equation 83]

-continued $$\frac{1}{4}\left[\frac{\delta_{HV} - A_{14} + \sigma}{|\delta_{HV} - A_{14}| + \sigma} + 1\right] \times \left[\frac{2\pi - \delta_{HV} - \sigma}{|2\pi - \delta_{HV}| + \sigma} + 1\right],$$

$$R_{Q_1} = R_{Q_4} =$$
$$\frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] +$$
$$\frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{|2\pi - \delta_{HV}| + \sigma} + 1\right],$$

$$R_{Q_2} = R_{Q_3} = \frac{1}{4}\left[\frac{\delta_{HV} - A_{12} + \sigma}{|\delta_{HV} - A_{12}| + \sigma} + 1\right] \times$$
$$\left[\frac{A_{13} - \delta_{HV} - \sigma}{|A_{13} - \delta_{HV}| + \sigma} + 1\right];$$

$$\delta^{11}_{RV_{min}} = \delta^{11}_{RV_{minL}} \times \frac{1}{2}\left[\frac{L_{Q_1} + L_{Q_2} - \sigma}{|L_{Q_1} + L_{Q_2}| + \sigma} + 1\right] +$$
$$\delta^{11}_{RV_{minR}} \times \frac{1}{2}\left[\frac{R_{Q_1} + R_{Q_2} - \sigma}{|R_{Q_1} + R_{Q_2}| + \sigma} + 1\right];$$

$$\delta^{11}_{RV_{max}} = \delta^{11}_{RV_{maxL}} \times \frac{1}{2}\left[\frac{L_{Q_1} + L_{Q_2} - \sigma}{|L_{Q_1} + L_{Q_2}| + \sigma} + 1\right] +$$
$$\delta^{11}_{RV_{maxR}} \times \frac{1}{2}\left[\frac{R_{Q_1} + R_{Q_2} - \sigma}{|R_{Q_1} + R_{Q_2}| + \sigma} + 1\right].$$

In some embodiments, remote vehicle heading angle $\delta_{RV}$ may be within the range from the minimum approximate remote vehicle heading angle $\delta_{RV_{min}}^{11}$ to the maximum approximate remote vehicle heading angle $\delta_{RV_{max}}^{11}$, and the remote vehicle may be identified as crossing with the host vehicle.

In some embodiments, the remote vehicle may be crossing with the host vehicle from the left, which may be expressed as follows:

$$0 \le \delta_{HV} < \frac{3\pi}{2} - \varphi_L \rightarrow \begin{cases} \delta_{HV} < \delta^{11}_{RV_{min}} \\ \delta_{HV} < \delta^{11}_{RV_{max}} \end{cases}, \quad \text{[Equation 84]}$$

$$\frac{3\pi}{2} - \varphi_L \le \delta_{HV} < \frac{3\pi}{2} + \varphi_L \rightarrow \begin{cases} \delta_{HV} < \delta^{11}_{RV_{min}} \\ \delta_{HV} > \delta^{11}_{RV_{max}} \end{cases},$$

$$\frac{3\pi}{2} + \varphi_L \le \delta_{HV} < 2\pi \rightarrow \begin{cases} \delta_{HV} > \delta^{11}_{RV_{min}} \\ \delta_{HV} > \delta^{11}_{RV_{max}} \end{cases}.$$

In some embodiments, the remote vehicle may be crossing with the host vehicle from the right, which may be expressed as follows:

$$0 \le \delta_{HV} < \frac{\pi}{2} - \varphi_R \rightarrow \begin{cases} \delta_{HV} < \delta^{11}_{RV_{min}} \\ \delta_{HV} < \delta^{11}_{RV_{max}} \end{cases}, \quad \text{[Equation 85]}$$

$$\frac{\pi}{2} - \varphi_R \le \delta_{HV} < \frac{\pi}{2} + \varphi_R \rightarrow \begin{cases} \delta_{HV} < \delta^{11}_{RV_{min}} \\ \delta_{HV} > \delta^{11}_{RV_{max}} \end{cases},$$

$$\frac{\pi}{2} + \varphi_R \le \delta_{HV} < 2\pi \rightarrow \begin{cases} \delta_{HV} > \delta^{11}_{RV_{min}} \\ \delta_{HV} > \delta^{11}_{RV_{max}} \end{cases}.$$

In some embodiments, determining relative heading information using a stabilization function may include determining a minimum stabilization metric $H_1$, a maximum stabilization metric $H_2$, or both. The host vehicle heading angle $\delta_{HV}$ may be at least zero and may be less than $2\pi$, the remote vehicle heading angle $\delta_{RV}$ may be at least zero and may be less than $2\pi$, the minimum approximate remote vehicle heading angle $\delta_{RV_{min}}^{10}$ may be at least zero and may be less than $2\pi$, the maximum approximate remote vehicle heading angle $\delta_{RV_{max}}^{10}$ may be at least zero and may be less than $2\pi$, the minimum stabilization metric $H_1$ may be greater than zero (positive) or less than zero (negative), and the maximum stabilization metric $H_2$ may be greater than zero (positive) or less than zero (negative).

In some embodiments, determining relative heading information using a stabilization function may include determining a minimum stabilization metric $H_1$ by subtracting the minimum approximate remote vehicle heading angle $\delta_{RV_{min}}^{11}$ from the host vehicle heading angle $\delta_{HV}$, which may be expressed as $H_1 = \delta_{HV} - \delta_{RV_{min}}^{11}$, determining a maximum stabilization metric $H_2$ by subtracting the maximum approximate remote vehicle heading angle $\delta_{RV_{max}}^{11}$ from the host vehicle heading angle $\delta_{HV}$, which may be expressed as $H_2 = \delta_{RV_{max}}^{11}$, or generating the minimum stabilization metric and the maximum stabilization metric.

In some embodiments, the minimum stabilization metric $H_1$ may be a negative value, the maximum stabilization metric $H_2$ may be a negative value, and the minimum stabilization metric $H_1$ may be greater than the maximum stabilization metric $H_2$. In some embodiments, the minimum stabilization metric $H_1$ may be a negative value, the maximum stabilization metric $H_2$ may be a positive value, and the minimum stabilization metric $H_1$ may be less than the maximum stabilization metric $H_2$. In some embodiments, the minimum stabilization metric $H_1$ may be a positive value, the maximum stabilization metric $H_2$ may be a positive value, and the minimum stabilization metric $H_1$ may be greater than the maximum stabilization metric $H_2$.

In some embodiments, a first partial stabilization function may be expressed as the following:

$$\Delta_1^{11} = \frac{1}{8}\left[\frac{\delta_{RV} - \delta^{11}_{RV_{min}} + \sigma}{|\delta_{RV} - \delta^{11}_{RV_{min}}| + \sigma} + 1\right] \times \quad \text{[Equation 86]}$$
$$\left[\frac{\delta^{11}_{RV_{max}} - \delta_{RV} + \sigma}{|\delta^{11}_{RV_{max}} - \delta_{RV}| + \sigma} + 1\right] \times \left[\frac{H_1 - H_2 - \sigma}{|H_1 - H_2| + \sigma} + 1\right].$$

In some embodiments, the minimum stabilization metric $H_1$ may be greater than the maximum stabilization metric $H_2$, the minimum approximate remote vehicle heading angle $\delta_{RV_{min}}^{10}$ may be within the remote vehicle heading angle $\delta_{RV}$, the remote vehicle heading angle $\delta_{RV}$ may be less than the maximum approximate remote vehicle heading angle $\delta_{RV_{max}}^{10}$, and the first partial stabilization function $\Delta_1^{11}$ may evaluate to one. In some embodiments, the minimum stabilization metric $H_1$ may be within the maximum stabilization metric $H_2$, the minimum approximate remote vehicle heading angle $\delta_{RV_{min}}^{11}$ may be less than the remote vehicle heading angle $\delta_{RV}$, or the remote vehicle heading angle $\delta_{RV}$ may be at least the maximum approximate remote vehicle heading angle $\delta_{RV_{min}}^{10}$, and the first partial stabilization function $\Delta_1^{11}$ may evaluate to zero.

In some embodiments, a second partial stabilization function $\Delta_2^{11}$ may be expressed as the following:

$$\Delta_2^{11} = \frac{1}{8}\left[\frac{\delta^{11}_{RV_{min}} - \delta_{RV} + \sigma}{|\delta^{11}_{RV_{min}} - \delta_{RV}| + \sigma} + 1\right] \times \quad \text{[Equation 87]}$$

-continued $$\left[\frac{\delta_{RV_{max}}^{11} - \delta_{RV} + \sigma}{|\delta_{RV_{max}}^{11} - \delta_{RV}| + \sigma} + 1\right] \times \left[1 - \frac{H_1 - H_2 - \sigma}{|H_1 - H_2| + \sigma}\right].$$

In some embodiments, the minimum stabilization metric $H_1$ may be less than the maximum stabilization metric $H_2$, the minimum approximate remote vehicle heading angle $\delta_{RV_{min}}^{10}$ may be within the remote vehicle heading angle $\delta_{RV}$, the maximum approximate remote vehicle heading angle $\delta_{RV_{max}}^{10}$ may be within the remote vehicle heading angle $\delta_{RV}$, and the second partial stabilization function $\Delta_2^{11}$ may evaluate to one. In some embodiments, the minimum stabilization metric $H_1$ may be at least the maximum stabilization metric $H_2$, the minimum approximate remote vehicle heading angle $\delta_{RV_{min}}^{11}$ may exceed the remote vehicle heading angle $\delta_{RV}$, or the maximum approximate remote vehicle heading angle $\delta_{RV_{max}}^{11}$ may exceed the remote vehicle heading angle $\delta_{RV}$, and the second partial stabilization function $\Delta_2^{11}$ may evaluate to zero.

In some embodiments, a third partial stabilization function $\Delta_3^{10}$ may be expressed as the following:

$$\Delta_3^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times \quad \text{[Equation 88]}$$

$$\left[\frac{\delta_{RV} - \delta_{RV_{max}}^{11} + \sigma}{|\delta_{RV} - \delta_{RV_{max}}^{11}| + \sigma} + 1\right] \times \left[1 - \frac{H_1 - H_2 - \sigma}{|H_1 - H_2| + \sigma}\right].$$

In some embodiments, the minimum stabilization metric $H_1$ may be less than the maximum stabilization metric $H_2$, the minimum approximate remote vehicle heading angle $\delta_{RV_{min}}^{11}$ may be within the remote vehicle heading angle $\delta_{RV}$, the maximum approximate remote vehicle heading angle $\delta_{RV_{max}}^{11}$ may be within the remote vehicle heading angle $\delta_{RV}$, and the third partial stabilization function $\Delta_3^{11}$ may evaluate to one. In some embodiments, the minimum stabilization metric $H_1$ may be at least the maximum stabilization metric $H_2$, the minimum approximate remote vehicle heading angle $\delta_{RV_{min}}^{11}$ may exceed the remote vehicle heading angle $\delta_{RV}$, or the maximum approximate remote vehicle heading angle $\delta_{RV_{max}}^{11}$ may exceed the remote vehicle heading angle $\delta_{RV}$, and the third partial stabilization function $\Delta_3^{10}$ may evaluate to zero.

In some embodiments, the difference between the minimum stabilization metric $H_1$ and the maximum stabilization metric $H_2$ may be expressed as the following:

$$H_1 - H_2 = \delta_{HV} - \delta_{RV_{min}}^{11} - (\delta_{HV} - \delta_{RV_{max}}^{11}),$$

$$H_1 - H_2 = \delta_{HV} - \delta_{RV_{min}}^{11} - \delta_{HV} + \delta_{RV_{max}}^{11},$$

$$H_1 - H_2 = \delta_{RV_{max}}^{11} - \delta_{RV_{min}}^{11}. \quad \text{[Equation 89]}$$

In some embodiments, the first partial stabilization function $\Delta_1^{11}$ may be expressed as the following:

$$\Delta_1^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times \quad \text{[Equation 90]}$$

$$\left[\frac{\delta_{RV_{max}}^{11} - \delta_{RV} + \sigma}{|\delta_{RV_{max}}^{11} - \delta_{RV}| + \sigma} + 1\right] \times \left[\frac{\delta_{RV_{max}}^{11} - \delta_{RV_{min}}^{11} - \sigma}{|\delta_{RV_{max}}^{11} - \delta_{RV_{min}}^{11}| + \sigma} + 1\right].$$

In some embodiments, the second partial stabilization function $\Delta_2^{11}$ may be expressed as the following:

$$\Delta_2^{11} = \frac{1}{8}\left[\frac{\delta_{RV_{min}}^{11} - \delta_{RV} + \sigma}{|\delta_{RV_{min}}^{11} - \delta_{RV}| + \sigma} + 1\right] \times \quad \text{[Equation 91]}$$

$$\left[\frac{\delta_{RV_{max}}^{11} - \delta_{RV} + \sigma}{|\delta_{RV_{max}}^{11} - \delta_{RV}| + \sigma} + 1\right] \times \left[1 - \frac{\delta_{RV_{max}}^{11} - \delta_{RV_{min}}^{11} + \sigma}{|\delta_{RV_{max}}^{11} - \delta_{RV_{min}}^{11}| + \sigma}\right].$$

In some embodiments, the third partial stabilization function $\Delta_3^{10}$ may be expressed as the following:

$$\Delta_3^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times \quad \text{[Equation 92]}$$

$$\left[\frac{\delta_{RV} - \delta_{RV_{max}}^{11} + \sigma}{|\delta_{RV} - \delta_{RV_{max}}^{11}| + \sigma} + 1\right] \times \left[1 - \frac{\delta_{RV_{max}}^{11} - \delta_{RV_{min}}^{11} + \sigma}{|\delta_{RV_{max}}^{11} - \delta_{RV_{min}}^{11}| + \sigma}\right].$$

In some embodiments, the sum of the first partial stabilization function $\Delta_1^{11}$, the second partial stabilization function $\Delta_1^{11}$, and the third partial stabilization function $\Delta_3^{10}$ may be one and the remote vehicle and the host vehicle may be determined to be traveling in crossing directions (RQ=11), which may be expressed as the following:

$$\sum_{i=1}^{3} \Delta_i^{11} = 1; \quad \text{[Equation 93]}$$

$$r_3 = \sum_{i=1}^{3} \Delta_i^{11} \times 1,$$

$$q_3 = \sum_{i=1}^{3} \Delta_i^{11} \times 1.$$

In some embodiments, determining whether the remote vehicle expected path and the host vehicle expected are convergent may be expressed as the following:

$$R = \Sigma_{i=1}^{3} r_i,$$

$$Q = \Sigma_{i=1}^{3} q_i. \quad \text{[Equation 94]}$$

In some embodiments, the relative heading information for the remote vehicle relative to the host vehicle may be expressed as a codeword, or partial codeword, such as a codeword, or partial codeword, including two bits (R, Q), as shown in Table 36 below.

TABLE 36

| R | Q |
|---|---|
| $r_0 = 0$ | $q_0 = 0$ |
| $r_1 = 0$ | $q_1 = \sum_{i=1}^{3} \Delta_i^{01} \times 1$ |
| $r_2 = \sum_{i=1}^{3} \Delta_i^{10} \times 1$ | $q_2 = 0$ |
| $r_3 = \sum_{i=1}^{3} \Delta_i^{11} \times 1$ | $q_3 = \sum_{i=1}^{3} \Delta_i^{11} \times 1$ |

TABLE 36-continued

| R | Q |
|---|---|
| $R = \sum_{i=1}^{3} r_i$ | $Q = \sum_{i=1}^{3} q_i$ |

Although FIGS. 4-30 show examples of vehicles traveling along straight paths, generating converging path information may include using heading or expected path information that includes curved or turning paths.

Figure 31:
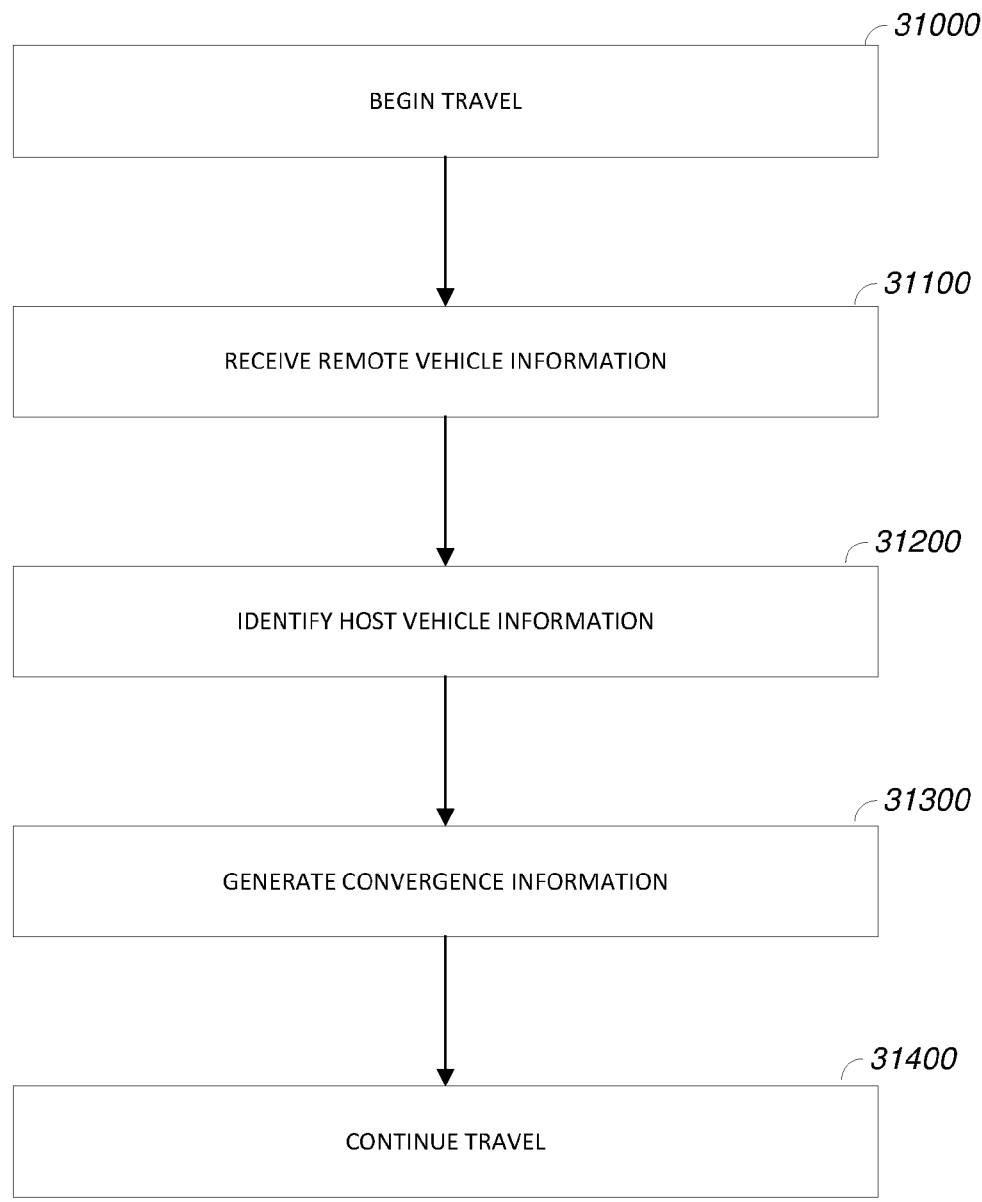
FIG. 31 is a diagram of traversing a vehicle transportation network including generating converging path information in accordance with this disclosure.

FIG. 31 is a diagram of traversing a vehicle transportation network including generating converging path information in accordance with this disclosure. In some embodiments, traversing a vehicle transportation network including generating converging path information may be implemented in a vehicle, such as the vehicle 1000 shown in FIG. 1 or the vehicles 2100/2110 shown in FIG. 2.

In some embodiments, traversing a vehicle transportation network including generating converging path information may include traversing a first portion of the vehicle transportation network at 31000, receiving remote vehicle information at 31100, identifying host vehicle information at 31200, generating convergence information at 31300, traversing a second portion of the vehicle transportation network at 31400, or a combination thereof.

In some embodiments, a host vehicle may traverse a first portion of the vehicle transportation network at 31000. For example, a host vehicle, such as the host vehicle 1000 shown in FIG. 1 or the host vehicle 2100 shown in FIG. 2, may traverse a portion of a vehicle transportation network, such as the portion 2200 shown in FIG. 2.

In some embodiments, remote vehicle information may be received at 31100. For example, the host vehicle may receive a remote vehicle message from a remote vehicle, such as from the remote vehicle 2110 shown in FIG. 2, via a communication link, such as the wireless electronic communication link 2370 shown in FIG. 2. In some embodiments, the host vehicle may store the remote vehicle information. For example, the host vehicle may store the remote vehicle information in a memory of the host vehicle, such as the memory 1340 shown in FIG. 1.

The remote vehicle message may include remote vehicle information, which may indicate remote vehicle geospatial state information for the remote vehicle, remote vehicle kinematic state information for the remote vehicle, or a combination thereof. In some embodiments, remote vehicle geospatial state information may include geospatial coordinates for the remote vehicle, such as longitude and latitude coordinates. In some embodiments, the remote vehicle kinematic state information may include a remote vehicle velocity for the remote vehicle, a remote vehicle heading for the remote vehicle, a remote vehicle acceleration for the remote vehicle, or a remote vehicle yaw rate for the remote vehicle, or any other information, or combination of information, relevant to the operational state of the remote vehicle.

In some embodiments, host vehicle information may be identified at 31200. In some embodiments, the host vehicle information may include host vehicle geospatial state information for the host vehicle, host vehicle kinematic state information for the host vehicle, or a combination thereof. In some embodiments, the host vehicle geospatial state information may include geospatial coordinates for the host vehicle, such as longitude and latitude coordinates. In some embodiments, the host vehicle kinematic state information may include a host vehicle velocity for the host vehicle, a host vehicle heading for the host vehicle, a host vehicle acceleration for the host vehicle, or a host vehicle yaw rate for the host vehicle, or any other information, or combination of information, relevant to the operational state of the host vehicle.

In some embodiments, convergence, or converging path, information may be generated at 31300. For example, the host vehicle may generate converging path information based on the remote vehicle information received at 31100, the host vehicle information identified at 31200, or both. In some embodiments, generating convergence information at 31300 may be similar to generating convergence information as shown at 32000 in FIG. 32.

In some embodiments, the host vehicle may traverse a second portion of the vehicle transportation network at 31400. For example, the host vehicle may traverse the second portion of the vehicle transportation network based, at least in part, on the converging path information generated at 31300.

In some embodiments, traversing the second portion of the vehicle transportation network at 31400 may include traversing the second portion of the vehicle transportation network in response to a codeword representing the converging path information. In some embodiments, traversing the second portion of the vehicle transportation network at 31400 may include controlling the host vehicle to traverse a portion of the vehicle transportation network in response to the codeword. In some embodiments, the codeword may be a stabilized codeword.

In some embodiments, the host vehicle may generate converging path information for multiple remote vehicles, which may include generating a codeword, or stabilized codeword, for each remote vehicle. In some embodiments, the host vehicle may identify a priority for each identified remote vehicle man may traverse the vehicle transportation network based on the prioritization.

In some embodiments, traversing the second portion of the vehicle transportation network at 31400 may include determining that the codeword, or stabilized codeword, for a first remote vehicle indicates that the expected path for the first remote vehicle and the expected path for the host vehicle are divergent, and controlling the host vehicle in response to the codeword for the first remote vehicle may include storing or deleting the information for the first remote vehicle and generating a codeword, or stabilized codeword, based on information for a second remote vehicle to determine whether the expected path for the second remote vehicle and the expected path for the host vehicle are convergent, and controlling the host vehicle to traverse the second portion of the vehicle transportation network in response to the second codeword. For example, the codeword for a first remote vehicle may include relative heading information, such as RQ bits, which may indicate that the remote vehicle heading and the host vehicle heading are divergent (RQ=00), and a codeword may be generated for another remote vehicle.

Figure 32:
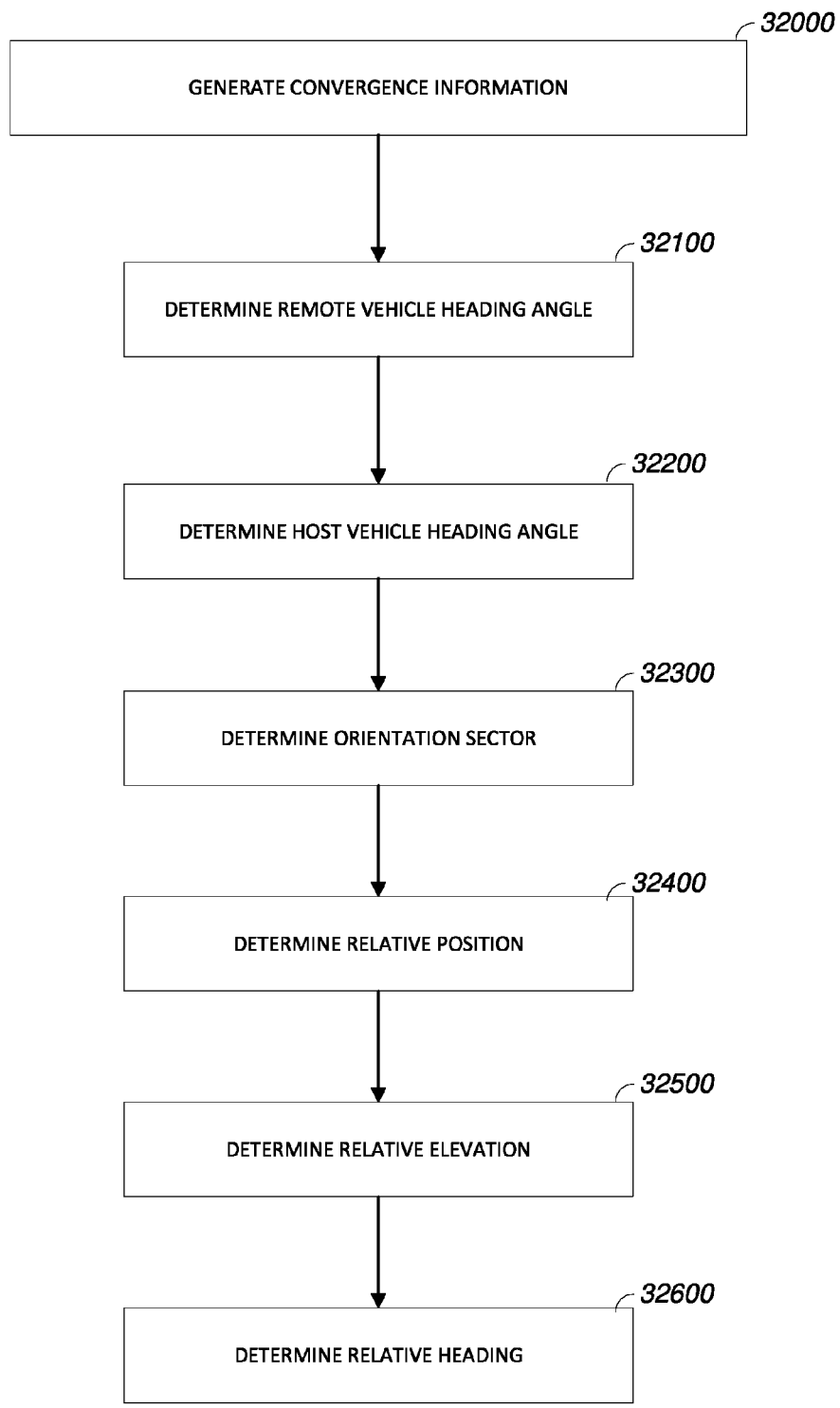
FIG. 32 is a diagram of generating convergence, or converging path, information in accordance with this disclosure.

FIG. 32 is a diagram of generating convergence, or converging path, information in accordance with this disclosure. In some embodiments, generating convergence information may be implemented in a vehicle, such as the vehicle 1000 shown in FIG. 1 or the vehicles 2100/2110 shown in FIG. 2. In some embodiments, generating convergence information at 32000 may be similar to generating convergence information as shown at 31300 in FIG. 31.

In some embodiments, generating convergence information may include determining a remote vehicle heading angle at 32100, determining a host vehicle heading angle at 32200, determining an orientation sector at 32300, determining relative position information at 32400, determining relative elevation information at 32500, determining relative heading information at 32600, or a combination thereof.

In some embodiments, a remote vehicle expected path may be determined at 32100. A remote vehicle expected path may be determined for a remote vehicle based on the remote vehicle information corresponding to the remote vehicle. For example, the remote vehicle information corresponding to the remote vehicle may include geospatial location information, such as longitude $\theta_{RV}$ and latitude information $\phi_{RV}$, and heading information for the remote vehicle, and the remote vehicle expected path may be determined based on the geospatial location information and heading information. In some embodiments, the remote vehicle expected path may correspond with the remote vehicle heading angle $\delta_{RV}$, as shown in FIGS. 4-30. In some embodiments, the remote vehicle information may include information indicating that the remote vehicle may turn, such as active turn signal information, and the remote vehicle expected path may be determined based on the geo spatial location information, heading information, and the information indicating that the remote vehicle may turn.

In some embodiments, a host vehicle expected path may be determined at 32200. A host vehicle expected path may be determined for the host vehicle based on the host vehicle information for the host vehicle. For example, the host vehicle information may include geospatial location information, such as longitude $\theta_{HV}$ and latitude information $\phi_{HV}$, route information, heading information for the host vehicle, or a combination thereof, and the host vehicle expected path may be determined based on the geospatial location information and heading information. In some embodiments, the host vehicle expected path may correspond with the host vehicle heading angle $\delta_{HV}$, as shown in FIGS. 4-30. In some embodiments, the host vehicle information may include information indicating that the host vehicle may turn, such as active turn signal information or route information, and the host vehicle expected path may be determined based on the geospatial location information, heading information, and the information indicating that the host vehicle may turn.

In some embodiments, an orientation sector may be determined at 32300. In some embodiments, determining an orientation sector Q may be similar to determining an orientation sector Q as shown in FIG. 4. In some embodiments, determining an orientation sector may include determining a geodesic between the host vehicle and the remote vehicle and determining a convergence angle $\beta_1$ for the geodesic, which may be similar to determining a geodesic between the host vehicle and the remote vehicle and determining a convergence angle $\beta_1$ for the geodesic as shown in FIGS. 5, 9, 13, and 17. For example, the convergence angle $\beta_1$ may be determined using Equation 2. In some embodiments, the orientation sector may be determined relative to a reference direction, such as north.

In some embodiments, relative position information may be determined at 32400. In some embodiments, relative position information may be determined relative to the orientation sector identified at 32300. In some embodiments, determining the relative position information at 32400 may be similar to determining relative position information as shown in FIGS. 7-8, 11-12, 15-16, and 19-20. In some embodiments, the relative position information may be determined based on an orientation sector, such as the orientation sector identified at 32300, a host vehicle heading angle for the host vehicle, such as the host vehicle heading angle determined at 32200, a remote vehicle heading angle for the remote vehicle, such as the remote vehicle heading angle identified at 32100.

In some embodiments, determining the relative position information at 32400 may include determining a longitudinal relative position of the remote vehicle with respect to the host vehicle based on the orientation sector. In some embodiments, determining the longitudinal relative position may include determining the longitudinal relative position of the remote vehicle as ahead of the host vehicle, adjacent to the host vehicle, or behind the host vehicle, as shown in FIGS. 7, 11, 15, and 19. In some embodiments, the longitudinal relative position may be identified using a longitudinal angular offset threshold, such as the angular offset threshold $\phi_P$, which may define an angular range in which the remote vehicle may be determined to be adjacent to the host vehicle.

In some embodiments, determining the relative position information at 32400 may include determining a lateral relative position of the remote vehicle with respect to the host vehicle based on the orientation sector. In some embodiments, determining the lateral relative position may include determining the lateral relative position of the remote vehicle as to the left of the host vehicle, in-line with the host vehicle, or to the right of the host vehicle, as shown in FIGS. 8, 12, 16, and 20. In some embodiments, the lateral relative position may be identified using a lateral angular offset threshold, such as the angular offset threshold $\phi_L$, which may define an angular range in which the remote vehicle may be determined to be in-line with the host vehicle. In some embodiments, the longitudinal angular offset threshold and the lateral angular offset threshold may be equal.

In some embodiments, relative elevation information may be determined at 32500. In some embodiments, determining the relative elevation information at 32500 may be similar to determining relative elevation information as shown in FIG. 21. In some embodiments, the relative elevation information may be determined based on host vehicle elevation information, which may be identified from host vehicle information, such as the host vehicle information identified at 31200 as shown in FIG. 31; remote vehicle elevation information, which may be identified from remote vehicle information, such as the remote vehicle information identified at 31100 as shown in FIG. 31, and a spatial distance offset threshold. In some embodiments, determining relative elevation information at 32500 may include determining the relative elevation of the remote vehicle as higher than the host vehicle, level with the host vehicle, or lower than the host vehicle.

In some embodiments, relative heading information may be determined at 32600. In some embodiments, determining relative heading information at 32600 may be similar to determining relative heading information as shown in FIGS. 21-30. In some embodiments, determining relative heading information may include determining the relative heading of the remote vehicle as aligned with the host vehicle, opposite the host vehicle, or crossing with the host vehicle. In some embodiments, determining the relative heading information may include determining relative heading information based on a host vehicle heading angle for the host vehicle, such as the host vehicle heading angle determined at 32200, a remote vehicle heading angle for the remote vehicle, such as the remote vehicle heading angle identified at 32100, or both.

In some embodiments, determining the relative heading information may include determining whether the remote vehicle heading is aligned with the host vehicle heading as shown in FIGS. 22-25. For example, determining the relative heading information may include determining relative heading information based on a heading approximation offset threshold $\phi_A$, which may be an angular offset threshold, and which may indicate a defined range of heading angles in which the remote vehicle heading, or expected path, may be determined to be aligned with the host vehicle heading, or expected path.

In some embodiments, determining the relative heading information may include determining whether the remote vehicle heading is opposite to the host vehicle heading as shown in FIGS. 26-29. For example, determining the relative heading information may include determining relative heading information based on a heading approximation offset threshold $\phi_C$, which may be an angular offset threshold, and which may indicate a defined range of heading angles in which the remote vehicle heading, or expected path, may be determined to be opposite to the host vehicle heading, or expected path.

In some embodiments, determining the relative heading information may include determining whether the remote vehicle heading is crossing the host vehicle heading as shown in FIG. 30. For example, determining the relative heading information may include determining relative heading information based on a left cross heading approximation offset $\phi_L$, which may indicate a defined range of heading angles in which the remote vehicle heading, or expected path, may be determined to be crossing the host vehicle heading, or expected path, from the left. In another example, determining the relative heading information may include determining relative heading information based on a right cross heading approximation offset $\phi_R$, which may indicate a defined range of heading angles in which the remote vehicle heading, or expected path, may be determined to be crossing the host vehicle heading, or expected path, from the right.

Although not shown separately in FIG. 32, in some embodiments, generating convergence information may include generating a codeword indicating whether an expected path for the remote vehicle and an expected path for the host vehicle are convergent. For example, the codeword may be an eight bit codeword, wherein a first portion, such as a four-bit portion, may indicate relative position information, such as the relative position information determined at 32400, which may include a first two-bit sub-portion indicating relative longitudinal position information and a second two-bit sub-portion indicating relative lateral position information, a second two-bit portion indicating relative elevation information, such as the relative elevation information determined at 32500, a third two-bit portion indicating relative heading information, such as the relative heading information determined at 32600, or a combination thereof.

Although not shown separately in FIG. 32, in some embodiments, determining the codeword may include determining a stabilized codeword that identifies as convergent a false negative incorrectly indicating that the expected path for the remote vehicle and the expected path for the host vehicle are divergent where a difference between a remote vehicle heading angle for the remote vehicle and a reference direction is within a heading approximation offset threshold.

Although described separately for clarity, in some embodiments, two or more of the angular offset thresholds $\phi_P$, $\phi_I$, $\phi_A$, $\phi_C$, $\phi_L$, or $\phi_R$, may be equal. For example, the angular offset thresholds $\phi_I$ and $\phi_A$ may be five degrees.

Although not shown in FIG. 32, in some embodiments, determining whether the remote vehicle expected path and the host vehicle expected path are convergent may include determining a host vehicle region for the host vehicle, determining a remote vehicle region for the remote vehicle, determining a host vehicle approach angle, determining a remote vehicle approach angle determining an intersection angle, or a combination thereof, which may be similar to determining a host vehicle region for the host vehicle, determining a remote vehicle region for the remote vehicle, determining a host vehicle approach angle $\alpha_{11v}$, determining a remote vehicle approach angle $\alpha_{RV}$, and determining an intersection angle $\alpha_D$ as shown in FIGS. 6, 10, 14, and 18.

Although not shown in FIG. 32, in some embodiments, determining whether the remote vehicle expected path and the host vehicle expected path are convergent may include determining distance information. In some embodiments, determining distance information may include determining an instantaneous distance D of the geodesic as shown in FIGS. 4-30. The instantaneous distance D of the geodesic may indicate a distance between a location of the host vehicle and a location of the remote vehicle in the geospatial domain. For example, instantaneous distance D of the geodesic may be determined using Equation 3. In some embodiments, determining distance information may include determining a host vehicle intersection distance $L_{HV}$ for the host vehicle as shown in FIGS. 4-30. The host vehicle intersection distance $L_{HV}$ for the host vehicle may indicate a distance between a location of the host vehicle and a projected point of convergence with the remote vehicle expected path along the host vehicle expected path in the geospatial domain. In some embodiments, determining distance information may include determining a remote vehicle intersection distance $L_{HV}$ for the remote vehicle as shown in FIGS. 4-30. The remote vehicle intersection distance $L_{RV}$ for the remote vehicle may indicate a distance between a location of the remote vehicle and a projected point of convergence with the host vehicle expected path along the remote vehicle expected path in the geospatial domain.

In some embodiments, generating converging path information at 32000 may include determining whether to use remote vehicle information corresponding to one or more of the remote vehicles. Although not shown separately, in some embodiments, generating convergence information at 32000 may include determining whether the remote vehicle expected path and the host vehicle expected path are convergent. In some embodiments, the convergence information identified at 32000 may temporally, such as within a fraction of a second, correspond with receiving the remote vehicle information.

Figure 33:
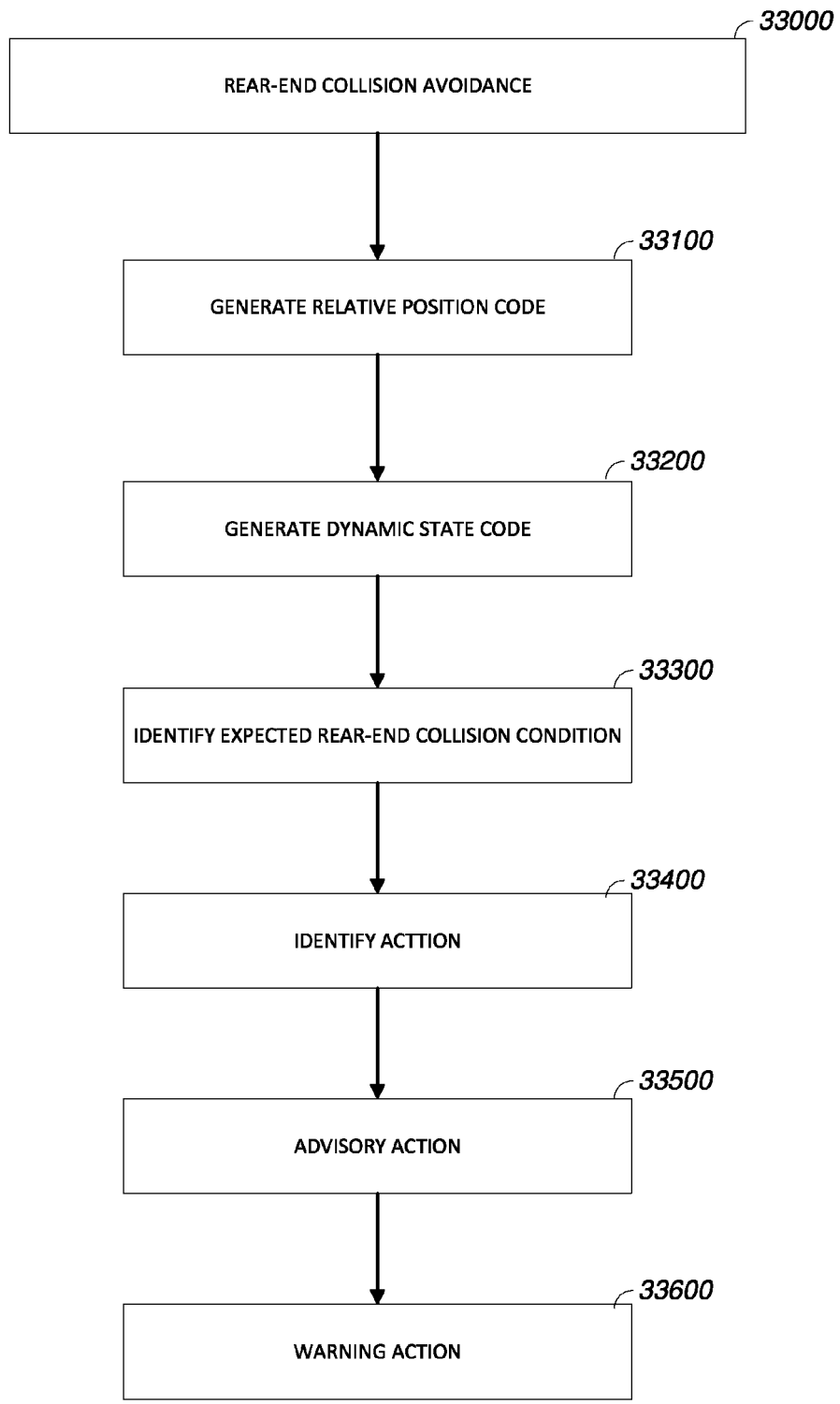
FIG. 33 is a diagram of rear-end collision avoidance in accordance with this disclosure.

FIG. 33 is a diagram of rear-end collision avoidance in accordance with this disclosure. In some embodiments, rear-end collision avoidance may include determining that an expected path for the host vehicle and an expected path for a remote vehicle behind the host vehicle are convergent and that a spatial distance between the host vehicle and the remote vehicle is decreasing.

In some embodiments, rear-end collision avoidance may be implemented in a vehicle, such as the vehicle 1000 shown in FIG. 1 or the vehicles 2100/2110 shown in FIG. 2. Although not shown separately in FIG. 31 or FIG. 32, in some embodiments, generating convergence information, such as the generating convergence information as shown at 31300 in FIG. 31, or the generating convergence information as shown in FIG. 32, may include rear-end collision avoidance.

In some embodiments, rear-end collision avoidance may include generating a relative position code at 33100, generating a dynamic state code at 33200, identifying an expected rear-end collision condition at 33300, identifying a vehicle control action at 33400, performing an advisory action at 33500, performing a warning control action at 33600, or a combination thereof.

In some embodiments, a relative position code may be generated at 33100. In some embodiments, generating a relative position code may be similar to generating convergence information as shown in FIG. 32. For example, generating a relative position code may include generating a codeword, or stabilized codeword, as shown in FIG. 32 as the relative position code.

In some embodiments, a relative position code may include one or more indicators, flags, or bits. In some embodiments, a pair of bits may represent an element of the current relative position of a remote vehicle relative to the current position of the host vehicle. Although the bits of the relative position code are described herein in a particular order, any order may be used. In some embodiments, one or more pairs of bit values, such as 11, may be unused for indicating valid information and may represent invalid or erroneous information.

For example, the relative position code may include a first bit X and a second bit W, and the bits XW may represent a relative longitudinal position of the remote vehicle, as shown in Table 37 below.

TABLE 37

| X | W | Relative Longitudinal Position |
|---|---|---|
| 0 | 0 | RV ahead of HV |
| 0 | 1 | RV adjacent to HV |
| 1 | 0 | RV behind HV |
| 1 | 1 | Unused/Error |

In another example, the relative position code may include a third bit V and a fourth bit U, and the bits VU may represent a relative lateral position of the remote vehicle, as shown in Table 38 below.

TABLE 38

| V | U | Relative Lateral Position |
|---|---|---|
| 0 | 0 | RV in-line with HV |
| 0 | 1 | RV left of HV |
| 1 | 0 | RV right of HV |
| 1 | 1 | Unused/Error |

In another example, the relative position code may include a fifth bit T and a sixth bit S, and the bits TS may represent a relative elevation of the remote vehicle, as shown in Table 39 below.

TABLE 39

| T | S | Relative Elevation |
|---|---|---|
| 0 | 0 | RV level with HV |
| 0 | 1 | RV above HV |
| 1 | 0 | RV below HV |
| 1 | 1 | Unused/Error |

In another example, the relative position code may include a seventh bit R and an eighth bit Q, and the bits RQ may represent a relative heading of the remote vehicle, as shown in Table 40 below.

TABLE 40

| R | Q | Relative Heading |
|---|---|---|
| 0 | 0 | RV diverging from HV |
| 0 | 1 | RV converging aligned with HV |
| 1 | 0 | RV converging opposed with HV |
| 1 | 1 | RV converging perpendicular to HV |

In some embodiments, the relative position code (RPC) may be an eight-bit byte, and may include the eight flags, or bits, X, W, V, U, T, S, R, Q, in a defined order, such as XWVUTSRQ, wherein the X bit is the most significant bit and the Q bit is the least significant bit.

In some embodiments, a relative position code may be indicated using binary values. For example, a remote vehicle may be behind the host vehicle (XW=10), in-lane with the left of the host vehicle (VU=00), level with the host vehicle (TS=00), and on a heading converging with and in alignment with the host vehicle (RQ=01), and the relative position code may be expressed as 10000001. In some embodiments, the relative position code may be expressed using the corresponding decimal notation. For example, the relative position code expressed as 10000001 in binary notation may be expressed in decimal notation as 129.

In some embodiments, a dynamic state code may be generated at 33200. In some embodiments, a dynamic state code may indicate a current operational state of a vehicle and may be generated based on remote vehicle information identified for the vehicle. In some embodiments, generating a dynamic state code at 33200 may include generating a remote vehicle dynamic state code (RVC), a host vehicle dynamic state code (HVC), or both.

In some embodiments, a dynamic state code may include one or more indicators, flags, or bits. In some embodiments, a pair of bits may represent an element of the current dynamic state of a remote vehicle. Although the bits of the dynamic state code are described herein in a particular order, any order may be used. In some embodiments, one or more pairs of bit values, such as 11, may be unused for indicating valid information and may represent invalid or erroneous information.

For example, the dynamic state code may include a first bit, P for the remote vehicle and H for the host vehicle, and a second bit, O for the remote vehicle and G for the host vehicle, and the bits PO/HG may represent a kinetic state of the vehicle, as shown in Table 41 below.

TABLE 41

| P/H | O/G | Kinetic State |
|---|---|---|
| 0 | 0 | In Motion |
| 0 | 1 | Stationary |
| 1 | 0 | Unused/Error |
| 1 | 1 | Unused/Error |

In another example, the dynamic state code may include a third bit, N for the remote vehicle and F for the host vehicle, and a fourth bit, M for the remote vehicle and E for the host vehicle, and the bits NM/FE may represent a lateral control state, such as a steering wheel position, of the vehicle, as shown in Table 42 below.

TABLE 42

| N/F | M/E | Lateral Control State |
|---|---|---|
| 0 | 0 | Steering left |
| 0 | 1 | Steering Neutral |

TABLE 42-continued

| N/F | M/E | Lateral Control State |
|---|---|---|
| 1 | 0 | Steering Right |
| 1 | 1 | Unused/Error |

Although not shown separately, in some embodiments, generating a dynamic state code may include generating bits, such as the N/F and M/E bits, based on a yaw rate of the vehicle instead of, or in addition to, the steering wheel position.

In another example, the dynamic state code may include a fifth bit, L for the remote vehicle and D for the host vehicle, and a sixth bit, K for the remote vehicle and C for the host vehicle, and the bits LK/DC may represent a transmission state of the vehicle, as shown in Table 43 below.

TABLE 43

| L/D | K/C | Transmission State |
|---|---|---|
| 0 | 0 | Drive |
| 0 | 1 | Reverse |
| 1 | 0 | Neutral |
| 1 | 1 | Park |

In another example, the dynamic state code may include a seventh bit, J for the remote vehicle and B for the host vehicle, and an eighth bit, I for the remote vehicle and A for the host vehicle, and the bits JI/BA may represent a signal state, such as a turn signal state, of the vehicle, as shown in Table 44 below.

TABLE 44

| J/B | I/A | Signal State |
|---|---|---|
| 0 | 0 | No Signal |
| 0 | 1 | Left Turn Signal |
| 1 | 0 | Right Turn Signal |
| 1 | 1 | Both Signals (hazards) |

In some embodiments, the dynamic state code (RVC/HVC) may be an eight-bit byte, and may include the eight flags, or bits in a defined order. For example, the remote vehicle dynamic state code (RVC) may include the eight bits P, O, N, M, L, K, J, and I, as the eight-bit byte PONMLKJI, wherein the P bit is the most significant bit and the I bit is the least significant bit. In another example, the host vehicle dynamic state code (HVC) may include the eight bits H, G, F, E, D, C, B, and A, as the eight-bit byte HGFEDCBA, wherein the H bit is the most significant bit and the A bit is the least significant bit.

In some embodiments, a dynamic state code may be indicated using binary values. For example, a remote vehicle may be in motion (PO=00), with neutral steering (NM=01), in drive (LK=00), and with no active turn signal (JI=00), and the remote vehicle dynamic state code may be expressed as 00010000, in binary notation, or as 16, in decimal notation. In another example, the host vehicle may be in motion (HG=00), with neutral steering (FE=01), in drive (DC=00), and with no active turn signal (BA=00), and the remote vehicle dynamic state code may be expressed as 00010000, in binary notation, or as 16, in decimal notation.

In some embodiments, an expected rear-end collision condition may be identified at 33300. For example, the remote vehicle may be traversing the vehicle transportation network along a path similar to the host vehicle, behind the host vehicle, and in-lane with the host vehicle, and an expected rear-end collision condition may indicate an expected rear-end collision between the host vehicle and the remote vehicle responsive to a deceleration by the host vehicle, an acceleration by the remote vehicle, or both.

In some embodiments, identifying an expected rear-end collision condition at 33300 may include evaluating the relative position code (RPC), the remote vehicle dynamic state code (RVC), the host vehicle dynamic state code (HVC), or a combination thereof. For example, the relative position code (RPC), the remote vehicle dynamic state code (RVC), and the host vehicle dynamic state code (HVC), may be combined as a three-byte word, and identifying an expected rear-end collision condition at 33300 may include evaluating the three-byte word.

In some embodiments, identifying an expected rear-end collision condition at 33300 may include identifying relative position code for rear-end collision avoidance warning ($RPC_{RCAW}$), identifying a remote vehicle dynamic state code for rear-end collision avoidance warning ($RVC_{RCAW}$), identifying a host vehicle dynamic state code for rear-end collision avoidance warning ($HVC_{RCAW}$), or a combination thereof. In some embodiments, evaluating the relative position code (RPC), the remote vehicle dynamic state code (RVC), the host vehicle dynamic state code (HVC), or a combination thereof may be expressed using Boolean Algebra notation.

In some embodiments, the relative position code for rear-end collision avoidance warning ($RPC_{RCAW}$) may be identified based on the relative position code.

In some embodiments, the remote vehicle may be behind the host vehicle, which may be indicated by the bits X and W having the values one (1) and zero (0) respectively, which may be expressed as XW=10, or may be expressed in Boolean Algebra notation as X (X) and not W ($\overline{W}$) respectively, or in combination as $X\overline{W}$, and an expected rear-end collision condition may be identified. The Boolean Algebra notation $\overline{X}\overline{W}$, which may correspond with the bit values 00, may indicate that the remote vehicle is ahead of the host vehicle, and a non-rear-end collision condition may be identified. The Boolean Algebra notation $\overline{X}W$, which may correspond with the bit values 01, may indicate that the remote vehicle is adjacent to the host vehicle, and a non-rear-end collision condition may be identified. The Boolean Algebra notation XW, which may correspond with the bit values 11, may indicate a fault or error, and a non-rear-end collision condition may be identified.

In some embodiments, the remote vehicle may in-line with the host vehicle, which may be indicated by the bits V and U having the values zero (0) and zero (0) respectively, which may be expressed as VU=00, or may be expressed in Boolean Algebra notation as not V ($\overline{V}$) and not U ($\overline{U}$) respectively, or in combination as $\overline{V}\overline{U}$, and an expected rear-end collision condition may be identified. The Boolean Algebra notation $\overline{V}U$, which may correspond with the bit values 01, may indicate that the remote vehicle is to the left of the host vehicle, and a non-rear-end collision condition may be identified. The Boolean Algebra notation $V\overline{U}$, which may correspond with the bit values 10, may indicate that the remote vehicle is to the right of the host vehicle, and a non-rear-end collision condition may be identified. The Boolean Algebra notation VU, which may correspond with the bit values 11, may indicate a fault or error, and a non-rear-end collision condition may be identified.

In some embodiments, the remote vehicle may be level with the host vehicle, which may be indicated by the bits T and S having the values zero (0) and zero (0) respectively, which may be expressed as TS=00, or may be expressed in Boolean Algebra notation as not T ($\overline{T}$) and not S ($\overline{S}$) respectively, or in combination as $\overline{TS}$. The Boolean Algebra notation $\overline{T}S$, which may correspond with the bit values 01, may indicate that the remote vehicle is above the host vehicle, and a non-rear-end collision condition may be identified. The Boolean Algebra notation $T\overline{S}$, which may correspond with the bit values 10, may indicate that the remote vehicle is below the host vehicle, and a non-rear-end collision condition may be identified. The Boolean Algebra notation TS, which may correspond with the bit values 11, may indicate a fault or error, and a non-rear-end collision condition may be identified.

In some embodiments, the remote vehicle heading may be converging with and aligned with the host vehicle heading, which may be indicated by the bits R and Q having the values zero (0) and one (1) respectively, which may be expressed as RQ=01, and the relative heading of the remote vehicle (RQ) may be expressed in Boolean Algebra notation as $\overline{RQ}$, and an expected rear-end collision condition may be identified. The Boolean Algebra notation $\overline{RQ}$, which may correspond with the bit values RQ=00, may indicate that the remote vehicle heading may be diverging from the host vehicle, and a non-rear-end collision condition may be identified. The Boolean Algebra notation $R\overline{Q}$, which may correspond with the bit values RQ=10, may indicate that the remote vehicle heading may be converging with and opposing the host vehicle, and a non-rear-end collision condition may be identified. The Boolean Algebra notation RQ, which may correspond with the bit values RQ=11, may indicate that the remote vehicle heading may be converging with and perpendicular to the host vehicle, and a non-rear-end collision condition may be identified.

In some embodiments, determining the relative position code for rear-end collision avoidance warning (RPC$_{RCAW}$) may be expressed as the following:

$$\text{RPC}_{RCAW} = \overline{XW} \times \overline{VU} \times \overline{TS} \times \overline{RQ}. \qquad \text{[Equation 95]}$$

In some embodiments, the remote vehicle dynamic state code for rear-end collision avoidance warning (RVC$_{RCAW}$) may be identified based on the remote vehicle dynamic state code.

In some embodiments, the remote vehicle may be in motion, which may be indicated by the bits P and O having the values zero (0) and zero (0), which may be expressed as PO=00, and an expected rear-end collision condition may be identified for a remote vehicle in motion, which may be expressed in Boolean Algebra notation as not P ($\overline{P}$) and not O ($\overline{O}$), or in combination as $\overline{PO}$. The Boolean Algebra notation $\overline{P}O$, which may correspond with the bit values 01, may indicate that the remote vehicle is stationary, and a non-rear-end collision condition may be identified. The Boolean Algebra notation $P\overline{O}$ or PO, which may correspond with the bit values 10 or 11, may indicate a fault or error, and a non-rear-end collision condition may be identified.

In some embodiments, the remote vehicle may be steering to the left, which may be indicated by the bits N and M having the values zero (0) and zero (0) respectively, which may be expressed as NM=00, may be steering neutral, which may be indicated by the bits N and M having the values zero (0) and one (1) respectively, which may be expressed as NM=01, or may be steering to the right, which may be indicated by the bits N and M having the values one (1) and zero (0) respectively, which may be expressed as NM=10. An expected rear-end collision condition may be identified for a remote vehicle in steering left, neutral, or right. The Boolean Algebra notation for not NM ($\overline{NM}$), may correspond with the bit values 11, and may indicate a fault or error, and a non-rear-end collision condition may be identified.

In some embodiments, the remote vehicle may be in drive, which may be indicated by the bits L and K having the values zero (0) and zero (0) respectively, which may be expressed as LK=00, or the remote vehicle may be in neutral, which may be indicated by the bits L and K having the values zero (0) and one (1) respectively, which may be expressed as LK=01, and an expected rear-end collision condition may be identified for a remote vehicle in drive or neutral, which may be expressed in Boolean Algebra notation as not K ($\overline{K}$). The Boolean Algebra notation $\overline{L}K$, which may correspond with the bit values 01, may indicate that the remote vehicle is in reverse, and a non-rear-end collision condition may be identified. The Boolean Algebra notation LK, which may correspond with the bit values 11, may indicate that the remote vehicle is in park, and a non-rear-end collision condition may be identified.

In some embodiments, the remote vehicle may not have an active external signal indicator, which may be indicated by the bits J and I having the values zero (0) and zero (0) respectively, which may be expressed as JI=00, may have an active left turn signal, which may be indicated by the bits J and I having the values zero (0) and one (1) respectively, which may be expressed as JI=01, may have an active right turn signal, which may be indicated by the bits J and I having the values one (1) and zero (0) respectively, which may be expressed as JI=10, or may have active hazards, which may be indicated by the bits J and I having the values one (1) and one (1) respectively, which may be expressed as JI=11. An expected rear-end collision condition may be identified for a remote vehicle that has no active external signal indicators, that has an active left turn signal indicator, that has an active right turn signal indicator, or that has active hazards, which may be expressed in Boolean Algebra notation as true, or 1.

In some embodiments, determining the remote vehicle dynamic state code for rear-end collision avoidance warning (RVC$_{RCAW}$) may be expressed as the following:

$$\text{RVC}_{RCAW} = \overline{PO} \times \overline{NM} \times \overline{K}. \qquad \text{[Equation 96]}$$

In some embodiments, the host vehicle dynamic state code for rear-end collision avoidance warning (HVC$_{RCAW}$) may be identified based on the host vehicle dynamic state code.

In some embodiments, the host vehicle may be in motion, which may be indicated by the bits H and G having the values zero (0) and zero (0), which may be expressed as HG=00, or the host vehicle may be stationary, which may be indicated by the bits H and G having the values zero (0) and one (1), which may be expressed as HG=01, and an expected rear-end collision condition may be identified for a host vehicle in motion or stationary, which may be expressed in Boolean Algebra notation as not H ($\overline{H}$). The Boolean Algebra notation $H\overline{G}$ or HG, which may correspond with the bit values 10 or 11, may indicate a fault or error, and a non-rear-end collision condition may be identified.

In some embodiments, the host vehicle may be steering to the left, which may be indicated by the bits F and E having the values zero (0) and zero (0) respectively, which may be expressed as FE=00, may be steering neutral, which may be indicated by the bits F and E having the values zero (0) and one (1) respectively, which may be expressed as FE=01, or may be steering to the right, which may be indicated by the bits F and E having the values one (1) and zero (0) respectively, which may be expressed as FE=10. An expected rear-end collision condition may be identified for a host vehicle steering left, neutral, or right. The Boolean Algebra notation for not FE ($\overline{FE}$), may correspond with the bit values 11, and may indicate a fault or error, and a non-rear-end collision condition may be identified.

In some embodiments, the host vehicle may be in drive, which may be indicated by the bits D and C having the values zero (0) and zero (0) respectively, which may be expressed as DC=00, the host vehicle may be in reverse, which may be indicated by the bits D and C having the values zero (0) and one (1) respectively, which may be expressed as DC=01, the host vehicle may be in neutral, which may be indicated by the bits D and C having the values one (1) and zero (0) respectively, which may be expressed as DC=10, the host vehicle may be in park, which may be indicated by the bits D and C having the values one (1) and one (1) respectively, which may be expressed as DC=11, and an expected rear-end collision condition may be identified for a host vehicle in neutral, reverse, park, or drive, which may be expressed in Boolean Algebra notation as true, or 1.

In some embodiments, the host vehicle may not have an active external signal indicator, which may be indicated by the bits B and A having the values zero (0) and zero (0) respectively, which may be expressed as BA=00, may have an active left turn signal, which may be indicated by the bits B and A having the values zero (0) and one (1) respectively, which may be expressed as BA=01, may have an active right turn signal, which may be indicated by the bits B and A having the values one (1) and zero (0) respectively, which may be expressed as BA=10, or may have active hazards, which may be indicated by the bits B and A having the values one (1) and one (1) respectively, which may be expressed as BA=11. An expected rear-end collision condition may be identified for a host vehicle that has no active external signal indicators, that has an active left turn signal indicator, that has an active right turn signal indicator, or that has active hazards, which may be expressed in Boolean Algebra notation as true, or 1.

In some embodiments, determining the host vehicle dynamic state code for rear-end collision avoidance warning ($HVC_{RCAW}$) may be expressed as the following:

$$HVC_{RCAW} = \overline{H} \times \overline{FE}. \quad \text{[Equation 97]}$$

In some embodiments, convergence information, which may include rear-end collision avoidance information, may be generated periodically, such as according to a defined period, such as 100 milliseconds. In some embodiments, the period between generating convergence information may be extended in response to identifying an expected rear-end collision condition at 33300. For example, an expected rear-end collision condition may be identified at 33300 and the period for generating convergence information may be extended from 100 ms to 500 ms.

In some embodiments, a vehicle control action may be identified at 33400. In some embodiments, a vehicle control action may be identified in response to identifying an expected rear-end collision condition at 33300. In some embodiments, a vehicle control action may indicate a vehicle control operation for safely traversing a portion the vehicle transportation network corresponding to the expected rear-end collision condition, such as by oscillating, blinking, or flashing, break lamps, the vehicle control action may indicate a vehicle control operation for minimizing an effect of an expected rear-end collision, such as by presenting information to the driver indicating the expected rear-end collision, adjusting safety belt tension, adjusting a head rest position, or a combination thereof, or the vehicle control action may indicate a combination of vehicle control operations for safely traversing a portion the vehicle transportation network corresponding to the expected rear-end collision condition and minimizing an effect of an expected rear-end collision.

In some embodiments, identifying the vehicle control action at 33400 may include determining a geospatially direct line distance, or instantaneous distance D, between the host vehicle and the remote vehicle, which may be determined based on the host vehicle information, the remote vehicle information, or a combination thereof, as shown in Equation 3.

In some embodiments, identifying the vehicle control action at 33400 may include determining a deceleration rate ($\alpha_{RCAW}$) for the remote vehicle to traverse the vehicle transportation network by decreasing the speed of the remote vehicle $V_{RV}$ so that the speed of the remote vehicle $V_{RV}$ does not exceed the speed of the host vehicle $V_{HV}$ prior to a defined distance threshold $d_{RCAW}$, such as three meters, which may be expressed as the following:

$$a_{RCAW} = \frac{-(v_{RV} - v_{HV})^2}{2(D - d_{RCAW})}. \quad \text{[Equation 98]}$$

In some embodiments, an advisory vehicle control action may be performed at 33500. In some embodiments, the deceleration rate ($\alpha_{RCAW}$) may be within a rear-end collision advisory deceleration rate threshold, such as −0.15 times the acceleration rate of gravity (g), which may be expressed as $\alpha_{RCAW} \leq -0.15$ g, and an advisory vehicle control action corresponding to the deceleration rate may be identified as the vehicle control action. For example, the advisory vehicle control action may include oscillating, blinking, or flashing, the host vehicle break lamps at an advisory frequency, such as 2 Hz. In some embodiments, the advisory vehicle control action may include presenting information indicating an expected rear-end collision to the driver of the host vehicle.

In some embodiments, a warning vehicle control action may be performed at 33500. In some embodiments, the deceleration rate ($\alpha_{RCAW}$) may be within a rear-end collision warning deceleration rate threshold, such as −0.25 g, which may be expressed as $\alpha_{RCAW} \leq -0.25$ g, and a warning vehicle control action corresponding to the deceleration rate may be identified as the vehicle control action. For example, the warning vehicle control action may include oscillating, blinking, or flashing, the host vehicle break lamps at a warning frequency, such as 4 Hz. In some embodiments, the warning vehicle control action may include adjusting safety belt tension of a safety belt of the host vehicle, adjusting one or more head rest positions of the host vehicle, presenting information indicating the expected rear-end collision to the driver of the host vehicle, or a combination thereof.

Although not shown separately in FIG. 33, in some embodiments, rear-end collision avoidance may include determining that a previously identified rear-end collision condition has ceased. For example, an expected rear-end collision condition may be identified, the host vehicle may traverse the vehicle transportation network safely in accordance with the advisory action at 33500 or the warning action at 33600, the speed of the host vehicle relative to the remote vehicle may be zero, and rear-end collision avoidance may include determining that the previously identified rear-end collision condition has ceased. In some embodiments, a previously displayed rear-end collision warning may be cleared in response to determining that the previously identified rear-end collision condition has ceased.

Although not shown separately in FIG. 33, the vehicle may identify a rear-end collision warning state concurrently with another warning state, such as another rear-end collision warning state, a blind spot warning state, a forward collision warning state, or any other warning state, may determine the most immediate warning state from the identified warning states, may operate the vehicle in accordance with the most immediate warning state, and may omit operating the vehicle in accordance with the other warning states.

Figure 34:
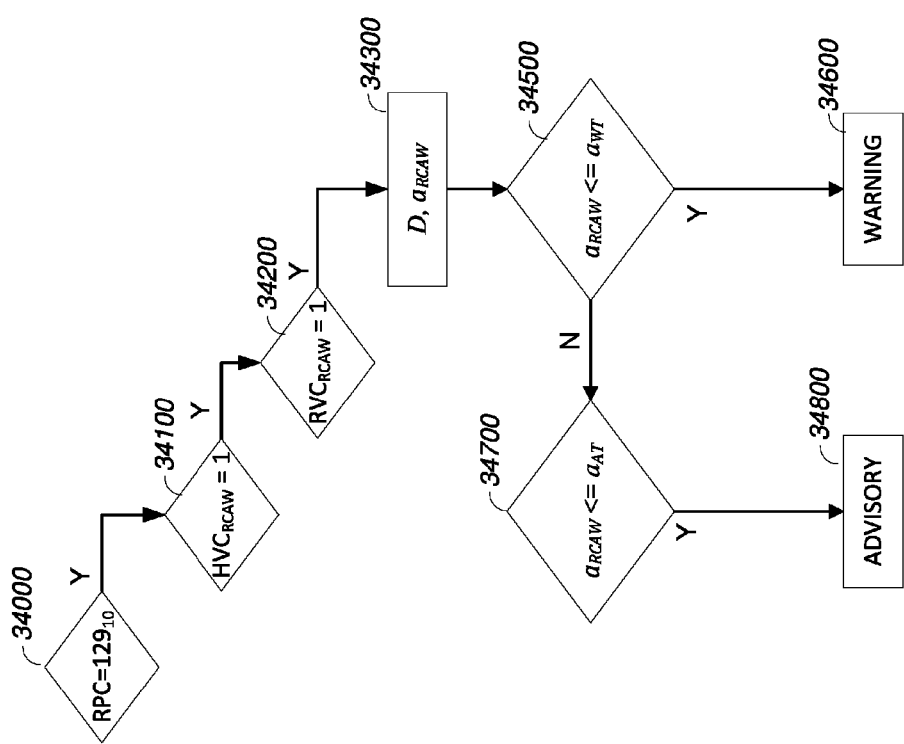
FIG. 34 is a logic flow diagram of the example of rear-end collision avoidance shown in FIG. 33, in accordance with this disclosure.

FIG. 34 is a logic flow diagram of the example of rear-end collision avoidance shown in FIG. 33, in accordance with this disclosure. In some embodiments rear-end collision avoidance may be implemented in a vehicle, such as the vehicle 1000 shown in FIG. 1 or the vehicles 2100/2110 shown in FIG. 2.

In some embodiments, rear-end collision avoidance may include determining whether the relative position code (RPC) indicates a value of 129 (decimal representation), or 10000001 (binary representation), which may indicate that the remote vehicle is behind the host vehicle, in-line with the host vehicle, level with the host vehicle, and the remote vehicle heading is converging with and aligned with the host vehicle at 34000.

In some embodiments, the relative position code (RPC) may indicate a value of 129 (decimal representation) and rear-end collision avoidance may include determining whether the host vehicle dynamic state code for rear-end collision avoidance warning ($HVC_{RCAW}$) indicates a value of 1, which may indicate that the host vehicle is in motion or stationary, and in drive, park, reverse, or neutral, at 34100.

In some embodiments, the host vehicle dynamic state code for rear-end collision avoidance warning ($HVC_{RCAW}$) may indicate a value of 1, and rear-end collision avoidance may include determining whether the remote vehicle dynamic state code for rear-end collision avoidance warning ($RVC_{RCAW}$) indicates a value of 1, which may indicate that the remote vehicle is in motion and in drive or neutral at 34200.

In some embodiments, the remote vehicle dynamic state code for rear-end collision avoidance warning ($RVC_{RCAW}$) may indicate a value of 1, and rear-end collision avoidance may include identifying the instantaneous distance D, the deceleration rate ($\alpha_{RCAW}$), or both, at 34300, such as the deceleration rate identified at 33400 as shown in FIG. 33, and rear-end collision avoidance may include determining whether a rear-end collision warning deceleration rate threshold ($\alpha_{WT}$), such as −0.25 g, exceeds the deceleration rate ($\alpha_{RCAW} < \alpha_{WT}$, $\alpha_{WT}=-0.25$ g) at 34500.

In some embodiments, the deceleration rate may be at least the rear-end collision warning deceleration rate threshold and rear-end collision avoidance may include traversing the vehicle transportation network in accordance with a warning vehicle control action at 34600, such as the warning vehicle control action identified at 33500, such as such as by oscillating, blinking, or flashing, break lamps at a warning frequency, such as 4 Hz, presenting information to the driver indicating the expected rear-end collision, adjusting safety belt tension, adjusting a head rest position, or a combination thereof.

In some embodiments, the rear-end collision warning deceleration rate threshold may exceed the deceleration rate and rear-end collision avoidance may include determining whether a rear-end collision advisory deceleration rate threshold ($\alpha_{AT}$), such as −0.15 g, exceeds the deceleration rate ($\alpha_{RCAW} \leq \alpha_{AT}$, $\alpha_{AT}=-0.15$ g) at 34700.

In some embodiments, the deceleration rate may be at least the rear-end collision advisory deceleration rate threshold and rear-end collision avoidance may include traversing the vehicle transportation network in accordance with an advisory vehicle control action at 34800, such as the advisory vehicle control action identified at 33500, such as such as by oscillating, blinking, or flashing, break lamps at an advisory frequency, such as 2 Hz, presenting information to the driver indicating the expected rear-end collision, or a combination thereof.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
   traversing, by a host vehicle, a vehicle transportation network, wherein traversing the vehicle transportation network includes:
   receiving, at a host vehicle, from a remote vehicle, via a wireless electronic communication link, a remote vehicle message, the remote vehicle message including remote vehicle information,
   identifying host vehicle information for the host vehicle,
   determining a relative position code indicating whether an expected path for the remote vehicle and an expected path for the host vehicle are convergent based on the host vehicle information, the remote vehicle information, and a reference direction,
   determining a remote vehicle dynamic state code based on the remote vehicle information,
   determining a host vehicle dynamic state code based on the host vehicle information,
   identifying an expected rear-end collision condition based on the relative position code, the remote vehicle dynamic state code, and the host vehicle dynamic state code, and
   in response to identifying the expected rear-end collision condition, identifying a vehicle control action based on the host vehicle dynamic state code; and
   traversing a portion of the vehicle transportation network in accordance with the vehicle control action.

2. The method of claim 1, wherein the remote vehicle information includes:
   remote vehicle geospatial state information for the remote vehicle, the remote vehicle geospatial state information including geospatial coordinates for the remote vehicle;
   remote vehicle kinematic state information for the remote vehicle, the remote vehicle kinematic state information including one or more of a remote vehicle velocity for the remote vehicle, a remote vehicle heading for the remote vehicle, a remote vehicle acceleration for the remote vehicle, or a remote vehicle yaw rate for the remote vehicle; and
   remote vehicle operational state information for the remote vehicle, the remote vehicle operational state information including one or more of lateral control state information for the remote vehicle, transmission state information for the remote vehicle, or exterior signal state information for the remote vehicle.

3. The method of claim 1, wherein the host vehicle information includes:
host vehicle geospatial state information for the host vehicle, the host vehicle geospatial state information including geospatial coordinates for the host vehicle;
host vehicle kinematic state information for the host vehicle, the host vehicle kinematic state information including one or more of a host vehicle velocity for the host vehicle, a host vehicle heading for the host vehicle, a host vehicle acceleration for the host vehicle, or a host vehicle yaw rate for the host vehicle; and
host vehicle operational state information for the host vehicle, the host vehicle operational state information including one or more of lateral control state information for the host vehicle, transmission state information for the host vehicle, or exterior signal state information for the host vehicle.

4. The method of claim 1, wherein determining the relative position code includes identifying a first eight-bit byte wherein a first bit of the first eight-bit byte and a second bit of the first eight-bit byte indicate a longitudinal position of the remote vehicle relative to the host vehicle, a third bit of the first eight-bit byte and a fourth bit of the first eight-bit byte indicate a lateral position of the remote vehicle relative to the host vehicle, a fifth bit of the first eight-bit byte and a sixth bit of the first eight-bit byte indicate an elevation of the remote vehicle relative to the host vehicle, and a seventh bit of the first eight-bit byte and an eighth bit of the first eight-bit byte indicate a heading of the remote vehicle relative to the host vehicle; and
traversing a portion of the vehicle transportation network in accordance with the vehicle control action includes, in response to a determination that the relative position code indicates a fault state, indicating the fault state to a driver of the host vehicle.

5. The method of claim 1, wherein determining the remote vehicle dynamic state code includes identifying a second eight-bit byte wherein a first bit of the second eight-bit byte and a second bit of the second eight-bit byte indicate a kinematic state of the remote vehicle, a third bit of the second eight-bit byte and a fourth bit of the second eight-bit byte indicate a lateral control state of the remote vehicle, a fifth bit of the second eight-bit byte and a sixth bit of the second eight-bit byte indicate a transmission state of the remote vehicle, and a seventh bit of the second eight-bit byte and an eighth bit of the second eight-bit byte indicate an external signal state of the remote vehicle; and
traversing a portion of the vehicle transportation network in accordance with the vehicle control action includes, in response to a determination that the remote vehicle dynamic state code indicates a fault state, indicating the fault state to a driver of the host vehicle.

6. The method of claim 1, wherein determining the host vehicle dynamic state code includes identifying a third eight-bit byte wherein a first bit of the third eight-bit byte and a second bit of the third eight-bit byte indicate a kinematic state of the host vehicle, a third bit of the third eight-bit byte and a fourth bit of the third eight-bit byte indicate a lateral control state of the host vehicle, a fifth bit of the third eight-bit byte and a sixth bit of the third eight-bit byte indicate a transmission state of the host vehicle, and a seventh bit of the third eight-bit byte and an eighth bit of the third eight-bit byte indicate an external signal state of the host vehicle; and
traversing a portion of the vehicle transportation network in accordance with the vehicle control action includes, in response to a determination that the host vehicle dynamic state code indicates a fault state, indicating the fault state to a driver of the host vehicle.

7. The method of claim 1, wherein identifying the expected rear-end collision condition includes determining that the remote vehicle is behind the host vehicle, the remote vehicle is in-line with the host vehicle, the remote vehicle is level with the host vehicle, the remote vehicle heading is convergent with the host vehicle heading, the remote vehicle heading is aligned with the host vehicle heading, the remote vehicle is in motion, and the remote vehicle is in a drive transmission state or a neutral transmission state.

8. The method of claim 1, wherein identifying the vehicle control action based on the host vehicle dynamic state code includes:
identifying a current geospatial distance between the host vehicle and the remote vehicle;
identifying a deceleration rate based on the current geospatial distance between the host vehicle and the remote vehicle, a current speed of the remote vehicle, and a current speed of the host vehicle, such that on a condition that the remote vehicle traverses the vehicle transportation network by decelerating in accordance with the deceleration rate, a difference between a speed of the host vehicle at a post-deceleration location and an expected speed for the remote vehicle temporally corresponding to the post-deceleration location is within a relative speed threshold for rear-end collision avoidance, and a difference between a geospatial location of the host vehicle corresponding to the post-deceleration location and an expected geospatial location for the remote vehicle corresponding to the post-deceleration location exceeds a minimum distance threshold for rear-end collision avoidance.

9. The method of claim 1, wherein identifying the vehicle control action includes:
on a condition that the deceleration rate is within a rear-end collision advisory deceleration rate threshold, identifying an advisory vehicle control action as the vehicle control action, wherein the advisory vehicle control action includes oscillating break lamps of the host vehicle at an advisory frequency; and
on a condition that the deceleration rate is within a rear-end collision warning deceleration rate threshold, identifying a warning vehicle control action as the vehicle control action, wherein the warning vehicle control action includes oscillating break lamps of the host vehicle at a warning frequency.

10. The method of claim 9, wherein the warning vehicle control action includes:
presenting a representation of the warning vehicle control action to a driver of the host vehicle;
adjusting a safety belt tension of a safety belt of the host vehicle; and
adjusting a head rest position of a head rest of the host vehicle.

11. A method for use in traversing a vehicle transportation network, the method comprising:
traversing, by a host vehicle, a vehicle transportation network, wherein traversing the vehicle transportation network includes:
receiving, at a host vehicle, from a remote vehicle, via a wireless electronic communication link, a remote vehicle message, the remote vehicle message including remote vehicle information, determining a relative position code indicating geospatial location of the remote vehicle relative to the host vehicle based on the host vehicle information, the remote vehicle information, and a reference direction, determining a remote vehicle dynamic state code based on the remote vehicle information, traversing a portion of the vehicle transportation network, wherein traversing the portion of the vehicle transportation network includes performing rear-end collision avoidance based on the relative position code and the remote vehicle dynamic state code.

12. The method of claim 11, wherein determining the relative position code includes identifying a first eight-bit byte wherein a first bit of the first eight-bit byte and a second bit of the first eight-bit byte indicate a longitudinal position of the remote vehicle relative to the host vehicle, a third bit of the first eight-bit byte and a fourth bit of the first eight-bit byte indicate a lateral position of the remote vehicle relative to the host vehicle, a fifth bit of the first eight-bit byte and a sixth bit of the first eight-bit byte indicate an elevation of the remote vehicle relative to the host vehicle, and a seventh bit of the first eight-bit byte and an eighth bit of the first eight-bit byte indicate a heading of the remote vehicle relative to the host vehicle; and performing rear-end collision avoidance includes, in response to a determination that the relative position code indicates a fault state, indicating the fault state to a driver of the host vehicle.

13. The method of claim 11, wherein:
the remote vehicle information includes:
remote vehicle geospatial state information for the remote vehicle, the remote vehicle geospatial state information including geospatial coordinates for the remote vehicle,
remote vehicle kinematic state information for the remote vehicle, the remote vehicle kinematic state information including one or more of a remote vehicle velocity for the remote vehicle, a remote vehicle heading for the remote vehicle, a remote vehicle acceleration for the remote vehicle, or a remote vehicle yaw rate for the remote vehicle, and
remote vehicle operational state information for the remote vehicle, the remote vehicle operational state information including one or more of lateral control state information, transmission state information, or exterior signal state information;

determining the remote vehicle dynamic state code includes identifying a second eight-bit byte wherein a first bit of the second eight-bit byte and a second bit of the second eight-bit byte indicate a kinematic state of the remote vehicle, a third bit of the second eight-bit byte and a fourth bit of the second eight-bit byte indicate a lateral control state of the remote vehicle, a fifth bit of the second eight-bit byte and a sixth bit of the second eight-bit byte indicate a transmission state of the remote vehicle, and a seventh bit of the second eight-bit byte and an eighth bit of the second eight-bit byte indicate an external signal state of the remote vehicle; and performing rear-end collision avoidance includes, in response to a determination that the remote vehicle dynamic state code indicates a fault state, indicating the fault state to a driver of the host vehicle.

14. The method of claim 11, wherein:
the host vehicle information includes:
host vehicle geospatial state information for the host vehicle, the host vehicle geospatial state information including geospatial coordinates for the host vehicle,
host vehicle kinematic state information for the host vehicle, the host vehicle kinematic state information including one or more of a host vehicle velocity for the host vehicle, a host vehicle heading for the host vehicle, a host vehicle acceleration for the host vehicle, or a host vehicle yaw rate for the host vehicle,
host vehicle operational state information for the host vehicle, the host vehicle operational state information including one or more of lateral control state information for the host vehicle, transmission state information for the host vehicle, or exterior signal state information for the host vehicle;

traversing the vehicle transportation network includes determining a host vehicle dynamic state code based on the host vehicle information, wherein determining the host vehicle dynamic state code includes identifying a third eight-bit byte wherein a first bit of the third eight-bit byte and a second bit of the third eight-bit byte indicate a kinematic state of the host vehicle, a third bit of the third eight-bit byte and a fourth bit of the third eight-bit byte indicate a lateral control state of the host vehicle, a fifth bit of the third eight-bit byte and a sixth bit of the third eight-bit byte indicate a transmission state of the host vehicle, and a seventh bit of the third eight-bit byte and an eighth bit of the third eight-bit byte indicate an external signal state of the host vehicle; and performing rear-end collision avoidance includes, in response to a determination that the host vehicle dynamic state code indicates a fault state, indicating the fault state to a driver of the host vehicle.

15. The method of claim 11, wherein performing rear-end collision avoidance includes:
identifying an expected rear-end collision condition based on the relative position code and the remote vehicle dynamic state code;
in response to identifying the expected rear-end collision condition, identifying a deceleration rate for the remote vehicle to safely traverse the vehicle transportation network;
identifying a vehicle control action based on the deceleration rate; and
operating the host vehicle in accordance with the vehicle control action.

16. The method of claim 15, wherein identifying the expected rear-end collision condition includes determining that the remote vehicle is behind the host vehicle, the remote vehicle is in-line with the host vehicle, the remote vehicle is level with the host vehicle, the remote vehicle heading is convergent with the host vehicle heading, the remote vehicle heading is aligned with the host vehicle heading, the remote vehicle is in motion, and the remote vehicle is in a drive transmission state or a neutral transmission state.

17. The method of claim 15, wherein identifying the deceleration rate includes:
identifying a current geospatial distance between the host vehicle and the remote vehicle;
identifying a deceleration rate based on the current geospatial distance between the host vehicle and the remote vehicle, a current speed of the remote vehicle, and a current speed of the host vehicle, such that on a condition that the remote vehicle traverses the vehicle transportation network by decelerating in accordance with the deceleration rate, a difference between a speed of the host vehicle at a post-deceleration location and an expected speed for the remote vehicle temporally corresponding to the post-deceleration location is within a relative speed threshold for rear-end collision avoidance, and a difference between a geospatial location of the host vehicle corresponding to the post-deceleration location and an expected geospatial location for the remote vehicle corresponding to the post-deceleration location exceeds a minimum distance threshold for rear-end collision avoidance.

18. The method of claim 17, wherein identifying the vehicle control action includes:
   on a condition that the deceleration rate is within a rear-end collision advisory deceleration rate threshold, identifying an advisory vehicle control action as the vehicle control action, wherein the advisory vehicle control action includes oscillating break lamps of the host vehicle at an advisory frequency; and
   on a condition that the deceleration rate is within a rear-end collision warning deceleration rate threshold, identifying a warning vehicle control action as the vehicle control action, wherein the warning vehicle control action includes oscillating break lamps of the host vehicle at a warning frequency.

19. The method of claim 18, wherein the warning vehicle control action includes:
   presenting a representation of the warning vehicle control action to a driver of the host vehicle;
   adjusting a safety belt tension of a safety belt of the host vehicle; and
   adjusting a head rest position of a head rest of the host vehicle.

20. A method for use in traversing a vehicle transportation network, the method comprising:
   traversing, by a host vehicle, a vehicle transportation network, wherein traversing the vehicle transportation network includes:
      receiving, at a host vehicle, from a remote vehicle, via a wireless electronic communication link, a remote vehicle message, the remote vehicle message including remote vehicle information,
      determining a relative position code indicating geospatial location of the remote vehicle relative to the host vehicle based on the host vehicle information, the remote vehicle information, and a reference direction,
      determining a remote vehicle dynamic state code based on the remote vehicle information,
      identifying an expected rear-end collision condition based on the relative position code and the remote vehicle dynamic state code,
      identifying a current geospatial distance between the host vehicle and the remote vehicle,
      identifying a deceleration rate, wherein identifying the deceleration rate includes identifying the deceleration rate based on the current geospatial distance between the host vehicle and the remote vehicle, a current speed of the remote vehicle, and a current speed of the host vehicle, such that on a condition that the remote vehicle traverses the vehicle transportation network by decelerating in accordance with the deceleration rate, a difference between a speed of the host vehicle at a post-deceleration location and an expected speed for the remote vehicle temporally corresponding to the post-deceleration location is within a relative speed threshold for rear-end collision avoidance, and a difference between a geo spatial location of the host vehicle corresponding to the post-deceleration location and an expected geospatial location for the remote vehicle corresponding to the post-deceleration location exceeds a minimum distance threshold for rear-end collision avoidance,
      identifying a vehicle control action based on the deceleration rate, and
      traversing a portion of the vehicle transportation network, wherein traversing the portion of the vehicle transportation network includes operating the host vehicle in accordance with the vehicle control action by oscillating break lamps of the host vehicle at a frequency based on the deceleration rate.

* * * * *